(12) United States Patent
Correll

(10) Patent No.: US 8,555,243 B2
(45) Date of Patent: Oct. 8, 2013

(54) GENERATING AND DEBUGGING TIMING ACCURATE SIMULATIONS IN A GRAPHICAL SPECIFICATION AND CONSTRAINT LANGUAGE

(75) Inventor: Jeffrey N. Correll, Cedar Park, TX (US)

(73) Assignee: National Instruments Corporation, Austin, TX (US)

( * ) Notice: Subject to any disclaimer, the term of this patent is extended or adjusted under 35 U.S.C. 154(b) by 255 days.

(21) Appl. No.: 13/193,378

(22) Filed: Jul. 28, 2011

(65) Prior Publication Data

US 2012/0030648 A1 Feb. 2, 2012

Related U.S. Application Data

(60) Provisional application No. 61/369,624, filed on Jul. 30, 2010.

(51) Int. Cl.
*G06F 9/44* (2006.01)

(52) U.S. Cl.
USPC ............ 717/105; 717/104; 717/106; 717/113

(58) Field of Classification Search
None
See application file for complete search history.

(56) References Cited

U.S. PATENT DOCUMENTS

| | | | |
|---|---|---|---|
| 7,503,032 B2 * | 3/2009 | Bhaskaran et al. ........... 717/105 |
| 7,680,632 B1 | 3/2010 | Aldrich | |
| 7,913,225 B2 * | 3/2011 | Seemann et al. ............. 717/105 |
| 7,975,254 B2 * | 7/2011 | Gilboa .......................... 717/113 |
| 8,056,048 B2 * | 11/2011 | Stevenson et al. ............ 717/105 |
| 8,214,795 B2 * | 7/2012 | Cheriton ....................... 717/104 |
| 2004/0111702 A1 * | 6/2004 | Chan .............................. 717/105 |
| 2007/0277151 A1 * | 11/2007 | Brunel et al. ................. 717/113 |
| 2008/0189677 A1 * | 8/2008 | Cote et al. ..................... 717/105 |
| 2009/0007062 A1 * | 1/2009 | Gilboa .......................... 717/105 |
| 2009/0199156 A1 * | 8/2009 | Li et al. ......................... 717/104 |
| 2009/0235227 A1 * | 9/2009 | Hartman et al. .............. 717/104 |

OTHER PUBLICATIONS

Ton de Jong et al., SMISLE: System for Multimedia Integrated Simulation Learning Environment, 1994 Kluwer Academic Publishers, [Retrieved on Nov. 13, 2012]. Retrieved from the internet: <URL: http://doc.utwente.nl/27122/1/K27122__.PDF> 33.*

Michael D. Vertal, Foresight: System Simulation for System Developers, 1994 IEEE, [Retrieved on Nov. 13, 2012]. Retrieved from the internet: <URL: http://ieeexplore.ieee.org/stamp/stamp.jsp?tp=&arnumber=283101> 10 Pages (156-165).*

(Continued)

*Primary Examiner* — Don Wong
*Assistant Examiner* — Anibal Rivera
(74) *Attorney, Agent, or Firm* — Meyertons Hood Kivlin Kowert & Goetzel, P.C.; Jeffrey C. Hood; Mark S. Williams

(57) ABSTRACT

System and method for specifying and implementing programs. A graphical program is created in a graphical specification and constraint language that allows specification of a model of computation and explicit declaration of constraints in response to user input. The graphical program includes a specified model of computation, a plurality of interconnected functional blocks that visually indicate functionality of the graphical program in accordance with the specified model of computation, and specifications or constraints for the graphical program or at least one of the functional blocks in the graphical program. The specified model of computation and specifications or constraints are useable to analyze the graphical program or generate a program or simulation.

21 Claims, 34 Drawing Sheets

(56) References Cited

OTHER PUBLICATIONS

B. Bhattacharya and S. Bhattacharyya, "Parameterized Dataflow Modeling for DSP Systems", IEEE Transactions on Signal Processing, vol. 49, No. 10, Oct. 2001, pp. 2408-2421.

Jorn W. Janneck, "Tokens? What Tokens? A Gentle Introduction to Dataflow Programming", ASTG Technical Memo, Xilinx, Aug. 5, 2007, 40 pages.

Alain Girault, Bilung Lee, and Edward A. Lee, "Hierarchical Finite State Machines with Multiple Concurrency Models", IEEE Transactions on Computer-Aided Design of Integrated Circuits and Systems, vol. 18, No. 6, Jun. 1999, pp. 742-760.

Martyn Edwards and Peter Green, "The Implementation of Synchronous Dataflow Graphs Using Reconfigurable Hardware", FPL 2000, pp. 739-748.

Matthias Gries, "Methods for Evaluating and Covering the Design Space during Early Design Development", Integration, the VLSI Journal, Elsevier, vol. 38(2), 2004, pp. 131-183.

Yu-Kwong Kwok and Ishfaq Ahmad, "Static Scheduling Algorithms for Allocating Directed Task Graphs to Multiprocessors", ACM Computing Surveys, vol. 31, No. 4, Dec. 1999, pp. 406-471.

Edward A. Lee and David G. Messerschmitt, "Static Scheduling of Synchronous Data Flow Programs for Digital Signal Processing", IEEE Transactions on Computers, vol. C-36, No. 1, Jan. 1987, pp. 24-35.

Orlando M. Moreira and Marco J. G. Bekooij, "Self-Timed Scheduling Analysis for Real-Time Applications", EURASIP Journal on Advances in Signal Processing, vol. 2007, Article ID 83710, 14 pages.

Gilbert C. Sih and Edward A. Lee, "A Compile-Time Scheduling Heuristic for Interconnection-Constrained Heterogeneous Processor Architectures", IEEE Transactions on Parallel and Distributed Systems, vol. 4, No. 2, Feb. 1993, pp. 175-187.

Sander Stuijk, Marc Geilen, and Twan Basten, "Throughput-Buffering Trade-Off Exploration for Cyclo-Static and Synchronous Dataflow Graphs", IEEE Transactions on Computers 57(10), 2008, pp. 1331-1345.

Alberto L. Sangiovanni-Vincentelli, "Quo Vadis SLD: Reasoning about Trends and Challenges of System-Level Design", Proceedings of the IEEE, vol. 95, No. 3, Mar. 2007, pp. 467-506.

Kurt Keutzer, A. Richard Newton, Jan M. Rabaey, and Alberto L. Sangiovanni-Vincentelli, "System-Level Design: Orthogonalization of Concerns and Platform-Based Design", IEEE Transactions on Computer-Aided Design of Circuits and Systems, vol. 19, No. 12, Dec. 2000, pp. 1523-1543.

Edward A. Lee, "Embedded Software", Advances in Computers, vol. 56, Academic Press, London, 2002, 34 pages.

J. Eker, J. W. Janneck, E. A. Lee, J. Liu, X. Liu, J. Ludvig, S. Neuendorffer, S. Sachs, Y. Xiong, "Taming Heterogeneity—the Ptolemy Approach", Proceedings of the IEEE, vol. 91, No. 2, Jan. 2003, pp. 127-144.

L. Deng, K. Sobti, Y. Zhang, and C. Chakrabarti, "Accurate Area, Time and Power Models for FPGA-Based Implementations", Journal of Signal Processing Systems, DOI 10.1007/s11265-009-0387-7, Jun. 19, 2009, 12 pages.

Z. Zhang, Y. Fan, W. Jiang, G. Han, C. Yang, and J. Cong, "AutoPilot: A Platform-Based ESL Synthesis System", High-Level Synthesis, Springer Science + Business Media B.V. 2008, pp. 99-112.

R. Enzler, T. Jeger, D. Cottet, and G. Tröster, "High-Level Area and Performance Estimation of Hardware Building Blocks on FPGAs", in Proceedings of the The Roadmap to Reconfigurable Computing, 10th International Workshop on Field-Programmable Logic and Applications, 2000, pp. 525-534.

S. S. Bhattacharyya, P. K. Murthy, and E. A. Lee, "Software Synthesis from Dataflow Graphs," Kluwer Academic Publishers, Norwell, Massachusetts, 1996, pp. 29-56.

\* cited by examiner

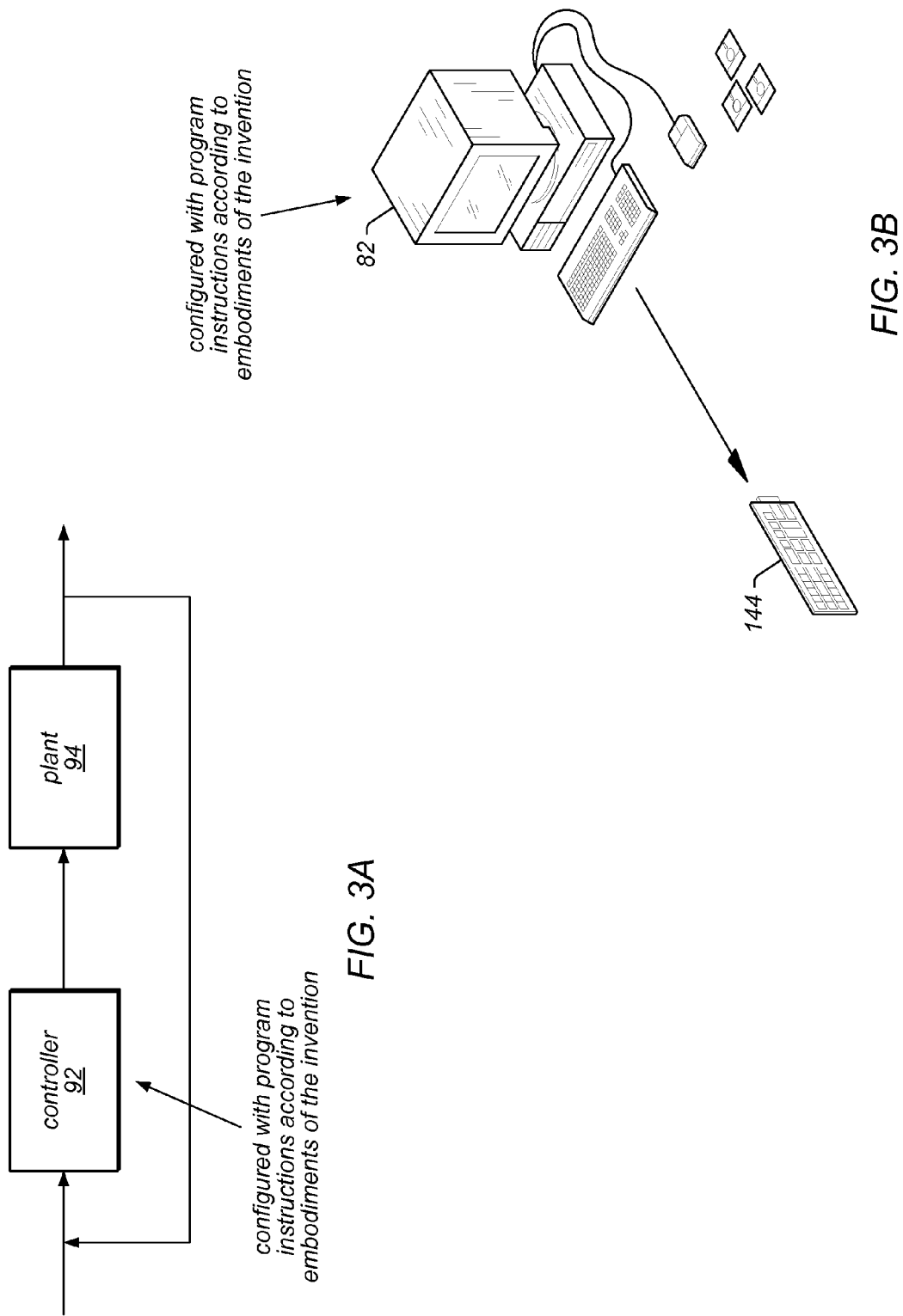

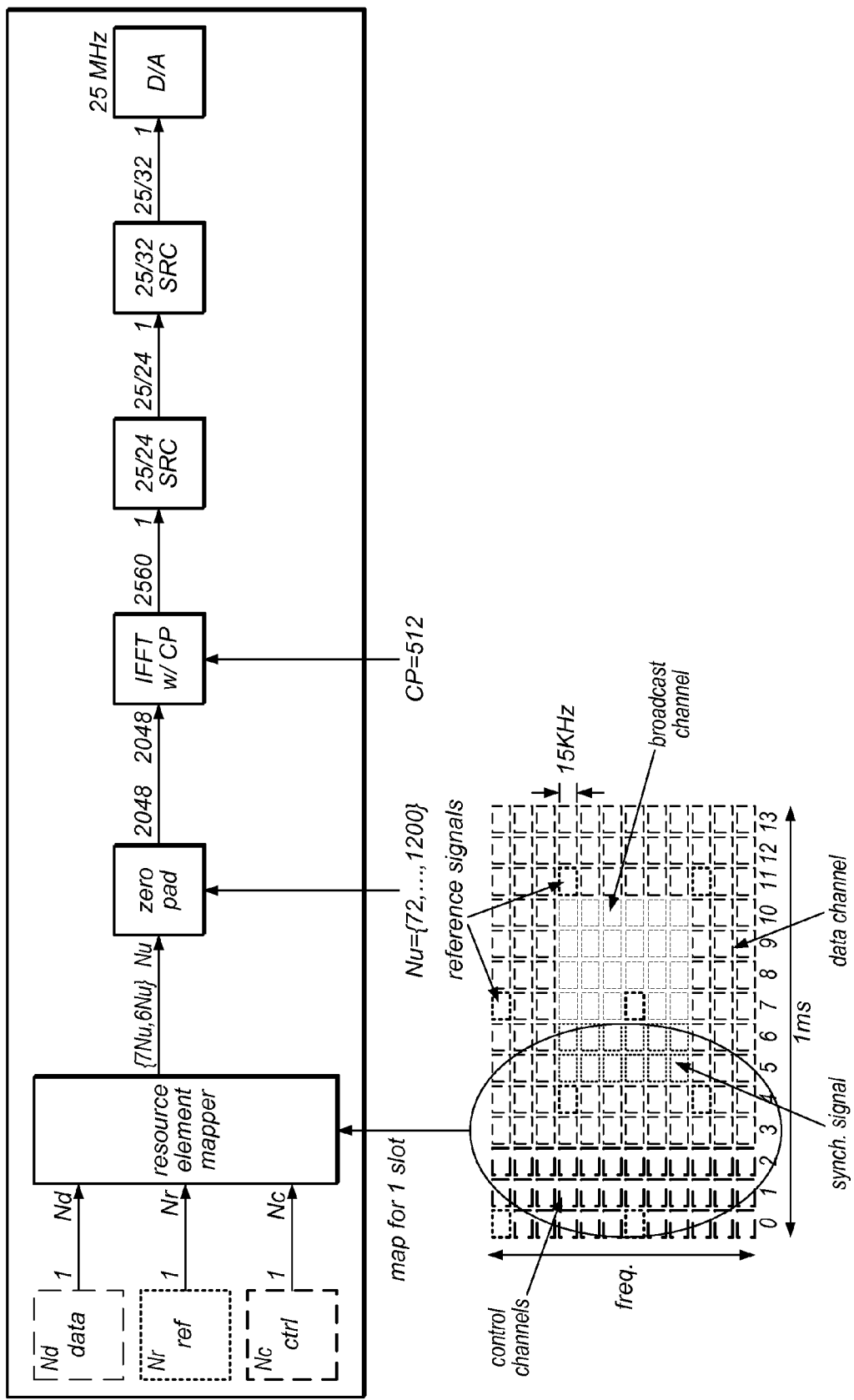

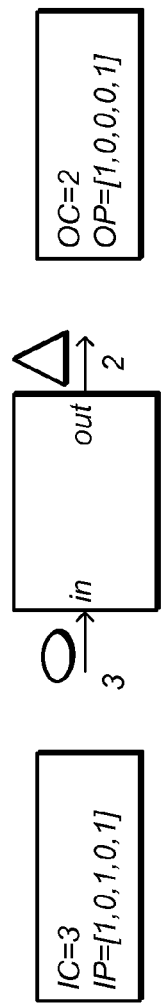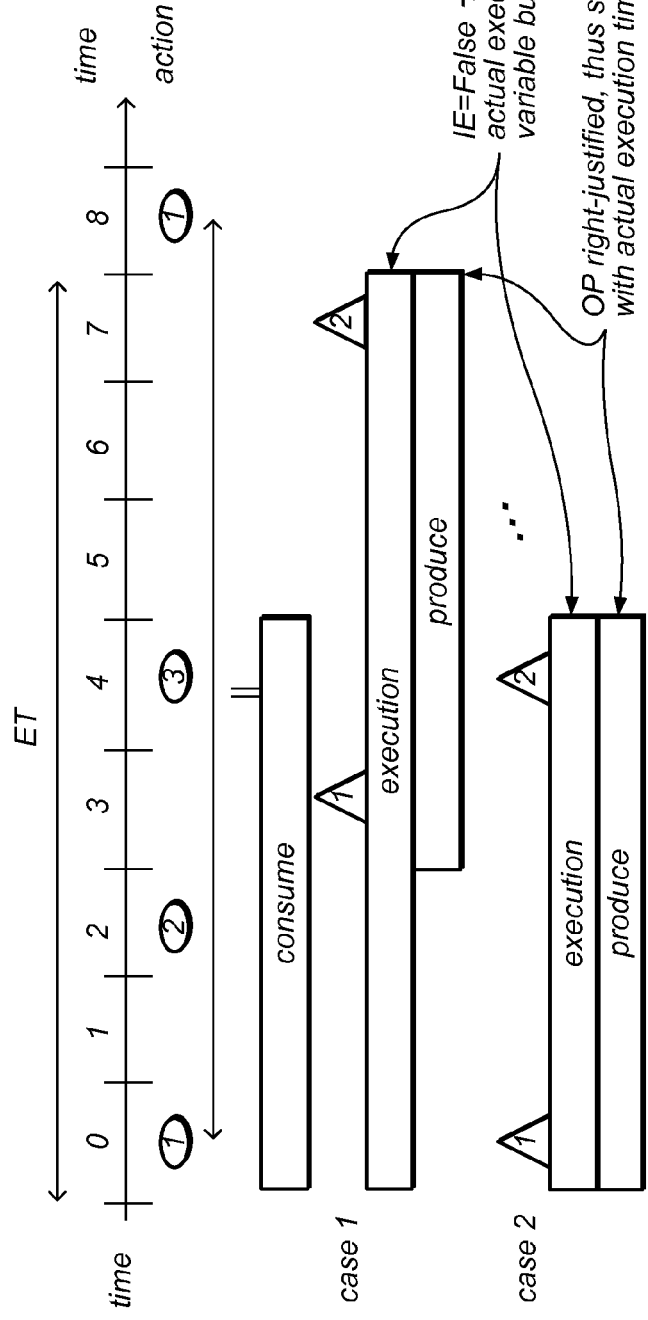
FIG. 20

GENERATING AND DEBUGGING TIMING ACCURATE SIMULATIONS IN A GRAPHICAL SPECIFICATION AND CONSTRAINT LANGUAGE

PRIORITY DATA

This application claims benefit of priority to U.S. Provisional Application Ser. No. 61/369,624, titled "Specifying and Implementing Applications Via a Disciplined Design Methodology", filed on Jul. 30, 2010, whose inventors are Michael J. Trimborn, Jacob Kornerup, Jeffrey N. Correll, Kaushik Ravindran, Guoqiang Wang, Guang Yang, Sadia B. Malik, Hugo A. Andrade, and Ian C. Wong, and which is hereby incorporated by reference in its entirety as though fully and completely set forth herein.

FIELD OF THE INVENTION

The present invention relates to the field of programming, and more particularly to a system and method for specifying and implementing programs.

DESCRIPTION OF THE RELATED ART

Many industrial applications require high-performance and/or efficient implementation, such as, for example, digital signal processing (DSP) applications. Moreover, such applications may be subject to various constraints, e.g., with respect to timing, resource usage, throughput, etc. For example, applications to be implemented in programmable hardware, such as a field programmable gate array (FPGA) may be subject to constraints regarding the application's footprint, i.e., area used, on the FPGA. Many high-performance applications are implemented in accordance with data flow (also referred to as "dataflow") protocols, which facilitate parallelism, particularly in hardware implementations, such as FPGA based targets.

Prior art techniques for specifying and implementing such applications have typically required significant manual analysis and testing, which is difficult, tedious, and error prone.

Thus, improved systems and methods for specifying and implementing applications are desired.

SUMMARY OF THE INVENTION

Various embodiments of a system and method for specifying and implementing programs are presented below.

In one embodiment, a graphical program development environment may be provided which includes a graphical specification and constraint language that allows specification of a model of computation and explicit declaration of constraints. A graphical program may be created in the graphical specification and constraint language in response to user input. The graphical program may include a specified model of computation, a plurality of interconnected functional blocks that visually indicate functionality of the graphical program in accordance with the specified model of computation, and graphically indicated specifications or constraints for at least one functional block of the functional blocks in the graphical program.

The specifications or constraints may include one or more of:

input count (IC), comprising a number of tokens consumed at an input terminal of the at least one functional block by one firing of the at least one functional block;

output count (OC), comprising a number of tokens produced at an output terminal of the at least one functional block by one firing of the at least one functional block;

execution time (ET), comprising a number of cycles needed by the at least one functional block to complete firing;

initiation interval (II), comprising a minimum number of cycles between firings of the at least one functional block;

input pattern (IP), comprising a sequence of Boolean values, where the sequence of Boolean values aligns with the beginning of firing of the at least one functional block, where each true value in the sequence denotes consumption of a token at an input terminal of the at least one functional block; or output pattern (OP), comprising a sequence of Boolean values, where the sequence of Boolean values aligns with the end of firing of the at least one functional block, where each true value in the sequence denotes production of a token at an output terminal of the at least one functional block.

In one embodiment, the method may include receiving user input specifying a functional block in an actor definition language, where the user input specifies annotation information for the functional block indicating a model of computation and a low-level implementation protocol for the functional block. The functional block may be created in response to the user input, where the functional block includes the annotation information, and where the annotation information of the functional block is useable by one or more software tools for analyzing or selecting the functional block for use in a graphical program. The annotation information may also include one or more of the above specifications or constraints.

In one embodiment, a program may be automatically generated based on the graphical program. The program may implement the functionality of the graphical program in accordance with the specified model of computation, and may further implement the specifications or constraints. The program may be useable to configure a programmable hardware element to perform the functionality subject to the specifications or constraints.

In one embodiment, the graphical program may be analyzed, including analyzing the specifications or constraints, thereby generating analysis results regarding performance or resource utilization. The analyzing may be performed before conversion of the graphical program to a hardware description. In one embodiment, the analyzing may include estimating performance or resource utilization for the at least one functional block, the plurality of functional blocks, or the graphical program, using a plurality of models. Each model may have an associated level of granularity, and may include raw model data and a function to customize the model for the estimating.

The method may include reporting whether or not the specifications or constraints are met (e.g., are implementable) based on the analysis results. A first model of the plurality of models may be changed to (i.e., switched with) a second model based on the reporting, where the second model has a different level of granularity from that of the first model.

The analyzing and reporting may be repeated one or more times, and a program may automatically be generated based on the graphical program, where the program implements the functionality of the graphical program in accordance with the specified model of computation, and further implements the specifications or constraints. The program may then be useable to configure a programmable hardware element to perform the functionality subject to the specifications or constraints.

In another embodiment, instead of, or in addition to, generating a program, the method may automatically generate a timing accurate simulation of the graphical program.

Thus, various embodiments of the system and method may facilitate the design and development of programs.

BRIEF DESCRIPTION OF THE DRAWINGS

A better understanding of the present invention can be obtained when the following detailed description of the preferred embodiment is considered in conjunction with the following drawings, in which:

FIG. 3A is a high level block diagram of an exemplary system which may execute or utilize graphical programs;

FIG. 3B illustrates an exemplary system which may perform control and/or simulation functions utilizing graphical programs;

FIG. 6A illustrates an orthogonal frequency division multiplexing (OFDM) transmission modulation algorithm for a communication protocol, according to one embodiment;

FIGS. 19-22 illustrate various examples of annotated functional blocks, according to one embodiment;

Figure 1A:
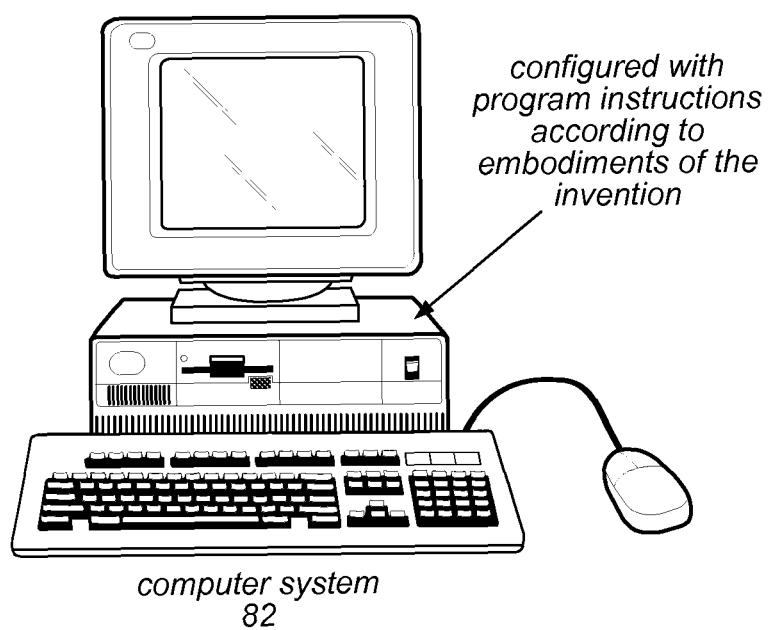
FIG. 1A illustrates a computer system configured to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Provisional Application Ser. No. 61/369,624, titled "Specifying and Implementing Applications Via a Disciplined Design Methodology", filed on Jul. 30, 2010.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

U.S. Pat. No. 7,506,304 titled "Graphical Data Flow Programming Environment with First Model of Computation that Includes a Structure Supporting Second Model of Computation," filed Jun. 16, 2004.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look-up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as functional blocks, or simply blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes is often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements the functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are automatically completed). The present specification provides various examples of operations being automatically performed in response to actions the user has taken.

Disciplined Design Methodology—refers to a design methodology where there is a clear and formal definition of the application specifications and constraints, the platform resources and capabilities, and the quantitative and qualitative interactions between the application specifications and constraints and the platform resources and capabilities models, so that a system/computer can automatically perform operations to navigate the design space, or can aid the user (via a wizard or expert system) to navigate the design space manually.

Application Model—a clear and formal definition of the specifications and constraints of the user application.

Platform Model—a clear and formal definition of the computing and I/O resources and capabilities of the user selected target platform.

Resource Model—an internal model that stores actor definitions (e.g., via tuples) and actor interconnect information, and is an intermediate representation on which code generation may be based.

Platform Library—a library of pre-characterized platform building blocks that the user can assemble to create a platform model. This library can include timing data for blocks.

Specification—refers to part of the diagram or user input that captures the application functionality and reflects the user intent irrespective of the platform on which the application is going to be implemented/deployed.

Constraint—refers to part of the diagram or user input that captures implementation specific user intentions, i.e., those specific to the platform on which the application is going to be implemented/deployed.

Actor—basic (software) unit of computation in a model; conceptually, a sequential process that reads inputs, executes, and produces outputs. An example of an actor is a functional block in a graphical program.

Channel—unbounded point-to-point FIFO buffers between actors.

Production/Consumption Count—the number of data tokens produced/consumed by an actor on a terminal per firing.

Firing—a single execution of an actor that begins when the requisite number of data tokens are present on all its input terminals and the requisite number of empty spaces (storage) are present on all its output terminals. On each firing, an actor consumes data from its input terminals, takes finite time to execute, and produces data on its output terminals.

Static Data Flow (SDF) Actor—an actor for which the number of data tokens consumed and produced by the actor firing on all its terminals is static and specified a priori at edit or compile time.

Cyclo-static Data Flow (CSDF) Actor—an actor which executes as a repeating sequence of phases. Each phase corresponds to a firing of a static dataflow actor for which the number of data tokens consumed and produced are specified a priori.

Parameterized Cyclo-Static Data Flow (PCSDF) Actor—a CSDF actor for which data production and consumption counts and execution behavior are regulated by parameters. The parameter values may be defined at the time the actors or functional blocks are connected together (static), or at runtime (dynamic). In the case of dynamic parameters, these usually determine some modes of operation of the functional blocks or the resulting graphical program. The parameters assume values from a finite set, and are updated only at iteration boundaries.

Heterochronous Data Flow (HDF)—a hierarchical model of Cyclo-Static Data Flow (CSDF) and Finite State Machine (FSM) actors. This model enables a decoupling of control and concurrency. The operational semantics require that state transitions are executed only at iteration boundaries of the SDF model.

Parameterized HDF (PHDF)—a parameterized version of HDF in which actor data production and consumption counts and execution behavior are regulated by parameters (see PCSDF actor definition above). HDF is often defined to include parameterization, and so the designation PHDF is used herein when that specific characteristic is being highlighted.

Parameterized Block—an actor or block (e.g., a functional block) that accepts parameters in the context of PCSDF, or HDF/PHDF.

Schedule—a sequence of actor firings that respects data dependencies and token counts (infinite or periodic).

Iteration—a finite sequence of actor firings that forms a single period of a periodic schedule.

Iteration boundary—the points where an iteration starts or stops.

Deterministic Execution—refers to a type of execution in which any implementation of the application, sequential or concurrent, on any platform, produces the same result.

Deadlock Free Execution—refers to a type of execution in which any implementation of the application does not terminate.

Bounded Execution—refers to a type of execution in which any implementation of the application executes in bounded memory.

Actor Worst Case Execution Time (WCET)—time to complete one actor firing (typical units are cycles or seconds).

Actor Initiation Interval (II)—minimum time between the start of successive actor firings (typical units are cycles or seconds).

Throughput—the number of tokens produced or consumed on a specified port or terminal per unit time (typical units are samples per second or samples per cycle).

Latency (End-To-End)—the time to complete one iteration of the model (typical units are cycles or seconds).

Latency (Computation Path)—the time elapsed along a specific computation path (typical units are cycles or seconds).

Mode—a phase of a functional block's execution (as in CSDF), or a state (or value) of a specification or constraint of a functional block that is configurable at runtime (as in dynamic PCSDF).

Clumping—an optimization method by which FIFO buffers between blocks (which serve as a harnessing boundary) may be removed and replaced with another implementation, e.g., a simple wire, a register, or a combination of FIFO and registers.

Backpressure-less implementation—an implementation style that does not require a downstream actor (e.g., functional block) to control data flowing from upstream actors based on its ability to process data.

Configuration Scope—the set of possible configurations for a configurable functional block, any of its terminals, specifications or constraints. For example, a parameter is defined by a configuration scope for a given parameter port or terminal.

FIG. 1A—Computer System

FIG. 1A illustrates a computer system 82 configured to implement various embodiments of the present invention. Various embodiments of methods for creating a program are described below.

As shown in FIG. 1A, the computer system 82 may include a display device configured to display one or more programs as they are created and/or executed. The display device may also be configured to display a graphical user interface or front panel of the program(s) during execution. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more graphical programs or software tools which are executable to perform the methods described herein. Additionally, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 1B:
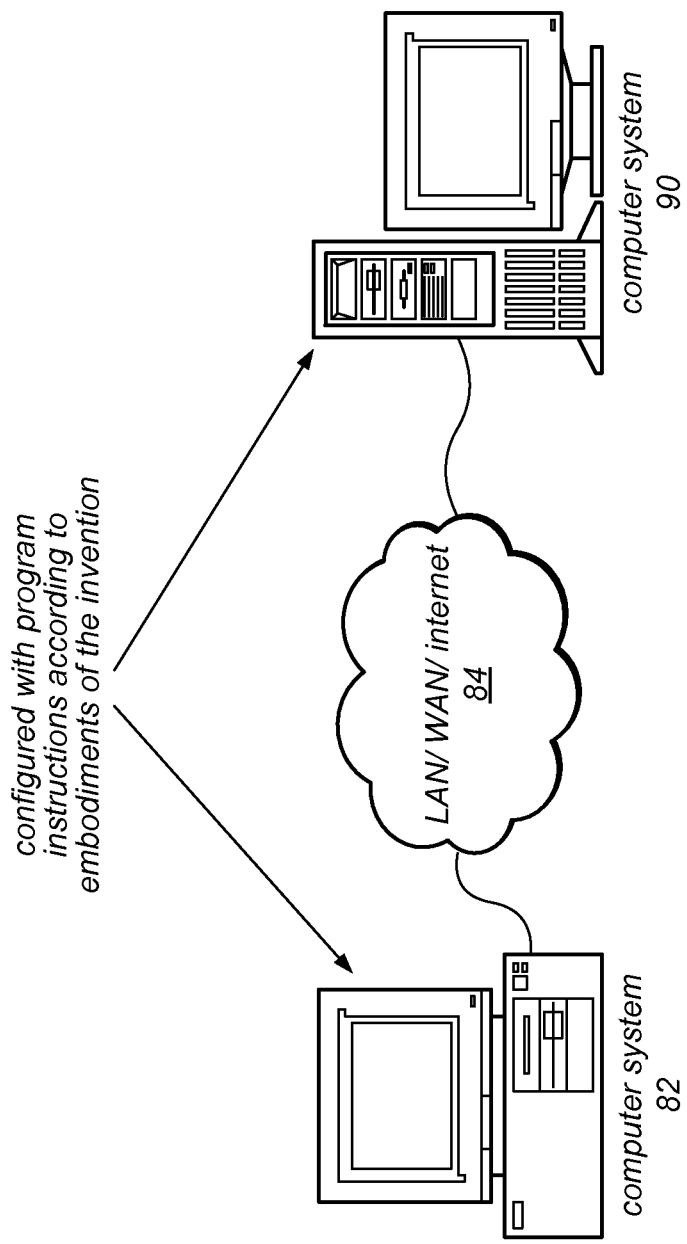
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real-time operating system (RTOS). In one embodiment, the graphical program may be downloaded and executed on the device. For example, an application development environment with which the graphical program is associated may provide support for downloading a graphical program for execution on the device in a real-time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, digital signal processing, etc. Exemplary test applications where the graphical program may be used include hardware-in-the-loop testing and rapid control prototyping, among others.

However, it is noted that embodiments of the present invention can be used for a plethora of applications and are not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
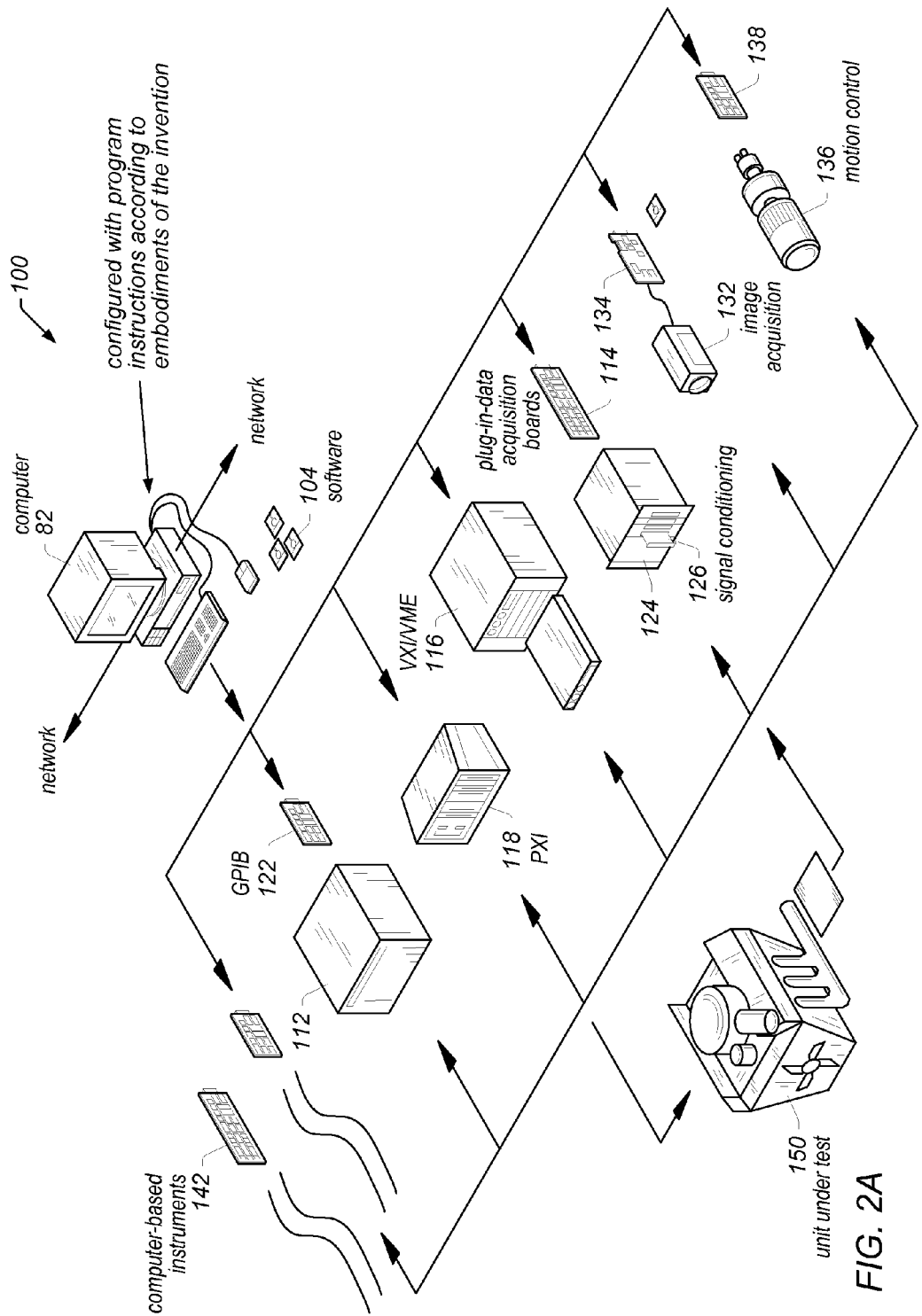
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in or for a digital signal processing application, in a data acquisition and control application, in a test and measurement application, an image processing or machine vision application, a process control application, a man-machine interface application, a simulation application, or a hardware-in-the-loop validation application, among others.

Figure 2B:
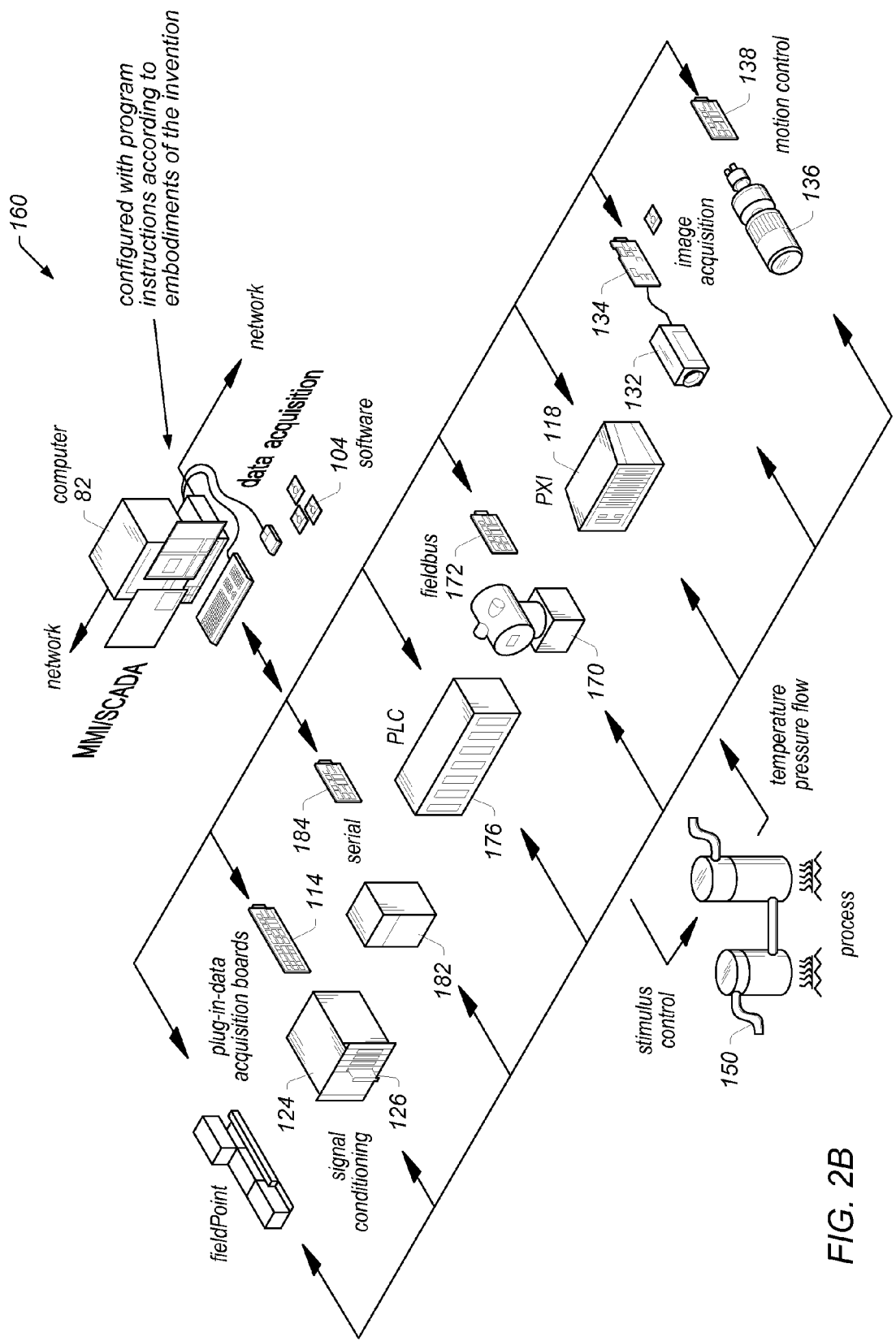
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a program, such as a graphical program, that specifies or implements the functionality of one or both of the controller 92 and the plant 94. For example, a control engineer may use a modeling and simulation tool to create a model (e.g., graphical program) of the plant 94 and/or to create the algorithm (e.g., graphical program) for the controller 92.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program, or a program generated based on a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real-time execution, e.g., a device including a processor that executes a real-time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program or a program generated based on a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for digital signal processing, measurement, instrumentation control, industrial automation, modeling, or simulation, such as in the applications shown in FIGS. 2A and 2B, may be referred to as virtual instruments.

Figure 4:
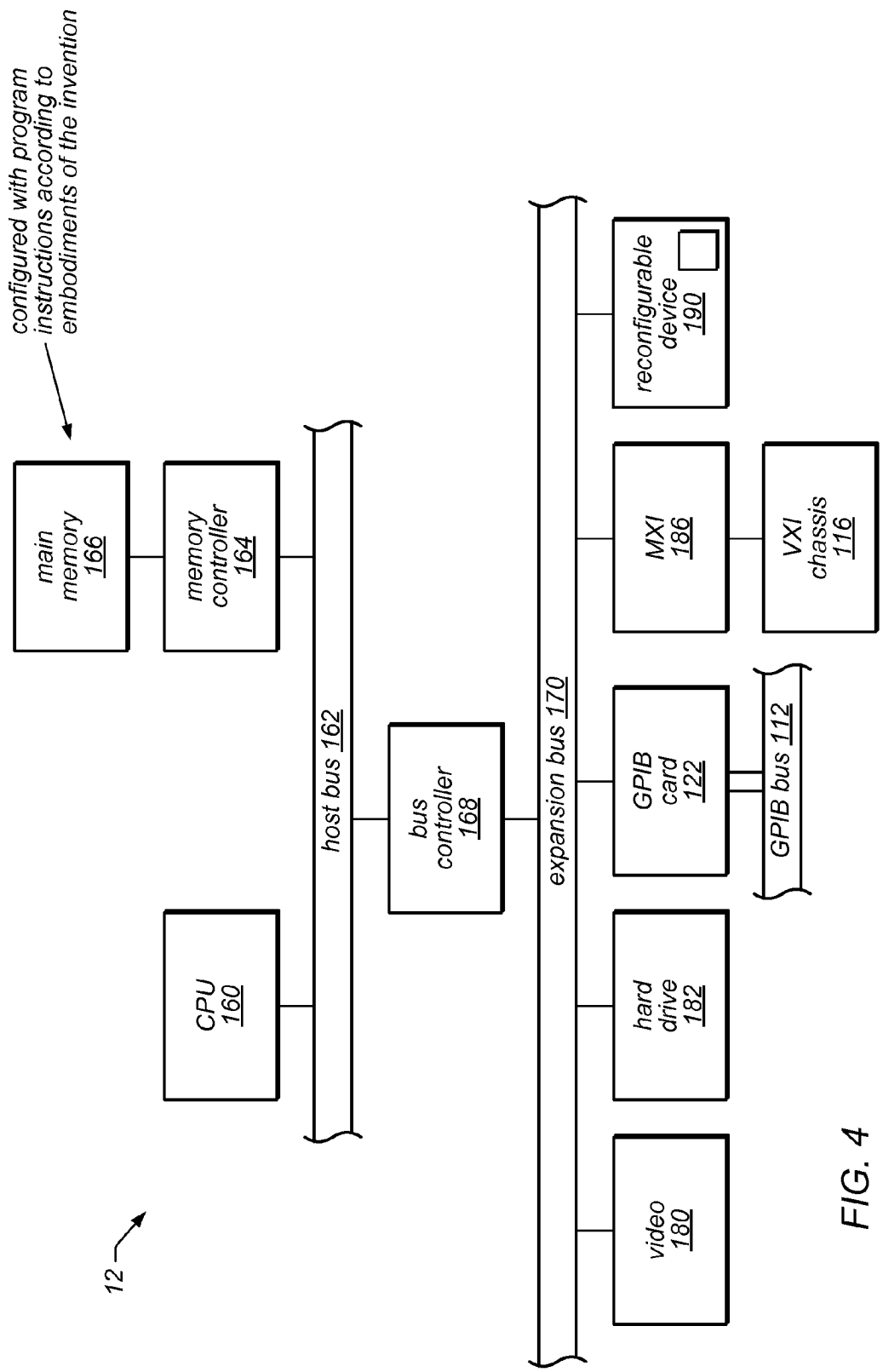
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, or any others, as desired. A memory medium, typically comprising RAM and referred to as main memory, 166 is coupled to the host bus 162 by means of memory controller 164. The main memory 166 may store program instructions implementing embodiments of the present invention. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a RTOS. The device 190 may also or instead comprise a programmable hardware element. The computer system may be configured to deploy a graphical program or a program generated based on a graphical program to the device 190 for execution on the device 190. The deployed program may take the form of graphical program instructions or data structures that directly represent the graphical program, or that were generated based on the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program. In some embodiments, the graphical program and/or the program generated from the graphical program are data flow programs. In a further embodiment, the generated program may be a hardware configuration program, and may be deployed to a programmable hardware element. Moreover, in some embodiments, the generated program may be suitable for deployment in a distributed manner, e.g., across multiple, possibly heterogeneous, targets. Thus, for example, a first portion of the program may be directed to a CPU based platform, while another portion may be targeted for a programmable hardware element.

Graphical Specification and Constraint Language

FIGS. 5-12 are directed to a graphical specification and constraint language for specifying and implementing a program with constraints. More specifically, the graphical specification and constraint language may allow, facilitate, or provide for, specification of a model of computation and explicit declaration of constraints for programs, in addition to specifying the program functionality. In various embodiments, the graphical specification and constraint language may be useable via a graphical or textual interface. In other words, the language may be presented to designers with textual and/or graphical syntax.

For example, in one exemplary embodiment, the specification and constraint language may include one or more of the following features:

- formal semantics defined over the graphical design constructs (functional blocks, terminals, wires, etc.) in a (graphical) designer tool;
- the ability to constrain multiple aspects, including structure, behavior and timing; or
- the availability of both graphical and textual syntax.

Constraint usage in a design flow may include one or more of:

- the combination of functional specification (with graphical design constructs in the designer tool) and design intent (with constraints);
- automatic design parameter tuning to meet design intent; or
- automatic constraint manipulation during design transformation (e.g., various optimizations to increase performance or resource utilization).

The specification and constraint language may facilitate analysis and optimization of graphical programs developed in the language. For example, one or more software tools, e.g., a designer tool, may exploit the relationship between the formal dataflow semantics and underlying timing models of target platforms (or hardware actors) for analysis and code generation. By utilizing such (hardware) models in combination with specified constraints via the specification and constraint language, some tasks or operations, such as the "stitching together" of functional blocks, e.g., IP blocks, e.g., for implementation in hardware, may be performed more easily, efficiently, effectively, and/or more reliably, as will be described in more detail below. Note that the terms "designer tool" and "development environment" may be used interchangeably.

Figure 5:
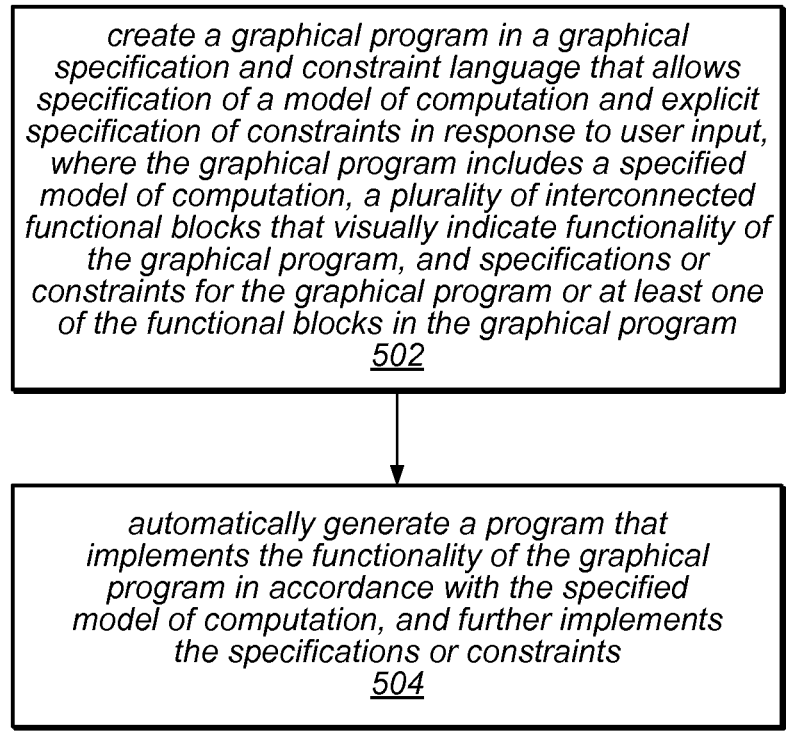
FIG. 5 is a flowchart diagram illustrating one embodiment of a method for creating a program.

FIG. 5—Flowchart of a Method for Creating a Program

FIG. 5 illustrates a method for creating a program. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502 a graphical program (which may be referred to as a diagram) may be created on the computer system 82 (or on a different computer system), e.g., in response to user input. For example, the graphical program may be created or assembled by the user arranging on a display a plurality of nodes or icons (also referred to herein as functional blocks) and then interconnecting the nodes to create the graphical program. In response to the user assembling the graphical program, data structures may be created and stored which represent the graphical program. The nodes may be interconnected in a data flow format, although in other embodiments, at least some of the nodes may be interconnected in a control flow or execution flow format, as desired. The graphical program may thus comprise a plurality of interconnected nodes or icons (functional blocks) which visually indicate the functionality of the program. As noted above, the graphical program may comprise a block diagram and may also include a user interface portion or front panel portion. Where the graphical program includes a user interface portion, the user may optionally assemble the user interface on the display. As one example, the user may use a designer tool to create the graphical program. As another example, the user may use the LabVIEW graphical programming development environment (possibly with suitable extensions) to create the graphical program. In an alternate embodiment, the graphical program may be created in 502 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument. For example, in an exemplary embodiment, the graphical program implements digital signal processing functionality. The graphical program may be or include a graphical data flow program.

As noted above, in some embodiments, a graphical program development environment may be provided which includes a graphical specification and constraint language that allows specification of a model of computation and explicit declaration of constraints. Thus, in some exemplary embodiments, the graphical program may be written in the graphical data flow specification and constraint language. The graphical data flow program may thus include a specified model of computation, a plurality of interconnected functional blocks that visually indicate functionality of the graphical data flow program in accordance with the specified model of computation, and specifications or constraints for the graphical data flow program or at least one of the functional blocks in the graphical data flow program.

In some embodiments, the specification and constraint language may be considered to be a combination of a specification language and a constraint language, although the two may overlap somewhat, and some distinctions between specifications and constraints may be subtle, e.g., based on context, as discussed below.

In one exemplary embodiment, the graphical program may be developed via a software tool, e.g., a designer tool, which provides a graphical design environment for data flow oriented system design. The basic building constructs in the designer tool may include functional blocks (which may also be referred to simply as "blocks"), terminals, and wires. Blocks may be designed with dataflow semantics, and may communicate with each other via terminals (on the blocks) through wires connecting the blocks. The design process from a user's viewpoint may thus include selecting (and/or creating) the appropriate blocks, arranging them, and connecting the terminals of the blocks using wires. To make the design process more efficient, a rich library of primitive blocks may be provided. Moreover, the designer tool may also provide or accommodate third party function blocks, e.g., IP blocks, and/or user-defined function blocks, which may be organized into a user library.

As noted above, the designer tool may include or utilize a graphical data flow specification and constraint language that allows explicit declaration of constraints, in addition to component-based (e.g., functional blocks and their interconnections) design. Note that constraints may convey certain information more effectively than the component-based design aspects of the language. For example, the component-based design portion of the language, which may be referred to as the component or specification language, may be used to implement or present a "skeleton" of the program or system, which includes individual functional blocks and the structural connectivity among those blocks, whereas constraint-related aspects of the language, which may be referred to as the constraint language, may represent properties associated with the building blocks, with the structural connectivity, with the program or system performance, and so forth. Moreover, rather than simply describing various properties of the blocks or their connectivity, constraints may be used as a means to convey design space exploration intent. Thus, constraints may specify or indicate the direction in which designers would like to tune the system, e.g., to improve or optimize system performance or resource utilization.

Note that a specification is usually within some domain of discourse, while a constraint is generally outside the domain. For example, if the domain of discourse is an untimed model of computation (static dataflow for example), then any timing declaration may be considered a constraint. But if the domain of discourse is timed dataflow, then timing may be part of the specification. There can be different domains of discourse supported by a single designer tool.

In some embodiments, the constraint language may be defined over a set of subjects, such as, for example, entities (including functional blocks, terminals and wires), properties (structural, behavioral or timing) associated with the entities, and constants. In some exemplary embodiments, the specifications or constraints may be with respect to one or more of: throughput of terminals on the functional blocks, throughput of the graphical program, clock rate of the graphical program, buffer sizes between functional blocks, or latency (or delays) between functional block inputs and corresponding functional block outputs, among others.

Relations among entities may be described by Boolean operators, arithmetic operators, or temporal operators. Subjects and relations may thus form the foundation of the specification and constraint language. Note that the language may define precise and formal semantics, but in some embodiments may be presented to designers with both textual syntax and graphical syntax, as mentioned above. Thus, the graphical specification and constraint language may integrate well with or into the graphical design environment of the designer tool.

In some embodiments, the specifications or constraints included in the graphical program may include one or more of:

input count (IC), comprising a number of tokens consumed at an input terminal of the at least one functional block by one firing of the at least one functional block;

output count (OC), comprising a number of tokens produced at an output terminal of the at least one functional block by one firing of the at least one functional block;

execution time (ET), comprising a number of cycles needed by the at least one functional block to complete firing;

initiation interval (II), comprising a minimum number of cycles between firings of the at least one functional block;

input pattern (IP), comprising a sequence of Boolean values, wherein the sequence of Boolean values aligns with the beginning of firing of the at least one functional block, wherein each true value in the sequence denotes consumption of a token at an input terminal of the at least one functional block; or output pattern (OP), comprising a sequence of Boolean values, wherein the sequence of Boolean values aligns with the end of firing of the at least one functional block, wherein each true value in the sequence denotes production of a token at an output terminal of the at least one functional block.

Input and output patterns may be referred to collectively as access patterns.

Note, however, that the above items are meant to be exemplary only, and that other items or terms may be used as desired. For example, in some embodiments, the specifications or constraints may also include information regarding parameters or states of the functional blocks or target platforms. As one example, the ET may specify an amount of time and a flag denoting whether the execution time is exact or worst case. As another example, in some embodiments, the Boolean sequence of the input pattern (IP) or output pattern (OP) may have a length of at most the value of II. As a further example, in some embodiments, the IP and/or OP sequences may not be Boolean, e.g., may be integers, so long as the sum of the sequence elements is equal to IC or OC, respectively.

Note that for the IP sequence, the beginning of the sequence aligns with the beginning of firing, whereas for the OP sequence, the end of the sequence aligns with the end of firing.

In some embodiments, the specifications or constraints may have a standardized format, such that the functional blocks (e.g., IP blocks) can be described by third parties. For example, tools or specifications such as IP-XACT may be extended to include or define an interface for accessing the information regarding implementation and the high-level model of computation for the functional blocks.

In one embodiment, in addition to the foundational or basic constraint language, a set of constraints commonly used by designers may be provided, e.g., throughput constraint, latency constraint, etc., which may not only provide convenience to designers, but may also allow the designer tool to associate or invoke more effective assisting tools to analyze the graphical program with respect to particular constraints. For example, when the designer adds a throughput constraint to the system, a static analysis tool may be invoked to determine the actual throughput, and therefore to determine whether the constraint is met. In contrast, if the designer expresses the same throughput constraint via the basic constraint language, a more elaborate flow may be engaged, e.g., running a simulation tool and checking the timed trace against the constraint.

To meet these unique performance and resource needs, the designer tool may provide a framework for analyzing programs/applications and/or application models, explore tradeoffs between performance and resource usage, or select implementation strategies. Through specifications and/or constraints on the graphical program (which may be referred to as a diagram), the designer tool may capture the user's intent for the application and may use the framework to provide early feedback on the design while also generating efficient and performant implementations.

FIG. 6A is a drawing of an exemplary orthogonal frequency division multiplexing (OFDM) transmission modulation algorithm for a communication protocol. This drawing was created by a signal processing domain expert and shows how these algorithms are typically drawn when specifying design elements early in the design process. Common elements that are shown include: functional block identification, dataflow relationships between functional blocks, and data unit (or token) production and consumption. For example, as may be seen, the functional block identifiers shown include identifying labels, such as "Resource Element Mapper", "Zero Pad", "IFFT w/CP", "25/24 SRC", "25/32 SRC", and "D/A". Data flow relationships among the identified functional blocks are indicated by directional wires or arrows connecting the functional block identifiers. Data unit (or token) production and consumption are indicated by numeric values displayed proximate to the wires, where values on incoming wires (to functional blocks) denote token or data consumption per firing of the block, and values on outgoing wires (from functional blocks) denote token or data production per firing of the block. Thus, the drawing of FIG. 6A indicates how a user might typically indicate functional blocks implementing a desired algorithm.

Figure 6B:
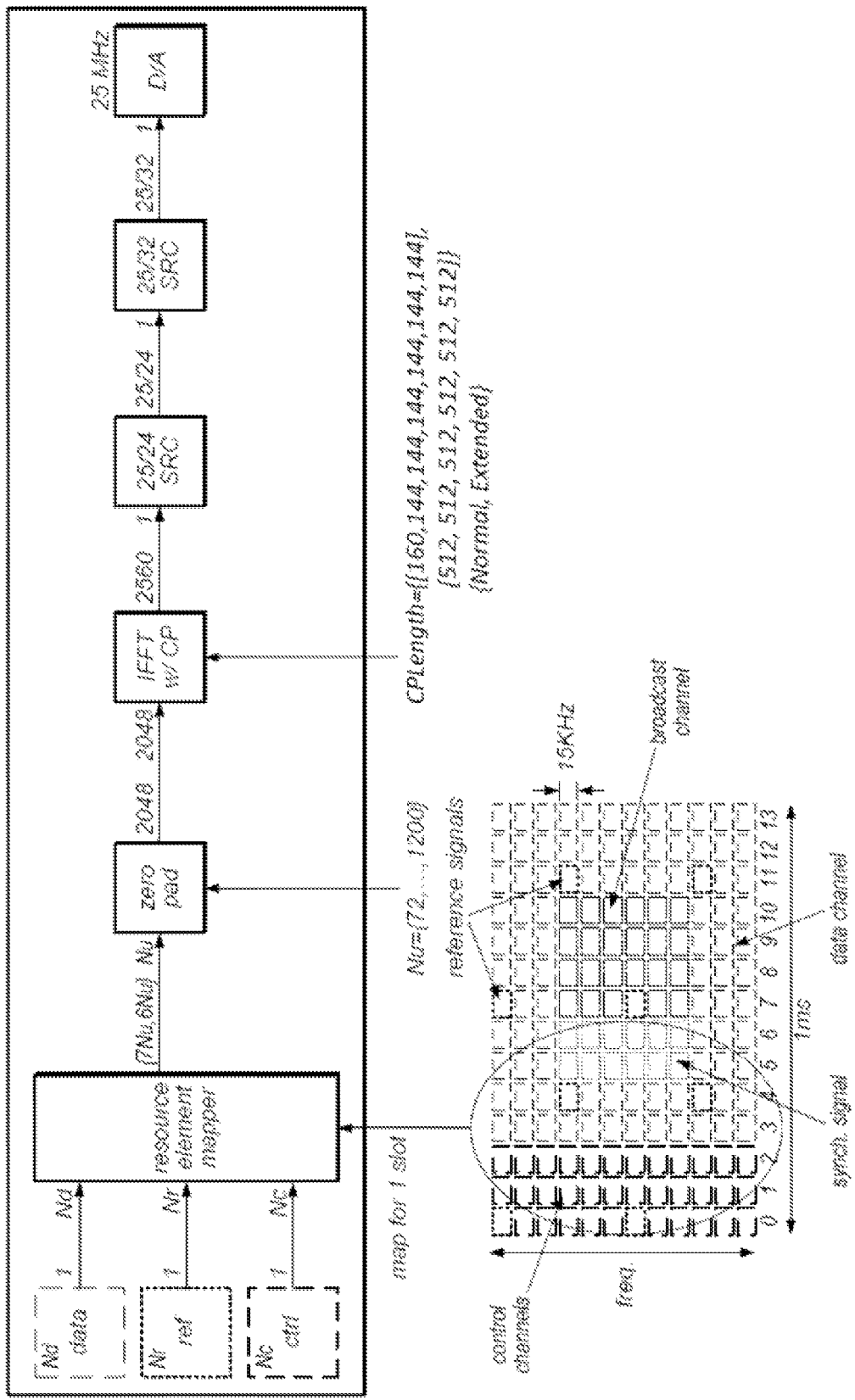
FIG. 6B illustrates a parameterized version of the orthogonal frequency division multiplexing (OFDM) transmission modulation algorithm of FIG. 6A, according to one embodiment.
Figure 7A:
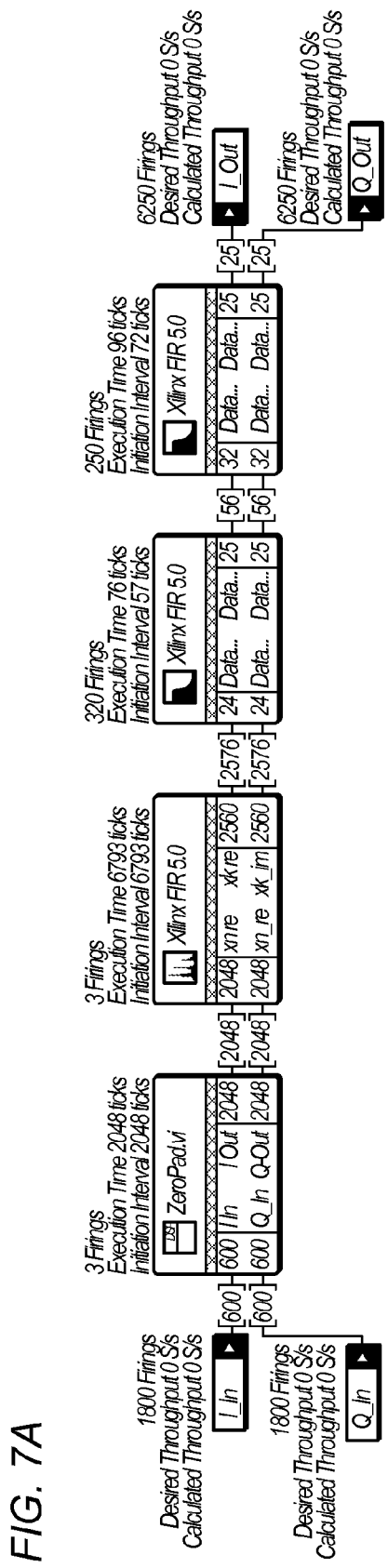
FIG. 7A illustrates the algorithm (OFDM) of FIG. 6A represented by or in an exemplary designer tool, where the algorithm is represented or specified by a graphical program expressed in a graphical specification and constraint language, according to one embodiment.

FIG. 7A shows the algorithm (OFDM) of FIG. 6A represented by or in an exemplary designer tool, where the algorithm is represented or specified by a graphical program or diagram (per 502 above) expressed in the above mentioned graphical specification and constraint language. As shown in FIG. 7A, the graphical program includes functional blocks corresponding to those identified in the drawing of FIG. 6A, and further includes the data unit (or token) production and consumption values (rates) indicated in that figure. Thus, in some embodiments, the graphical specification and constraint language may provide for (and the graphical program of 502 may include) specification of such production and consumption rates, described in more detail below with reference to FIGS. 8A-8C.

Note that at least one of the functional blocks, e.g., the ZeroPad block, is labeled "ZeroPad.vi", which indicates a LabVIEW graphical program (or subprogram), i.e., a VI or Virtual Instrument, also known as a function node, that is associated with or included in the functional block, and implements core functionality of the block. Similarly, others of the functional blocks of FIG. 7A indicate third party IP blocks such as Xilinx FFT 7.0 and Xilinx FIR 5.0, which are respectively associated with or included in the functional blocks. Thus, in some embodiments, one or more of the functional blocks may be implemented by extending or wrapping pre-existing graphical program nodes or IP blocks.

As also shown in FIG. 7A, in this example, the graphical program also includes additional information regarding the functional blocks and their interconnections. For example, not that execution time and initiation interval (both in clock cycles or ticks) for each functional block are displayed above the block. Thus, an FIR functional block with execution time of 163 ticks and an initiation interval of 144 ticks requires 163 clock cycles to complete a single execution, and requires 144 clock cycles between firings. Moreover, in this particular example, the number of firings per program cycle is also shown for each functional block. Thus, the FIR functional block with "320 firings" indicated will execute 320 times over the course of a single program execution. As may also be seen, FIG. 7A includes buffer sizes displayed on the wires connecting the functional blocks, e.g., a buffer of size 56 is interposed between the two FIR functional blocks. Note that the size of such buffers may be a limiting factor for throughput, and so is a candidate item for modification, as will be shown and described below.

As noted above, in some cases, simple component-based specifications (coupled functions or functional blocks) may not be adequate for users to describe their applications. For example, in the example of FIG. 6A, the design is unconstrained regarding resource utilization or throughput. In some embodiments, the designer tool may be configured to estimate throughput and execution behavior and present the estimates to the user to aid in developing the application. However, while it may be useful for the designer tool to determine and provide such throughput and execution estimations to users, they may also want to specify constraints that are key elements of their design. For example, the user may not be able to modify the timing of a block or may need to connect their application directly to hardware I/O that requires a specific data rate. These specified constraints may provide guidance to the designer tool to help it provide optimal implementations to meet specific demands of the application.

As noted above, in various embodiments, specifications or constraints supported by the designer tool (and possibly included in the graphical program) may include or be with respect to throughput of terminals on the functional blocks, throughput of the graphical program, clock rate of the graphical program, buffer sizes between functional blocks, or latency between functional block inputs and corresponding functional block outputs, among others. The designer tool may take these constraints as inputs to the analysis framework and report back whether or not a specific constraint can be met, as well as additional information regarding the rest of the graphical program (application), as will be described in more detail below. Additionally, in some embodiments, the specifications or constraints may be with respect to the graphical program itself. Thus, for example, the graphical program may include one or more specifications or constraints on the graphical program, including one or more of: throughput of the graphical program, or buffer sizes between functional blocks of the graphical program, among others.

As may be seen by comparing FIGS. 6A and 7A, the designer tool may capture design specifications in a way that mirrors how a user might naturally draw their algorithm. Thus, the tool may allow the user to intuitively specify or express their desired application by allowing them to wire functional blocks (nodes) together, set token input and output rates, and specify timing or behavioral elements of each block independently.

Based on the design shown, how the application will execute may be inferred or estimated, as well as how resources are utilized. Additionally, performance metrics of throughput and latency may also be determined or estimated by analyzing the graphical program.

Figure 8A:
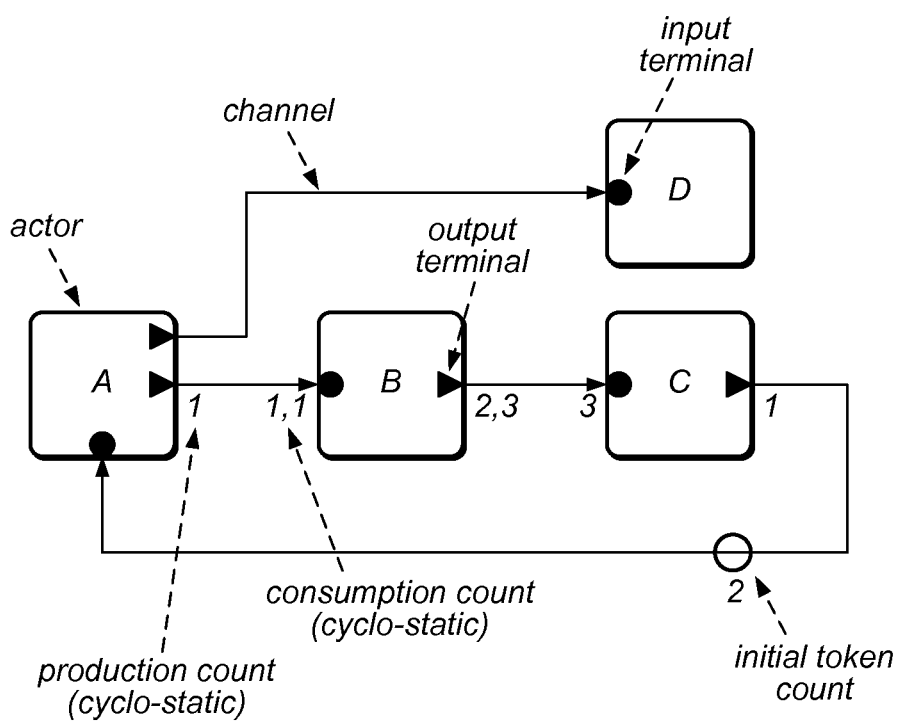
FIGS. 8A-8C illustrate specification of token consumption and production rates in a graphical program, according to one embodiment.

In some embodiments, as illustrated in FIG. 8A, the diagram may represent a varying relation of token production and consumption rates. For example, a cyclo-static behavior for an actor may be described or specified by a comma separated token consumption/production rate, e.g., (1, 4) for consumption and (2, 3) for production, which means that in a first phase the actor will consume 1 token and produce 2 tokens, and in a second phase the actor will consume 4 tokens and produce 3 tokens. The next time around the actor will repeat phase 1 and then 2 again, and so forth. Thus, a static cyclic description or specification of token consumption-production relations for the dataflow diagram may be provided. Such a pre-specified modal behavior is generally referred to as Cyclo-Static Dataflow, or CSDF. Note, however, that any other representations of the token consumption/production rates may be used as desired. For example, as illustrated in FIG. 8A, in some embodiments the token consumption/production rates may be displayed at the terminals to which they apply, and may not be parenthesized. As may be seen, actor A consumes 3 tokens and respectively produces 4 tokens and 1 token at its two output terminals. Actors B, C, and D also denote their respective token rates at respective terminals. Note that in the channel from actor C to actor A includes a specified initial token count (2), which may allow actor A to fire sooner than if no initial tokens were provided.

In some embodiments, the user may chose to express relations between token production or consumption rates of different parts of the diagram or program. For example, note that in FIG. 6A the parameter Nu is referred to in different locations, and consumption and production rates are expressed as functions of such a parameter. Furthermore, in some embodiments, a range of possible values may be expressed or specified, and at a later use, the same user, or a different user of this part of the diagram, may commit a specific value to that parameter, therefore binding (still statically) the new value to all other usages of the same label or reference in the program. Such a generalized model of CSDF is known as parameterized CSDF, or PCSDF. Once this parameter value has been defined or bound, the analysis may be performed on the resulting graph, which may ensure that the resulting graph is valid and, consistent, and further optimizations can be applied to it to achieve a performant implementation.

In one embodiment, at least one of the specifications or constraints may specify tokens consumed and produced in a plurality of graphically indicated phases or modes. Moreover, in some embodiments, it may be important to specialize or restrict the CSDF actors to token production/consumption values of 0 or 1, which may be denoted "0-1 CSDF". More specifically, the number of tokens consumed and produced may be respectively restricted to be 0 or 1 at each phase. This approach may provide a good balance between the flexibility of being able to specify or declare different phases of the execution of the action, while still keeping the model analyzable at reasonable complexity.

In some embodiments, as is the case for PCSDF models, the number of tokens consumed and produced may be resolved at the time the functional blocks are connected, e.g., at edit time. Said another way, the method may include configuring the at least one functional block when the functional blocks of the graphical program are connected together. The configuring may determine values for IC, OC, ET, IP, and OP for the at least one functional block, either directly or indirectly (e.g., via intermediate calculations).

Thus, a functional block's context in the graphical program may impact its token-related (or other) parameters. Additionally, the number of tokens consumed and produced may be specified as a different functional block in the graphical program.

In some embodiments, a configuration scope may be determined for the at least one functional block when the at least one functional block is connected. The at least one functional block may then be configured at runtime in accordance with the determined configuration scope. The configuring may determine values for IC, OC, ET, IP, and OP for the at least one functional block.

In one embodiment, the at least one functional block may have multiple possible configurations of IC, OC, ET, II, IP, and OP. The method may include determining a configuration from the possible configurations based on the specifications or constraints of the at least one functional block, of another functional block, or of the graphical program.

Furthermore, in some embodiments, this value assignment to a parameter in a PCSDF program may be performed in a dynamic manner, where the value of the parameter is not known until run-time. In order to be able to analyze all possible relations between parameters a domain of such parameter space should be known statically before the analysis occurs. For the diagram to be analyzable, the possible times at which parameters change may be restricted to execution iterations.

In one embodiment, the analysis is performed by exhaustively analyzing all the possible parameter values, and combinations of multiple parameters. In another embodiment the analysis is performed in a symbolic manner, where the development environment or designer tool keeps track of the relations of the different parameters and modes in a symbolic manner, and therefore may produce or generate expressions that describe multiple possible run-time behaviors.

Figure 8B:
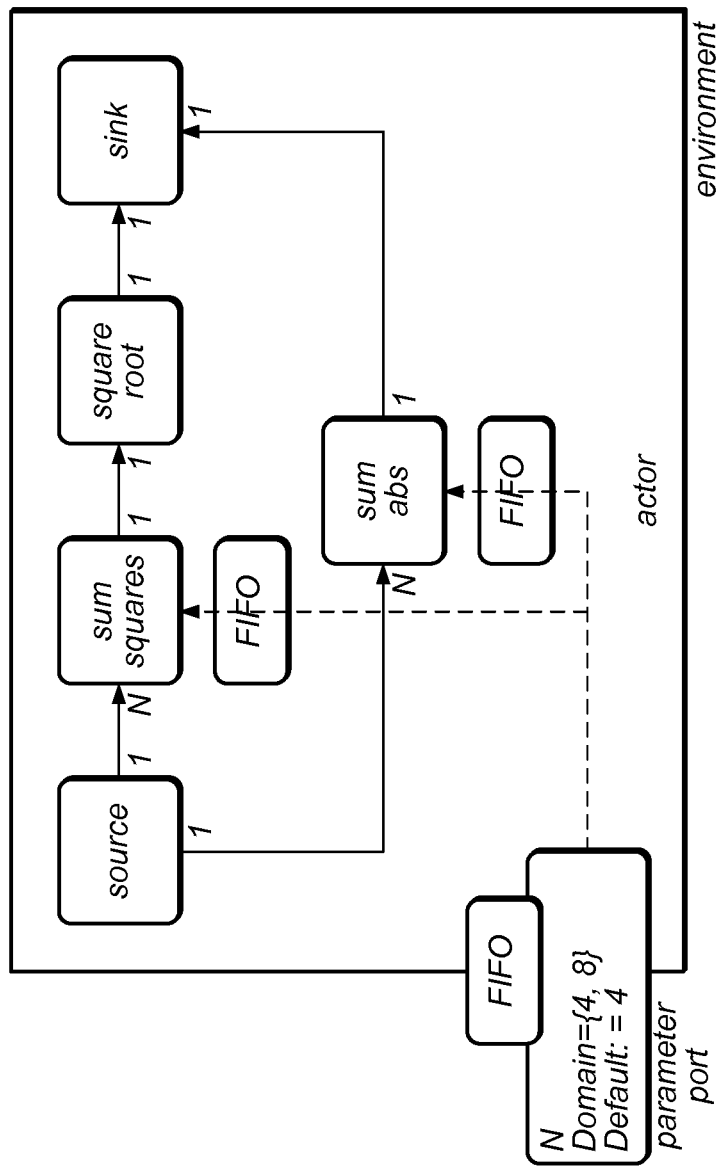

As is shown in FIG. 8B, similar to data terminals passing data to the program at run-time, parameter terminals may pass parameter values from the environment to a running program. These parameter values may be distributed to the diagram according to the model described above. For example, in one embodiment, as multiple iterations may overlap in time, FIFOs may be used to regulate the flow between different parameters, and the points at which they are consumed in time.

Figure 8C:
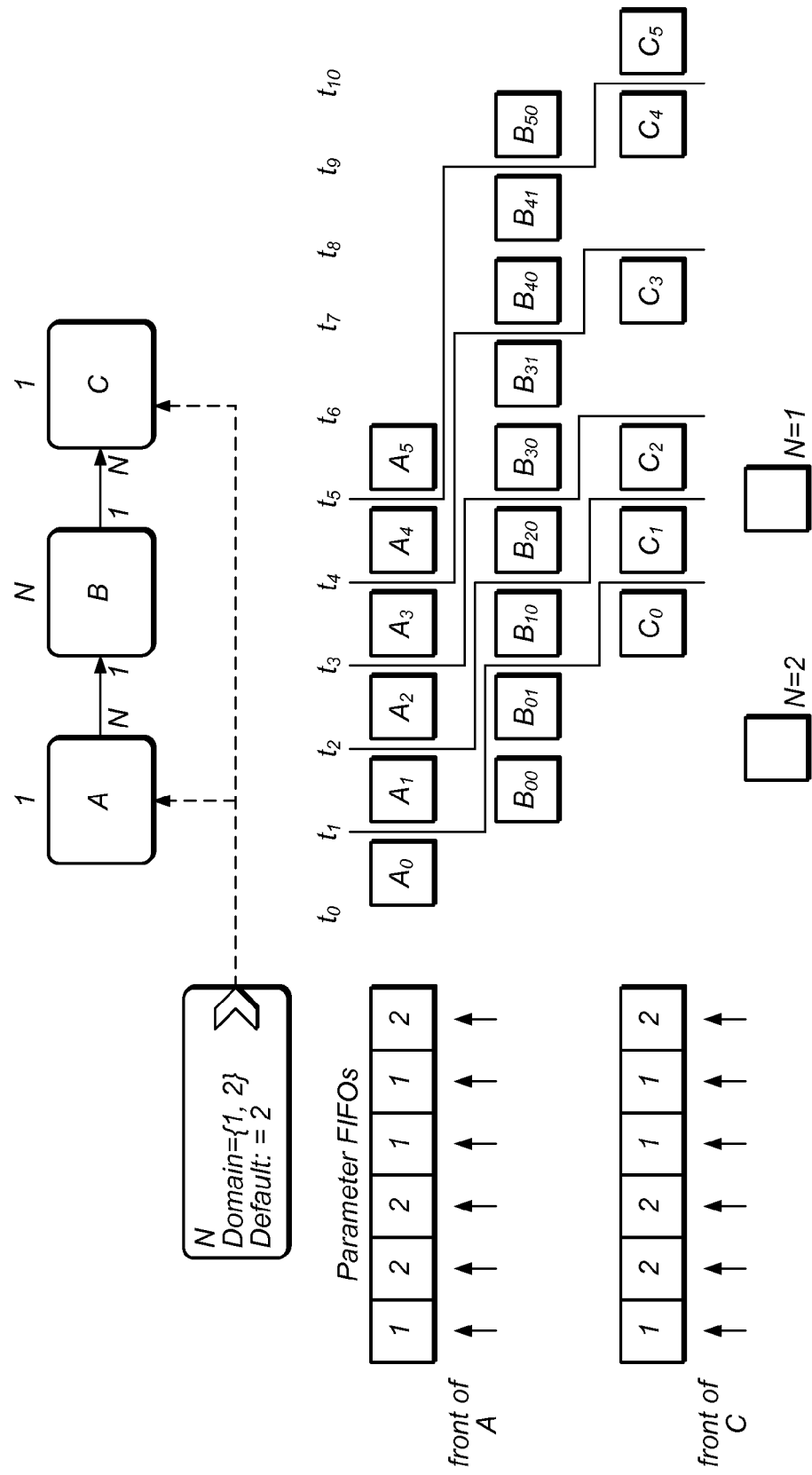

The resulting schedule, shown in FIG. 8C, ensures organized transfer of both parameter and data values, while still allowing for overlapping execution to increase throughput.

Hierarchy

In one embodiment, a portion of the graphical program may be selected to be treated as a reusable unit (e.g., as a functional block in a different graphical program), with similar properties to that of a functional block, e.g., including a model of computation, and specifications and constraints such as IC, OC, ET, II, IP and OP. Such a portion may form a hierarchical arrangement (sub-diagram) for which these characteristics can be computed, e.g., by the design tool, based on the model of computation, specification or constraints, and connectivity of the selected portion of the graphical program. Furthermore such a sub-diagram may conform to all of the properties of the actor definition language (ADL) described herein. A sub-diagram may be represented as an actor within a graphical program, and upon a specific action on that actor, the actors, interconnections, specifications or constraints, and configurations contained within the sub-diagram may be selected or shown for display, editing, or analysis.

Structural Program Descriptions

Figure 29:
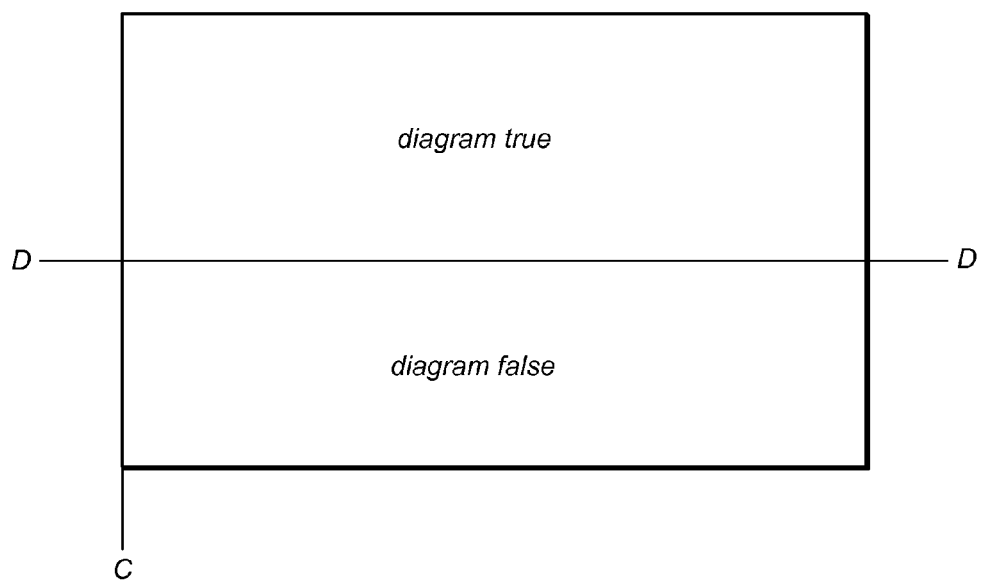
FIG. 29 is a high-level illustration of a switch/select or case structure, according to one embodiment

In one embodiment, the graphical program may include structured programming elements that segment a graphical program into portions, where the portions are visible at the same graphical level, but within visual boundaries. They may form a hierarchy, and rules may be specified as to how interconnections are made within, outside, and across such boundaries. One such structural element is a switch/select or case structure, as illustrated in FIG. 29, which, as shown, has data terminals D, and a control terminal C. Depending on the control value, data may flow in one segment (diagram) or the other. For one embodiment of such structural elements, exemplary rules may be defined as follows:

Let the inner diagrams to be the ones connected to the "right" side of the switch and "left" of select (also referred to as the inner vertical of a future structure);

No (data or parameter) wire may cross from/to the inner diagrams (above) to/from any subdiagram connected to the outer part of the switch/select (before or after the switch/select pair or corresponding structure); and The inner subdiagrams may not connect to each other.

It should be noted that terminals/ports may connect (externally) otherwise disconnected components, so the rules above may apply to these elements as well.

Thus, in some embodiments, one or more of the functional blocks may comprise respective hierarchical elements. The hierarchical elements may include a case structure, or a sub-diagram, comprising a respective plurality of interconnected functional blocks. Other hierarchical elements may be utilized as desired.

In 504, a program may be generated that implements the functionality of the graphical program in accordance with the specified model of computation, and further implements the specifications or constraints. In some embodiments, the program may be targeted for implementation in hardware, e.g., the program may be useable to configure a programmable hardware element, such as an FPGA, to perform the functionality subject to the specifications or constraints. For example, the method may include generating a hardware configuration program based on the program, where the hardware configuration program is useable to configure a programmable hardware element, such as an FPGA.

Alternatively, the program may be targeted to a processor based platform, and thus may be compiled and/or interpreted for execution by one or more processors. More generally, in various embodiments, the generated program may be targeted for execution on any of a variety of platforms, including, for example, collections of FPGAs (or other programmable hardware elements), multi-core processors, multi-processor systems, embedded processors, or any combinations thereof. Thus, the platform may be homogenous or heterogeneous, as desired.

In various embodiments, the generated program may be a textual data flow program, e.g., in the C programming language, or a graphical data flow program. For example, the generated data flow program may be a LabVIEW graphical program (VI).

In some embodiments, the generated program or description may not be data flow, but rather may be in an imperative program form. Furthermore, a more specific hardware-centric description, e.g. one at the register transfer level (RTL, e.g., VHDL or Verilog, SystemC), may be used for implementation directly. Similarly, when targeting (instruction level) processors or many cores or graphical processing units (GPUs), descriptions or programs more suitable for those targets may be generated directly, e.g., annotated or modified imperative code, such as C/CUDA (Compute Unified Device Architecture), or OpenCL. Thus, in various embodiments, the generated program may be of any type desired.

In some embodiments, the method may further include analyzing the graphical program, including analyzing the specifications or constraints, thereby producing analysis results. The automatic generation of the program may then be performed based on the analysis results.

In one embodiment, at least some of the model of computation, and specifications or constraints, may be projected onto a lower dimensional space to simplify and speed at least a portion of the analyzing. Examples of such lower-dimensional projections include a simplified model of computation, or a less specified or constrained access pattern. Thus, for example, the analysis tool may chose to ignore access patterns specifications from specific functional blocks, and provide a resulting implementation that consumes all tokens before running a given functional block, and similarly produces all the tokens before signaling a connected functional block that it has completed its operation. Moreover, in some embodiments, simple analysis may be performed in real-time, and complex and more time-consuming analysis may be performed as a background process as time permits in an asynchronous manner, e.g., while the method (e.g., designer tool) performs other functions.

In one embodiment, the steps of the analysis may be stored, codified, or remembered, as a model transformation during (design) exploration, and may be reproduced for either code generation, or secondary (design) exploration.

In some embodiments, the designer tool may utilize or include various models to aid in analyzing the graphical program. For example, in one embodiment, the designer tool may include one or more platform models that may include information regarding target platforms, and/or one or more application models that include information regarding applications or graphical programs. In one embodiment, a platform model is or includes a set (i.e., unchanging) model of a platform element. For example, it may be a model (including for example, clock speed, FPGA resources, etc.) of a piece of hardware or a set of known parameters of a software block, such as, for example, how long it will take to execute, how many resources it will consume, and so forth. An application model is a model of the actual application itself, and includes which blocks are connected together, how will they execute, and so forth.

In one embodiment, the specification or constraints may include one or more user-provided specifications. The method may automatically convert the one or more user-provided specifications into a corresponding one or more constraints before the analyzing and automatically generating the program. For example, a specification for throughput at the model of computation level may result in two constraints at lower levels: a constraint that specifies the clock frequency at which the program on the hardware element should execute, and a constraint on the number of cycles the program should take overall, resulting in a total amount of time that the program takes to execute. Similar constraints can be directly or indirectly applied for buffer sizes and latency.

Further details regarding the analysis of the graphical program are provided below.

FIG. 9-13—Exemplary Designer Tool

FIGS. 9-13 are directed to an exemplary designer tool and its use, according to various embodiments. However, it should be noted that the embodiments described are meant to be exemplary only, and are not intended to limit the designer tool or its products to any particular form, function, or appearance.

Figure 9:
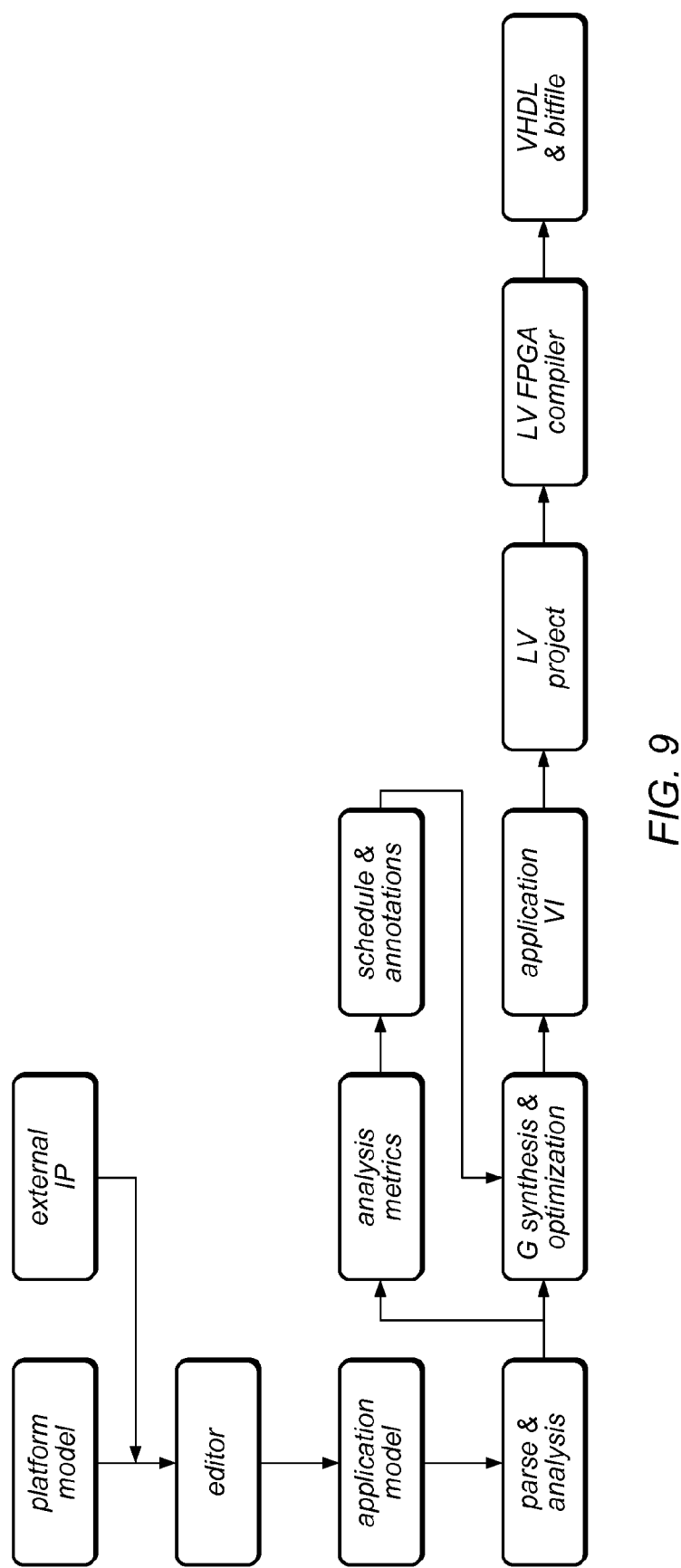
FIG. 9 illustrates an exemplary high-level architectural diagram for a designer tool, according to one embodiment.

FIG. 9 illustrates an exemplary high-level architectural diagram for a designer tool, according to one embodiment. According to this exemplary architecture, specifications and/or constraints may be introduced or specified by the user via the designer tool (e.g., via an editor portion of the tool) or through the design of their functional blocks, e.g., their IP blocks. For functional block-specific constraints, these specifications or constraints may be either properties of the functional block (such as execution time and initiation interval) or known properties of how a block relates to the platform library or model. Thus, as shown in FIG. 9, the specifications or constraints may be provided to the editor (of the designer tool) from the platform model, or external IP (e.g., functional blocks), although in other embodiments, the user may provide input to the editor specifying the specifications or constraints.

Once set, these specifications or constraints may be applied to the application model, analyzed, displayed to the user, and/or synthesized to generate lower-level program code, such as, for example, lower-level G code, which is the graphical programming language of the LabVIEW graphical program development environment provided by National Instruments Corporation. For example, in the exemplary embodiment shown in FIG. 9, the editor may provide or apply the specifications or constraints to the application model, which is then parsed and analyzed to produce analysis metrics, and may also be used for synthesis and optimization, e.g., of program code, e.g., graphical program code, such as G code.

As also shown, the analysis metrics may be used to generate a schedule and annotations for the program, the results of which may be provided to the G synthesis and optimization process or component(s). Moreover, the synthesis and optimization may generate an application VI (graphical program), as shown, which may be included in a project, such as a LabVIEW project as shown. The project may then be compiled by a compiler to generate a hardware configuration program or file. For example, in one embodiment a LabVIEW FPGA compiler may compile generated G code to produce VHDL and/or a bitfile, which may then be used to configure a programmable hardware element, such as an FPGA. Note, however, that the architecture and process shown in FIG. 9 is exemplary only, and is not intended to limit the designer tool (or development environment) to any particular form, function, or appearance.

Using Specifications and/or Constraints to Analyze Performance and Resource Utilization A common use case for the designer tool disclosed herein is to analyze for performance, or, more specifically, to determine whether the design (as expressed by the graphical program) is able to achieve a certain throughput (data units/time unit). In this scenario, the input to analysis may be the graphical program (which may be referred to as a diagram design or design diagram), where the graphical program includes the specification elements of the design and the specified constraints, e.g., performance constraints. Analysis by the designer tool may then determine whether or not the constraints are met (e.g., are implementable). A very basic exemplary tool flow may include:

1. Run scheduling analysis against the application model;
2. Extract functional blocks with timing into an execution trace;
3. Run the execution trace through an analyzer (which may include a constraint model); and
4. Report whether or not the constraint was met.

Figure 10:
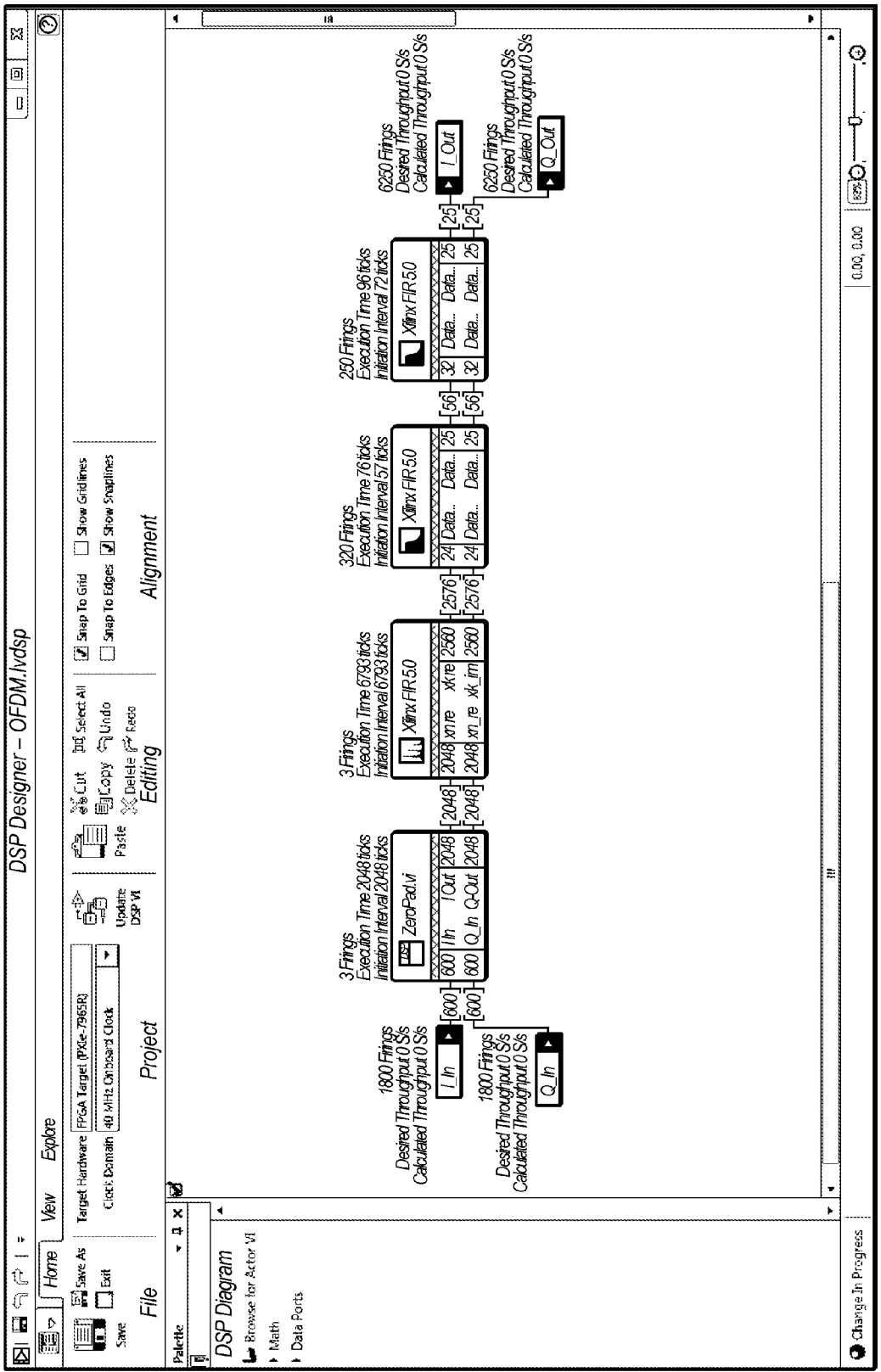
FIG. 10 is a screenshot illustrating a completed graphical program in the context of an exemplary embodiment of the designer tool, according to one embodiment.

For a more concrete example of this, consider the OFDM application of FIG. 7A, where the user has a completed graphical program or diagram. In this scenario, there are already multiple relationships specified by the user (e.g., data flow relationships via wiring) and by the functional blocks (data production and consumption rates). FIG. 10 is a screenshot illustrating the completed graphical program (application/diagram) in the context of an exemplary embodiment of the designer tool. Note that there are also multiple constraints already included and displayed in the design (execution time and initiation interval for each block).

In one embodiment, based on the information already provided at this level, the designer tool (via the analysis framework) may check for model consistency, determine relative firing counts, and reason about resource utilization. For example, the buffer sizes between the FFT and FIR may be sized to a depth of 2576 elements. Since there are no throughput constraints set in the graphical program, the buffers may be set to a minimum size such that the application will not deadlock.

Figure 11:
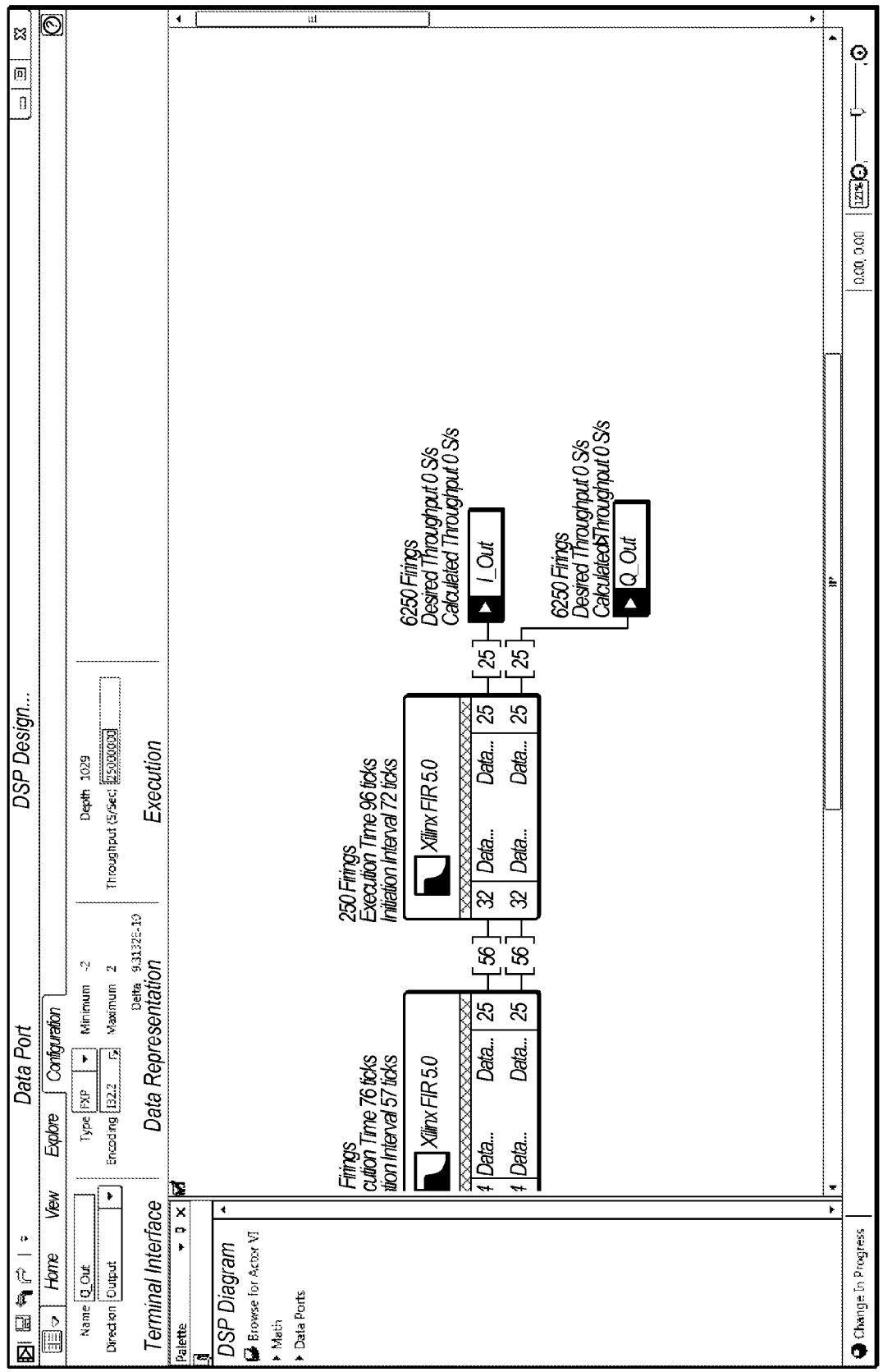
FIG. 11 illustrates specification of desired throughput as a constraint on output terminals of a graphical program, according to one embodiment.

Now, assume that the user wishes to set a throughput constraint on the outputs (FIFOs) to match the expected data rate of the I/O (25 MS/s in this case). FIG. 11 illustrates specification of this desired throughput as a constraint on both output terminals of the program, as indicated by "Desired Throughput 25000000 S/s" displayed above each output terminal. Once set, analysis performed by the designer tool may identify whether the throughput constraint can be met, and if not, where the bottleneck may be. In this particular case, the throughput constraint cannot be met, which may be reported by the designer tool.

Figure 12:
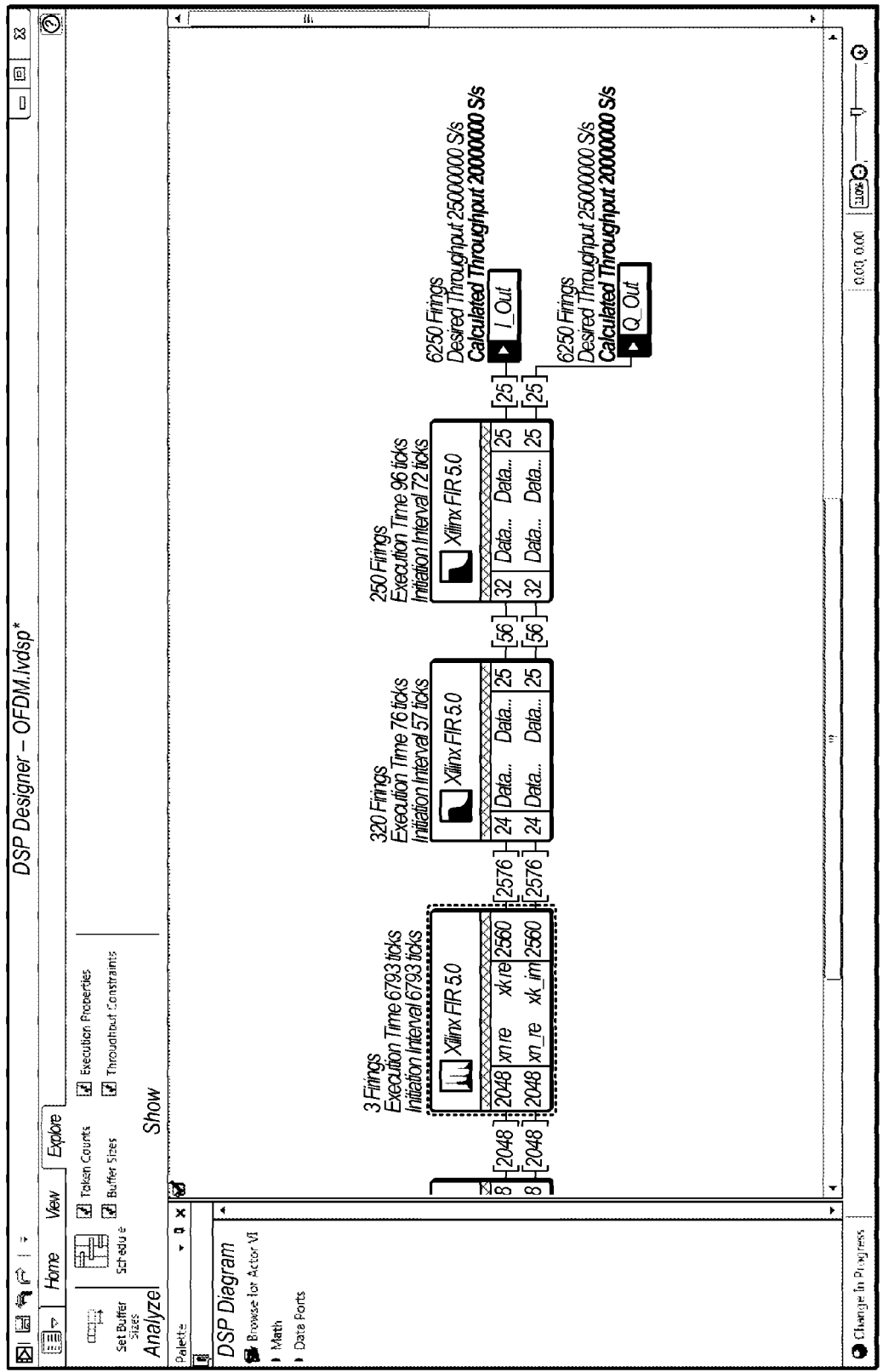
FIG. 12 illustrates the graphical program of FIG. 11, but where the graphical program includes a report regarding the constraint, according to one embodiment.

FIG. 12 illustrates the graphical program of FIG. 11, but where the graphical program includes a report regarding the constraint. More specifically, results of the analysis are indicated in FIG. 12 by red text in the calculated throughput on each terminal, which reads: "Calculated Throughput 20000000 S/s". FIG. 12 further indicates where a bottleneck might exist (indicated by a red border around the suspected functional block, in this case, the FFT functional block). Providing this information early in the design may help the user identify performance gaps which the user can iteratively refine. For example, the user may iteratively modify the design of the offending block until the throughput constraint is met, or modify the constraint so that it is met by the design.

Alternatively, in some embodiments, the user may not be presented with such details until they have set a constraint and the designer tool has reported whether or not the constraint has been met. Then, the user may begin refining the design or constraint(s), where these details may be displayed by the designer tool to aid in the process. Thus, in some embodiments, the designer tool may be configured to display these details or not, depending on context, user input, etc.

Figure 13:
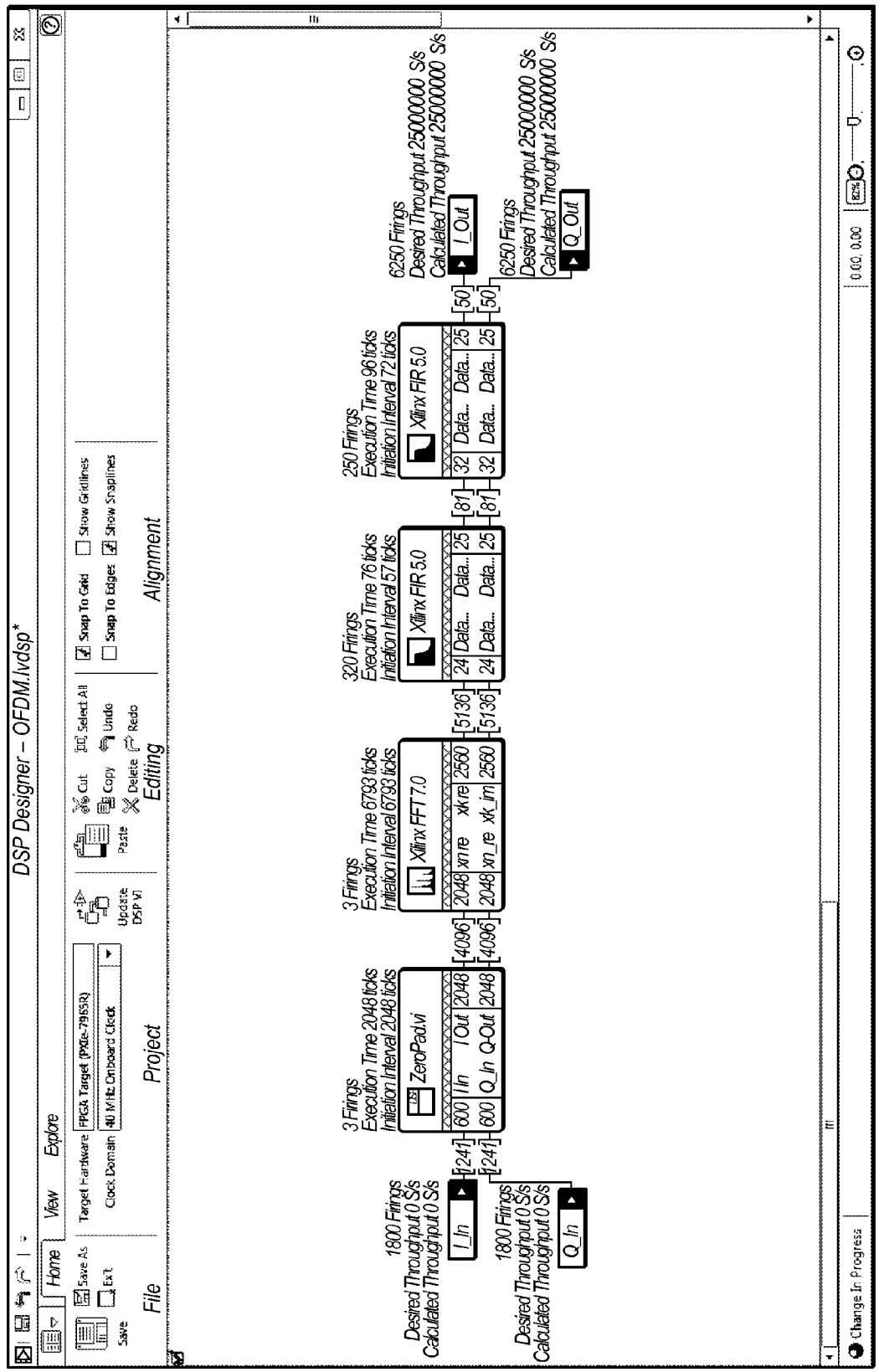
FIG. 13 illustrates the graphical program of FIG. 12 after the buffers have been (re)sized to meet a constrained throughput, according to one embodiment.

Another aspect of design exploration for constraints relates to modifying resource usage to meet a specific constraint. Consider the same OFDM example shown in FIG. 10. The buffers set in this example are recommended when no throughput constraints exist on the diagram. If throughput on the outputs is set to a larger number, e.g., 25 MS/s, the buffer sizes may need to be increased to meet this throughput constraint. FIG. 13 illustrates the graphical program after these buffers have been (re)sized to meet a throughput of 25 MS/s on the outputs. In other words, in this exemplary embodiments, the designer tool analyzed the original graphical program (of FIG. 10), and automatically generated the graphical program of FIG. 13 (via modification of the original graphical program), with appropriate buffer sizes for meeting the throughput constraint. Note, for example, that the buffer between the two FIR functional blocks has been increased from 56 to 81. As may be seen, the other inter-block buffers have also been automatically increased to meet the throughput constraint.

A Framework for Analysis and Implementation of Models

Figure 15:
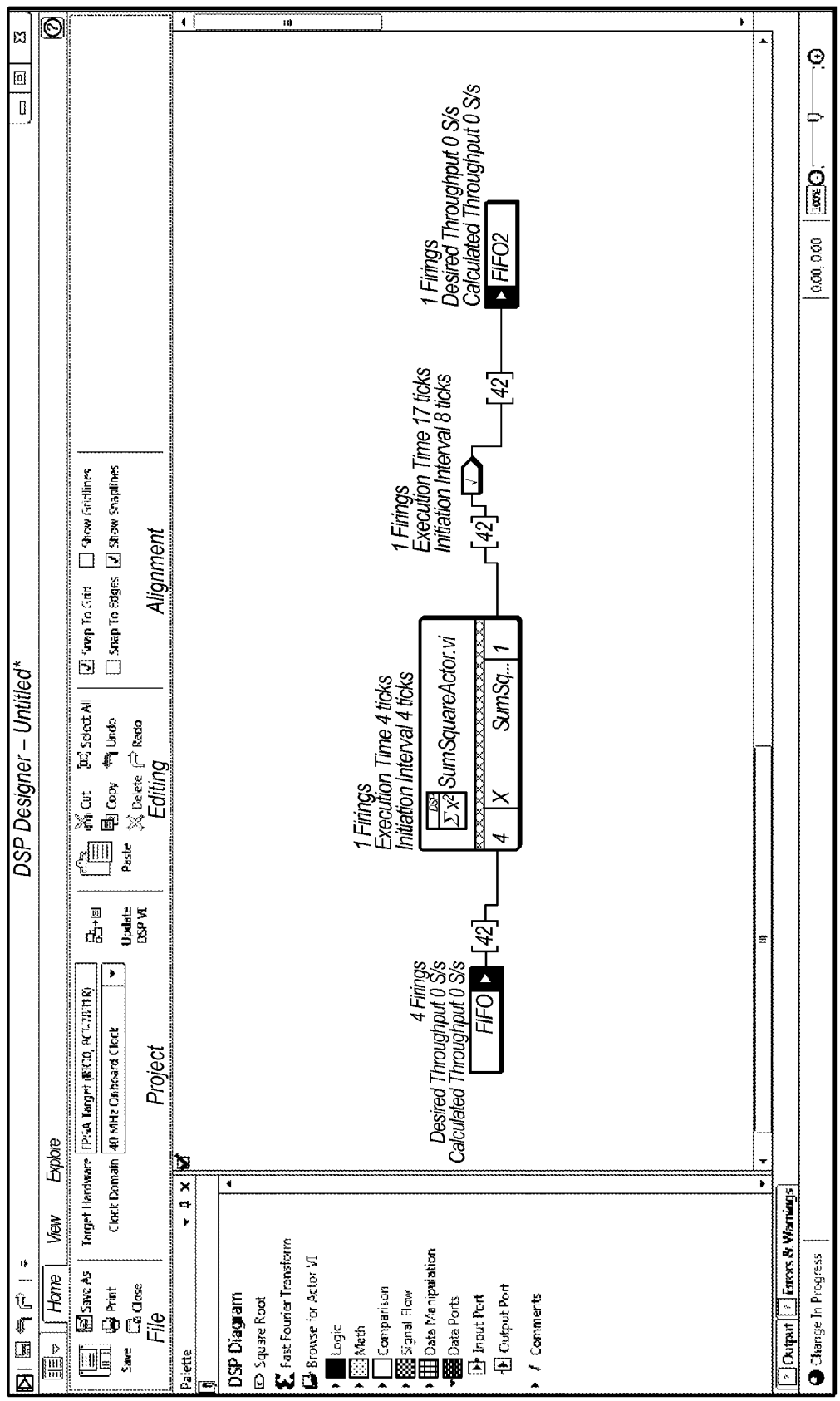
FIG. 15 is a screenshot of an exemplary graphical program that computes the root-mean squared for a set of four values, according to one embodiment.

The following describes processes or activities that are invoked or performed as a user defines a graphical program (diagram), and then invokes the analysis and code generation activities to produce a constrained implementation of the program, e.g., in LabVIEW FPGA, in accordance with a framework for developing programs with constraints. Various aspects of the framework are described or illustrated with respect to an exemplary digital signal processing example. More specifically, an exemplary design flow is described with respect to a DSP graphical program as shown in FIG. 15, and that follows steps outlined in a flowchart shown in FIG. 16, described in detail below.

As noted above, in some embodiments, the models and/or programs may be data flow models or programs.

Figure 14:
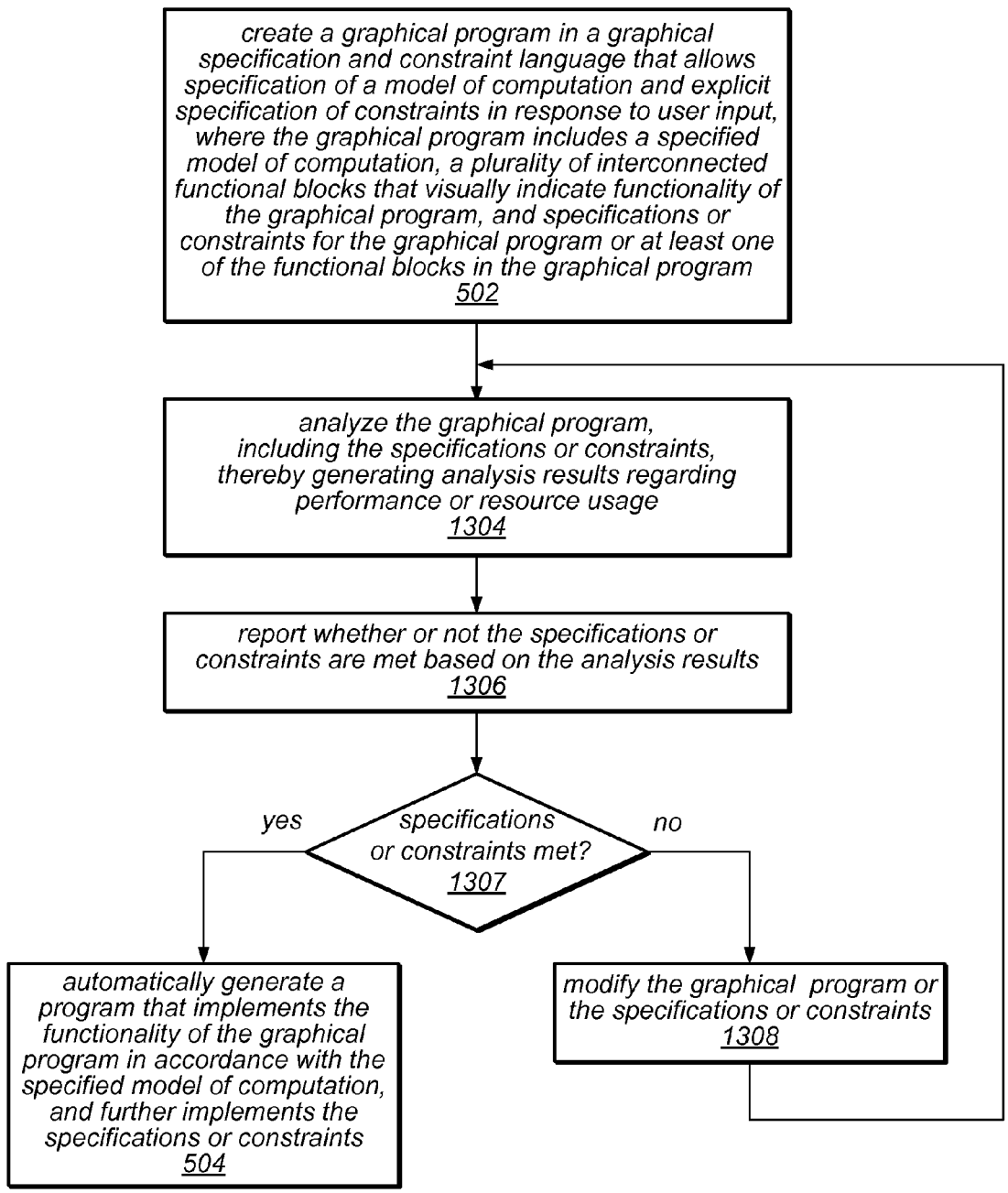
FIG. 14 is a flowchart diagram illustrating one embodiment of another method for creating a program.

FIG. 14—Flowchart of a Method for Developing a Program

FIG. 14 illustrates a method for developing a program. The method shown in FIG. 14 may be used in conjunction with any of the computer systems or devices shown in the above Figures, among other devices. In various embodiments, some of the method elements shown may be performed concurrently, in a different order than shown, or may be omitted. Additional method elements may also be performed as desired. Note that where method elements are the same or similar to method elements described previously, descriptions may be abbreviated. As shown, this method may operate as follows.

First, in 502 a graphical program (which may be referred to as a diagram) may be created on the computer system 82 (or on a different computer system), e.g., in response to user input, as described above with reference to FIG. 5. As discussed above, in some embodiments, the user may use a designer tool to create the graphical program, while in other embodiments, the user may use a provided graphical program development environment which includes a graphical specification and constraint language that allows specification of a model of computation and explicit declaration of constraints, e.g., the LabVIEW graphical programming development environment (possibly with suitable extensions), to create the graphical program. As also mentioned above, in some embodiments, the graphical program is a graphical data flow program. As described above with reference to FIG. 5, the graphical program may include a specified model of computation, a plurality of interconnected functional blocks that visually indicate functionality of the graphical program in accordance with the specified model of computation, as well as graphically indicated specifications or constraints for at least one of the functional blocks in the graphical program.

FIG. 15 is a screenshot of an exemplary graphical program (or diagram) that specifies or implements a simple DSP algorithm that computes the root-mean squared for a set of four values. As FIG. 15 shows, this diagram includes two functional blocks (which may also be referred to as actors): SumSquaresActor and SquareRoot, as well as two data terminals to communicate with the external world.

In this particular example, the functional block SumSquaresActor is defined as a static data flow (SDF) actor that on each firing consumes 4 tokens of type Fixed Point (Signed 16 bit word length and 16 bit Integer word length (S 16, 16)) and produces 1 token of type Fixed Point (Unsigned 32 bit word length and 32 bit Integer word length (U32, 32)). As indicated, the actor/functional block has an execution time of 4 cycles and an initiation interval of 4 cycles, and is configured to compute the sum of the squared values of the input tokens.

Similarly, the SquareRoot functional block is defined as an SDF actor that on each firing consumes 1 token of type Fixed Point (Unsigned 32 bit word length and 32 bit Integer word length (U 32, 32)) and produces 1 token of type Fixed Point (Unsigned 16 bit word length and 16 bit Integer word length (U 16, 16)). The actor has an execution time of 17 cycles and an initiation interval of 8 cycles, and is configured to compute the Square Root of the input token.

In 1404, the graphical program may be analyzed, including analyzing the specifications or constraints, thereby generating analysis results, e.g., regarding performance or resource usage of the graphical program. Further details regarding the analysis are provided above and below.

In 1406, the method may include generating a report regarding whether or not the specifications or constraints are met (e.g., are implementable), based on the analysis results. Note that the report may be presented via any of a variety of ways, e.g., textually, or graphically, and within, or outside of, the displayed program. For example, as illustrated in FIG. 12, discussed above, in one embodiment, information indicating whether or not the specifications or constraints are met (e.g., are implementable) may be presented graphically within the graphical program (e.g., the DSP diagram).

In 1407, a determination may be made as to whether or not all the constraints were met, e.g., based on the analysis and/or report.

In 1408, the graphical program and/or the specifications or constraints may be modified, e.g., in response to determining that at least one of the constraints was not met. The graphical program and/or the specifications or constraints may be modified in response to user input, i.e., manually, or may be modified programmatically, e.g., automatically via software, e.g., by an expert system, or other artificial intelligence technique.

As FIG. 14 indicates, in some embodiments, the method elements 1404 through 1408 may be repeated one or more times. In other words, each time the analysis/report indicates that at least one constraint was not met, the graphical program or the constraints may be modified, after which the (modified) graphical program may be analyzed, and a report generated.

In 504, a program may be automatically generated based on the graphical program in accordance with the specified model of computation, e.g., in response to determining that all constraints have been met, where the program implements the functionality of the graphical program, and further implements the specifications or constraints.

As noted above, in various embodiments, the generated program may be a graphical program, or a textual program, and may or may not be a data flow program. Moreover, in some embodiments, the method may include generating a hardware configuration program based on the program, where the hardware configuration program is useable to configure a programmable hardware element, such as an FPGA, although in other embodiments, any other type of platform may be targeted, as desired.

Figure 16:
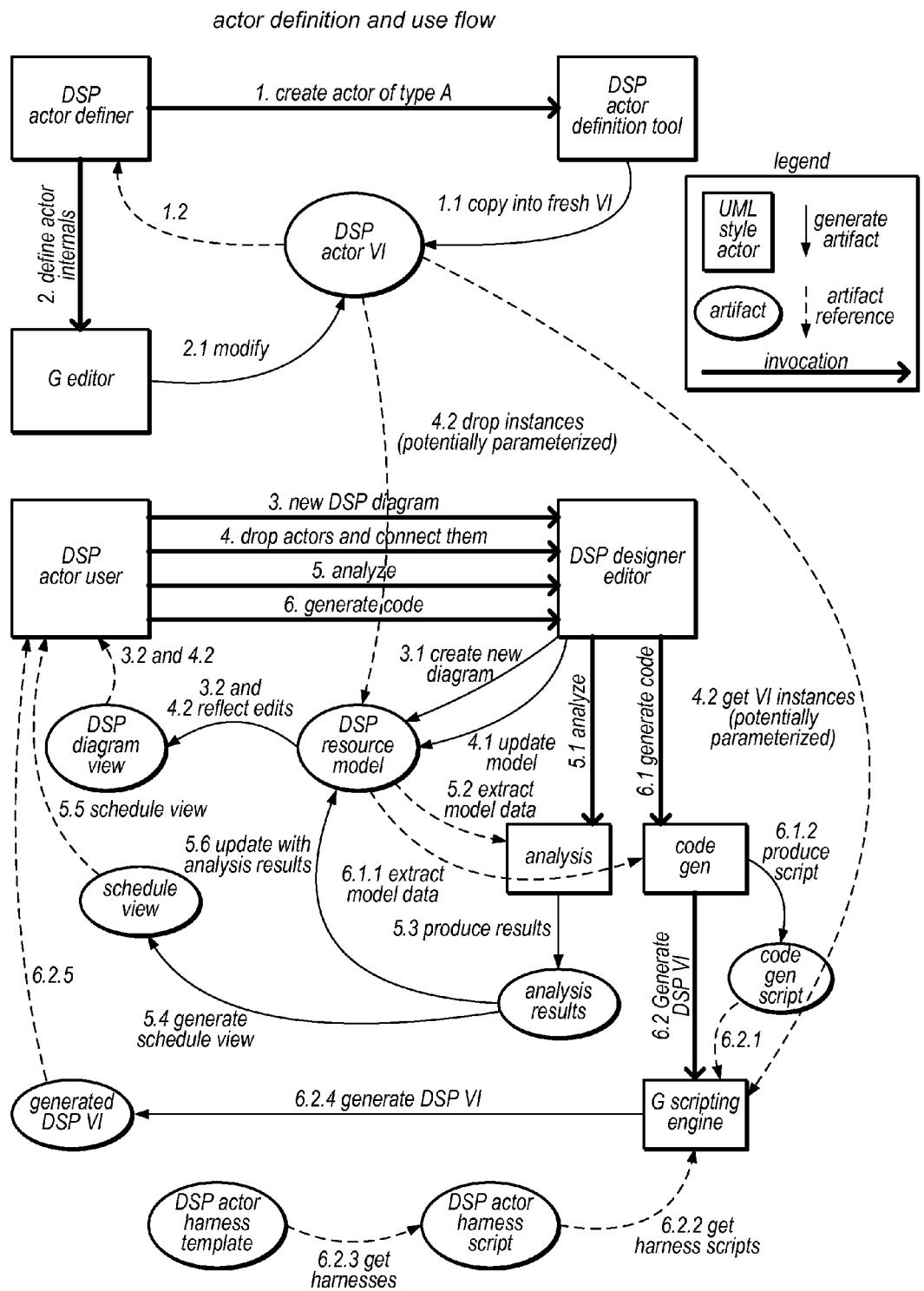
FIG. 16 is an illustrative flowchart that describes one embodiment of the method of FIG. 14 as applied to a digital signal processing (DSP) application.

FIG. 16 is an illustrative flowchart that represents or describes one embodiment of the method of FIG. 14 as applied to a digital signal processing (DSP) application. Note that in the flowchart of FIG. 16, numbered actions are associated with or represented by directional links or arrows between entities, such as actors/functional blocks and artifacts or aspects of the designer tool. The following describes exemplary embodiments of these activities and entities with respect to the example DSP application, per the numbered and labeled elements of FIG. 16. The example is further described in terms of LabVIEW graphical programs, referred to as VIs, although this is not intended to limit the technique to any particular type of programs.

1. Actor Creation (SumSquaresActor):

As FIG. 16 shows, in one embodiment, the first activity involves creation of one or more functional blocks or actors, as indicated by the arrow labeled "1. create actor of type A" at the top of the figure. The user is defining an actor that is backed by (e.g., for which the core functionality of the actor is implemented by) a VI, e.g., a graphical program or node. The user, e.g., the DSP actor definer of FIG. 16, specifies the terminals of the actor, by specifying direction (input, output), tokens produced (consumed), and data type, for each terminal, e.g., by invoking and using the designer tool, e.g., a DSP actor definition tool.

1.1. The designer tool may generate a VI (graphical program or portion) with an interface that conforms to the specification defined by the user.

It should be noted that in general, an "SDF actor" refers to a computing entity that takes a set of input data and produces a set of output data. Such actors may be used in graphical or textual program development environments.

2. The user may implement the functionality of the actor (compute the sum of squares), e.g., may define the internals of the actor. For example, as shown in FIG. 16, 2.1, the user may use a G editor, as provided by National Instruments Corporation, to create and/or modify the VI for the actor (the DSP Actor VI shown).

3. The user may create a new DSP graphical program (diagram) using the DSP diagram editor.

3.1. An internal model may be created to reference or maintain an association with the functional blocks or actors (or other elements or objects) that the user includes on the graphical program. In other words, the internal model may include objects that correspond to the functional blocks or actors in the graphical program/diagram.

3.2. Some of the internal model objects may be displayed in the designer tool, e.g., in a visual DSP diagram (graphical program) view, for the user to edit.

4. The user may edit the DSP diagram or graphical program by dropping functional blocks or actors onto the diagram/program and connecting terminals of compatible data types.

For example: the user may drop a call to the SumSquaresActor functional block into the diagram.

4.1. User edits may result in the addition or modification of objects in the internal model. The added call to SumSquaresActor may result in the addition of a corresponding actor object to the internal model. This resource object may contain many of the above mentioned actor properties, such as the terminal configuration (token count, direction, and data type), the path to the backing implementation VI, and its execution time and initiation interval.

4.2. Some of these edits may be reflected in the visual view of the diagram. For example, adding the call to SumSquaresActor may result in the additional of the SumSquareActor.vi functional block shown in FIG. 15.

5. When the user has completed editing the diagram he may choose to apply analysis to the diagram. The analysis has a number of purposes, including, for example, checking the internal model for validity and schedulability, computing a valid schedule for the graphical program, and/or calculating buffer sizes between actors, among others. For details on each of these see below.

5.1. The user request for analysis may invoke a call into an analysis module (e.g., analysis portion of the designer tool) with directives for the aspects of analysis to be performed. As noted above, in one embodiment, the analysis may be performed in such a way that simple analysis is performed in real-time, but more complex and more time-consuming analysis is performed as a background process as time permits in an asynchronous manner. See FIG. 16 and its detailed description for further description of the types of analysis performed based on relative complexity.

5.2. The analysis module may extract relevant information from, or pieces of, the internal model, including information about all the actors on the diagram and their connections.

5.3. The analysis module may report the results of the requested operations.

5.4. If the analysis results in a schedule, then a schedule view (e.g., of the designer tool) may be updated 5.5. The user may interact with the new schedule in the schedule view.

5.6. The analysis results may be used to update the internal model. For example, the size of a FIFO between two actors may be set to achieve a desired throughput.

6. The user may choose to generate code for the graphical program, e.g., the DSP diagram. In this example, the code generation activity may generate a VI that implements the SDF behavior of the DSP diagram; however, other implementations are contemplated, such as VHDL, SystemC, DFIR (Data Flow Intermediate Representation—an internal LabVIEW representation). In this particular example, the generated implementation may be self-timed; however, in other embodiments, a fully scheduled centralized controlled implementation may be generated, and/or a combination of the two, as desired.

6.1. The user request may invoke a call to a code generation engine, as shown.

6.1.1. The code generator may extract relevant information from the internal model, including, for example, the actors and their configuration, and the connections between actors and their properties, such as implementation type and FIFO sizes. Based on this information the code generator may produce a script that defines the content of the resulting DSP VI.

6.2. The G scripting engine may take the code generation script and produce a VI that implements the behavior of the DSP diagram.

6.2.1. The code generation script may include instructions regarding how each actor is to be realized, e.g., by calling a specific script (see 6.2.2 below) that defines how the actor will be instantiated inside a harness (or wrapper) that makes the actor compatible with the other actors to which it is connected. The code script may also define the code that will be generated for each connection between the actors.

6.2.2. Each actor instance may be described by a parameterized harness script that defines how the actor will be embedded in code that realizes a compatible interface on its connections.

6.2.3. The harness script may refer to a template that defines the common elements of code that are independent of the given parameters.

6.2.4. From the code generation script the G Scripting Engine may produce the DSP VI that realizes the desired behavior of the DSP Diagram.

Auto-Selecting Harness Logic for Parameterized Blocks

In one embodiment, harnessing logic for one or more of the functional blocks may be automatically determined, e.g., selected or generated. Moreover, in some embodiments, multiple harnesses may be selected for the same functional block based on a multitude of scenarios. FIG. 16, described above, illustrates an exemplary use flow for the processes/techniques disclosed herein, and the following is a description of how an actor harness template and actor harness script may be determined, e.g., created and/or selected, according to one embodiment.

There are numerous criteria by which the actor harness may be determined. For example, harnessing logic may be determined based on functional block interconnects, e.g., functional block interconnect storage requirements, or the functional block's configuration, e.g., as an SDF or a PCSDF functional block. For example, in the first case (i.e., determining the harnessing logic based on functional block interconnects), a harness may be determined for a specific block or group of blocks based on whether or not blocks are "clumped" together. Clumping is a method by which FIFO buffers between blocks (which serve as a harnessing boundary) may be removed and replaced with another implementation, e.g., a simple wire, a register, or a combination of FIFO and registers. In this case multiple functional blocks may be harnessed or clumped together into a single harness. Note that when performing various clumping (or other) optimizations, a functional block or functional blocks with the same functionality may have different implementation logic. The method for determining this relationship may be performed by analysis tools (e.g., included in or associated with the development environment) applied to the resource model and code generated.

In an example of the second case, where the functional block's configuration determines the harnessing logic, a functional block with the same functionality may have different harnessing logic based on whether it has a SDF configuration or a PCSDF configuration. Adding a parameter terminal may automatically change the underlying implementation(s).

Figure 7B:
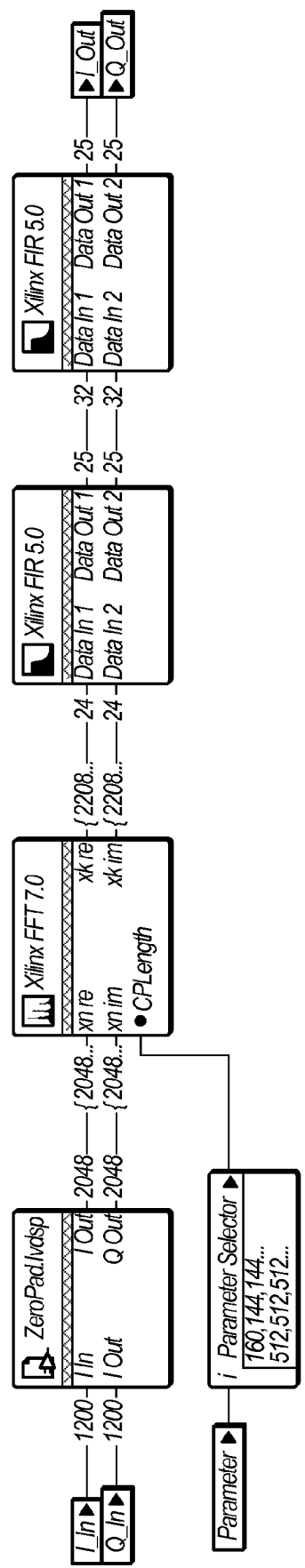
FIG. 7B illustrates a parameterized version of the algorithm (OFDM) of FIG. 7A, according to one embodiment.

The application examples shown in FIGS. 6A, 6B, 7A, and 7B may be used to illustrate how the FFT block can have different harnessing (logic) based on its specification. Consider FIG. 7B, which shows an application identical to FIG. 7A with the exception that the FFT block has parameterized the cyclic prefix length, see the bottom left element. In other words, FIG. 7B shows a parameterized version of the algorithm of FIG. 7A. In this example there are two modes for the FFT, "normal" and "extended," FIG. 6B, which shows a parameterized version of the algorithm of FIG. 6A, shows how the parameterized values for each of these modes. When in extended mode, the CP length is constant of 512 for 6 phases and when in normal mode the CP length varies as shown in a cyclic pattern for 7 phases of 160, 144, 144, 144, 144, 144 and 144 sequentially.

The specification of the parameter value for CP mode and the resulting CP lengths specified as an input to the FFT automatically change the harnessing logic for that block and changes the block model of computation from synchronous data flow to parameterized cyclo-static data flow.

When generating code for this FFT there are several aspects of the harnessing logic that should be accounted for. First, the parameter values for CP mode should only change on an iteration boundary of the graph. This may vary based on the diagram and may or should be accounted for using internal counting logic at the harnessing layer. This can be particularly challenging as multiple iterations of the graph may be running concurrently, with multiple values of multiple parameters involved in the concurrent execution. In one embodiment, the counting logic implemented in the harness may keep a global count of the iteration and number of required phases for each iteration, and may only read the parameter value when the iteration boundary is detected. Thus, for example, in some embodiments, harnessing logic for the at least one functional block may be determined to ensure that runtime updates to the at least one functional block's configuration occur on iteration boundaries. Similarly, in some embodiments, harnessing logic for the at least one functional block may be determined to ensure that data flow for the at least one functional block occurs according to the runtime updates of the at least one functional block's configuration.

Additionally, the parameter value may impact the input and output token counts on the terminals of their owning blocks (in this particular case the token count of the output terminals of the FFT are the transform length (2048)+the CP length). To account for this, logic that enforces the PCSDF semantics may account for this relationship at run time. In other words, harnessing logic for at least one of the functional blocks may be determined, e.g., selected or generated, to provide logic for updating input and output token counts for each parameter value at run-time.

Static Analysis of Data Flow Models

One possible use of the designer tool is to provide a development environment for high performance multi-rate streaming RF and DSP applications on FPGA targets. Static dataflow (SDF) and cyclo-static dataflow (CSDF) models are natural and convenient for capturing these applications and generating efficient implementations.

In one embodiment, the graphical program (DSP diagram) may include a back end compile time static analysis framework to help the designer reason about important program or model properties. The analysis framework may include a toolbox of methods that operate on different models and may provide interesting trade-offs between computation efficiency and quality of results. Important static analysis features related to SDF and CSDF models may include:

1. Model validation, which may include: checking whether a SDF/CSDF graph of the program is consistent and can execute in bounded memory, and/or computing a repetitions vector and symbolically simulating one iteration to verify that the model/program is deadlock free.

2. Minimum buffer size estimation, which may include: given an SDF/CSDF graph, computing lower bounds on buffer sizes for the channel for a valid functional execution.

3. Throughput computation, which may include: determining the throughput of the SDF/CSDF graph based on static performance models for the individual actors.

4. Optimum buffer size computation given throughput constraints, which may include: computing sizes for the channel buffers in the SDF/CSDF graph to meet throughput constraints set by the user on ports and terminals.

5. Schedule computation, which may include: computing a schedule of actor executions.

6. Dataflow pipelining and function parallelization, which may include: unrolling multiple iterations of the dataflow graph and allocating and scheduling actors to custom microarchitecture models that allow multiple function unit instances for the application actors.

7. Fusion and clustering optimizations, which may include: composing multiple actors into a single cycle, hence obviating the need for state elements between them based on the inter- and intra-cycle timing models for the actors; retiming and C-slowing may be related optimizations used to improve throughput and achieve higher clock frequencies.

8. Fine grained scheduling for hardware targets, which may include: extending general scheduling techniques to include specific constraints related to hardware targets, such as: (a) internally pipelined functional units and IP, (b) IP configuration selection from a set of parameter choices, (c) choice on number of parallel instances of certain functional units, (d) allocation of buffers to memories, or (e) customizable microarchitecture configuration.

9. Implementation strategy selection, which may include: selecting harnessing strategies to compose communicating actors in the SDF model, trading-off performance and resource usage; and exploring a hybrid implementation strategy that selects between self-timed and fully-specified schedule executions for different parts of the DSP diagram.

The analysis framework may include many methods that provide interesting trade-offs between computation efficiency and quality of results. The DSP diagram and/or the designer tool may provide intuitive means, e.g., knobs, for the user to select a suitable effort-quality point and invoke the appropriate analysis method. Optionally, some easy analysis routines, such as model validation and minimum buffer size estimation, may run in the background while the user is editing the diagram.

In one embodiment, a default implementation generated by the designer tool may be a FIFO-based token-vacancy implementation; that is, every channel may have a FIFO, and an actor (functional block) may be fired if and only if all of its inputs have sufficient tokens and all of its outputs have sufficient vacancies. In one embodiment, homogeneous clumping may be implemented, e.g., generating alternative, leaner implementations for homogeneous regions of a diagram or graphical program, e.g., a DSP diagram.

For that purpose, the tool may:

Identify homogeneous regions, i.e., homogeneous clumps in a DSP diagram (or other graphical program). Homogeneous clumps may contain only certain types of actors.

Each homogeneous clump is considered to be a composite actor having multiple inputs and multiple outputs. This composite actor itself is homogeneous.

A leaner backpressure-less implementation is generated inside each homogeneous clump. Following are four choices of implementations:

ShiftRegister-based, backpressure-less;
DelayWithStorage-based, backpressure-less;
DelayWithInitiationInterval-based, backpressure-less; or
FIFO-based, backpressure-less.

The top-level diagram now has the composite actors corresponding to homogeneous clumps in addition to the other actors.

A FIFO-based, token-vacancy implementation may then be generated for the top-level diagram. Throughput constraints may be considered while generating either of the above implementation styles.

As an example of the above, in some embodiments, the harnessing logic may be part of control logic for the at least one functional block, and may be related to optimization or simplification of the generated program. For example, in one embodiment, the IC of a first functional block and the OC of a second functional block may correspond in rate to each other one to one, and ET, II, IP and OP may match, and the corresponding generated program may be optimized or simplified with a control structure that is re-use for the first and second functional blocks. The setup above is generally described as homogeneous clumping.

In addition to homogeneous clumping, the tool can identify heterogeneous clumping, where we IC and OC of connected functional blocks may not be necessarily one, but could have different relative rates, and could account for the access patterns. In this case, the optimization occurs by looking at each cycle of execution and identifying when to fire each of production and consumption circuits of the connected functional blocks. As an example of this behavior, the IC of a first functional block and the OC of a second functional block may correspond in rate to each other n to m, and ET, II, IP and OP may match, and the generated program may be optimized or simplified with a control structure that is re-used for the first and second functional blocks at appropriate rates.

In a further embodiment, the graphical program may be compiled into a collection of sub-sections of the original program that exhibit one of the synchronous behaviors above, or may be more suitable for general self-timed (asynchronous) computation. Such a collection of subcomponents is usually referred to as GALS (Globally Asynchronous Locally Synchronous) behavior.

Furthermore, as a specialization of homogeneous clumping, the tool can consider the case when the ET of a given block takes less than one cycle, when compiled into a hardware element. In such a case the tool is able to combine multiple of such blocks into a larger block that still fits into one cycle of the execution on the target hardware element. As an example, the IC of a first functional block and the OC of a second functional block may correspond in rate to each other one to one, and ET, II, IP and OP may match and sum to be less than one, e.g., are all equivalent to or round down to 0, and the generated program may be optimized or simplified with a control structure that is collapsed into a single control structure for one cycle.

Figure 17:
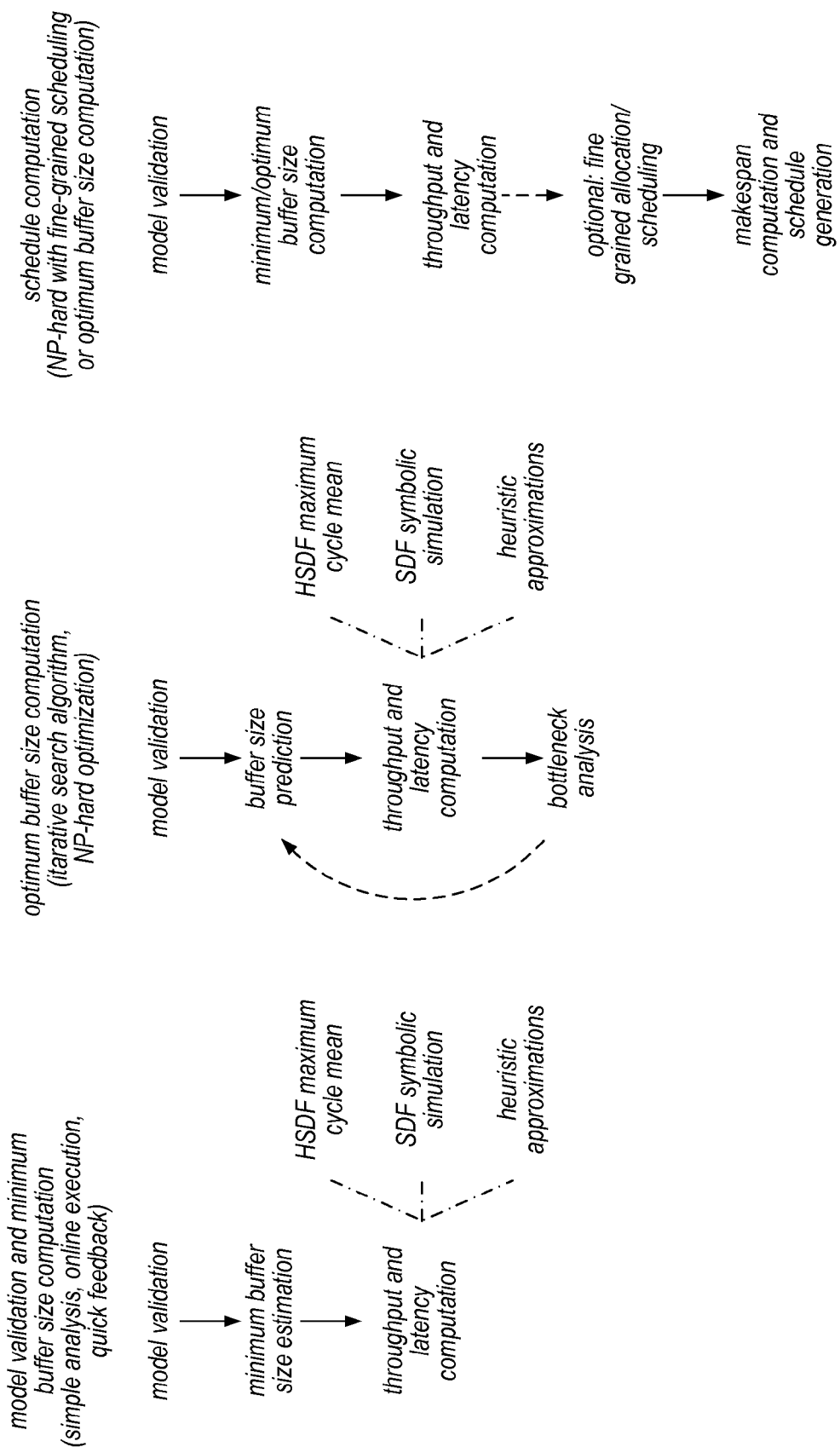
FIG. 17 illustrates exemplary algorithmic flow and dependencies between methods for exemplary analysis services, according to one embodiment.

FIG. 17 illustrates exemplary algorithmic flow and dependencies between methods for three prominent analysis services. In this example, model validation and minimum buffer size computation are fast analysis methods intended to provide immediate feedback. These methods, like type checking, may be run as a periodic background task during edit time. As shown, in this exemplary embodiment, model validation and minimum buffer size computation may include: model validation, minimum buffer size estimation, and throughput and latency computation. Moreover, the throughput and latency computation may include computing a HSDF (homogeneous static data flow) maximum cycle mean, executing an SDF symbolic simulation, or various heuristic approximations.

As also shown, in one exemplary embodiment, optimum buffer size computation may include: model validation, buffer size prediction, throughput and latency computation, and bottleneck analysis, where buffer size prediction, throughput and latency computation, and bottleneck analysis may be performed in an iterative manner. As above, the throughput and latency computation may include computing an HSDF (homogeneous static data flow) maximum cycle mean, executing an SDF symbolic simulation, or various heuristic approximations. Note that optimum buffer size computation and schedule computation are inherently NP-hard computations; however, the user may optionally choose to invoke approximate heuristics that do not guarantee optimality but which try to provide sufficiently good results. The DSP diagram and/or the designer tool may provide intuitive means, e.g., knobs, for the user to select a suitable effort-quality point and invoke the appropriate analysis method.

Thus, various embodiments of the above method and framework may facilitate development of constrained programs.

Actor Definition Language for Specifying Functional Blocks

The following describes methods and means for creating a functional block for use in a graphical program implemented in a graphical specification and constraint language. In some embodiments, the functional block may be useable to configure a programmable hardware element, such as an FPGA.

A primary feature of this approach is the inclusion of annotations in the functional block to aid in the development and/or optimization process. More specifically, embodiments of the techniques described herein may allow designers to create self-describing functional blocks (e.g., IP blocks) by annotating functional block information that can be used in both high-level models for user interaction and low-level models for underlying tool functionality. Each functional block may include a description of both the interface to the implementation (protocol) and the model of computation under which the functional block is to be analyzed. Prior art approaches usually provide an interface to the functional block that is tightly tied to its implementation in hardware, i.e., the user needs to use the low level protocol to interface that functional block with other functional blocks in the system. In embodiments of the approach disclosed herein, the user may utilize a high level model of computation (e.g. SDF, PCSDF (parameterized cyclo-static data flow), or HDF (heterochronous data flow)) in which it is easy to formally describe the relation between blocks, but the functional blocks may interact with the designer tool by providing low level protocol information to generate an efficient implementation.

Figure 18:
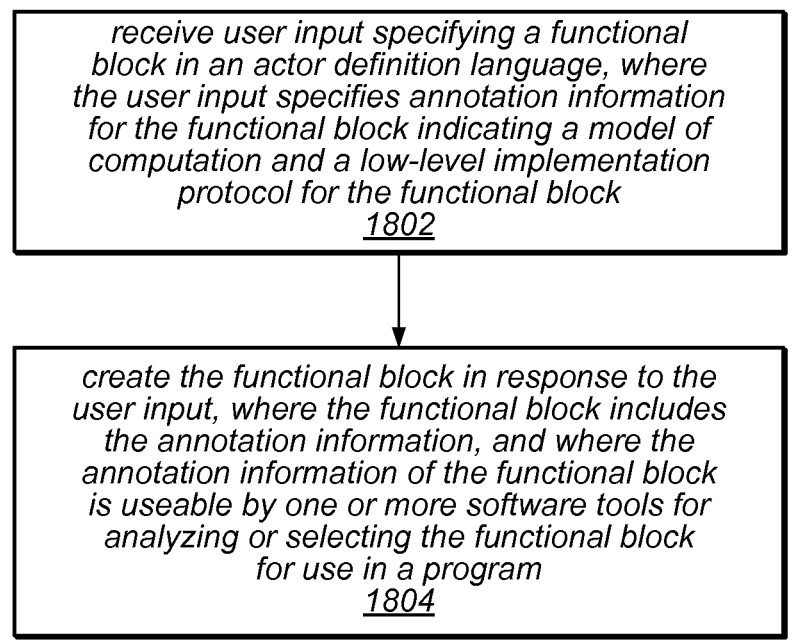
FIG. 18 is a flowchart diagram illustrating one embodiment of a further method for creating a program.

FIG. 18—Flowchart of a Method for Defining a Functional Block for a Program

FIG. 18 illustrates a method for developing a program. The method shown in FIG. 18 may be used in conjunction with any of the computer systems or devices shown in the above Figures, among other devices. In various embodiments, some of the method elements shown may be performed concurrently, in a different order than shown, or may be omitted. Additional method elements may also be performed as desired. Note that where method elements are the same or similar to method elements described previously, descriptions may be abbreviated. As shown, this method may operate as follows.

First, in 1802, user input may be received specifying a functional block in a graphical specification and constraint language. The user input may specify annotation information for the functional block indicating a model of computation and a low-level implementation protocol for the functional block.

In one embodiment, the annotation information may include one or more of the specifications or constraints described above with reference to FIG. 5.

As with the above-described specifications or constraints, in some embodiments, the annotations may have a standardized format, such that the functional blocks (e.g., IP blocks) can be described by third parties.

In 1804, the functional block may be created in response to the user input, where the functional block includes the annotation information, and where the annotation information of the functional block is useable by one or more software tools for analyzing or selecting the functional block for use in a program, e.g., a graphical program. Moreover, in various embodiments, any of the aspects and features described above regarding specifications or constraints may apply to the annotation information of the functional block.

In some embodiments, a programmatic interface may be defined to query functional blocks about their protocol interface and high level models they support, as well as supported configuration search or optimizations mechanisms (which may be used by the designer tool during design space exploration). In other words, a programmatic interface (e.g., API, tool, etc.) may be defined for utilizing the annotations in the functional blocks.

For example, SDF characteristics, actor timing, and data access patterns can be considered as defining different configurations of the actor. Thus, a programmatic interface may allow tools to query about those configurations. Different configurations in different contexts may yield different performance or take different amounts of resources. Optimization tools with a suitable programmatic interface can thus use annotations to search through the configurations and try to find optimal design points.

In some embodiments, the approach described herein may facilitate or provide for tool-assisted implementation of the functional blocks.

For example, in one embodiment, given the implementation of core logic of the functional block (e.g., provided by the designer or third party), a harnessing (or wrapping) mechanism may be provided for implementing a standard interface for inter-block communications. This harnessing mechanism may be negotiated between a tool and the functional block to agree on what harness should wrap or surround the functional block for proper connection to other functional blocks.

It should be noted that in some embodiments, the approach described herein may also be valid for software implementation; however, the implementation details and protocols would be different from those for hardware implementations (e.g., on FPGAs), although, at least in some embodiments, the model specification may be the same. For example, for software, the implementation protocol may be different from that of hardware. A common case may be function-call-like, where data transfer may be described at an abstract level as a chunk of data in the memory passed through the function by reference. A more detailed level might involve sequential transfer of data, such as with DMA (direct memory access). Thus, the same specification mechanism may be used for software directed functional blocks, but with different protocol/data access patterns.

In one embodiment, the programmatic interface may be utilized by various associated tool/editing/design time operations.

Moreover, in some embodiments, the annotations may be used to implement or facilitate advanced validation and optimization capabilities, such as for example:

1. Simulation at multiple timing accuracy levels, e.g. untimed simulation at the model of computation level and timed simulation at the implementation protocol level;

2. Abstract functional block compatibility checking regarding timing and communication protocols; or 3. Design optimization based on the additional implementation oriented information, e.g., buffer minimization by (partial) rate matching, among others.

Static Data Flow Actor Definition Language

The following describes exemplary embodiments of a static data flow actor definition language, and may be particularly useful for hardware implementation. For brevity, the static data flow actor definition language may be referred to simply as an ADL (actor description language).

Static dataflow is a popular model of computation for many application domains, including, for example, multimedia, signal processing, communication, etc. Currently, SDF models can be implemented by software in a much more streamlined way than by hardware. This is because traditional implementation platforms are generally based on DSPs or microprocessors. Therefore, SDF model implementation techniques have been extensively focused on software. However, with the rapid advance of the programmable hardware (e.g., FPGA) technology, SDF models are increasingly deployed on hardware, especially for those requiring high performance. Although the fundamental issues of SDF models, such as consistency, scheduling etc., remain the same, there are significant distinctions when deploying SDF models on hardware versus on software. For example, with software implementation, data exchange between actors is generally achieved by passing a reference that points to the data; in contrast, with hardware implementation, data are generally transferred physically from one actor to the next.

As a result, when describing SDF actors with hardware as the intended implementation, additional information can be introduced into the definition, so that the hardware implementation process will be more streamlined with assisting tools digesting the definition and generating the proper logic for connecting the actors consistent with the SDF semantics. Moreover, the actor definition may provide an exact description of the actor's behavior, not only of token flow at the SDF semantics level, but also a cycle accurate description at the implementation level. Therefore, the actor definition may serve multiple purposes: SDF behavior description, cycle accurate timing description, functional block (actor) integration guideline, etc.

The following describes one embodiment of an actor definition language (or language extension), in which a one-input-one-output actor is assumed. For multiple input/output actors, the techniques described may be intuitively extended.

TABLE 1

| SISO (single input-single output) ADL | | |
|---|---|---|
| | Parameter | Description |
| Traditional SDF Actor Definition | Input Count | The number of tokens consumed at an input terminal by one firing of the actor |
| | Output Count | The number of tokens produced at an output terminal by one firing of the actor |
| New Parameters with the Emphasis on Hardware Implementation | Execution Time | The number of cycles that an actor needs to finish its firing |
| | Initiation Interval | The minimum number of cycles from one firing of an actor to its next firing |
| | Is Exact | A flag indicating whether the execution time is an exact (constant) number or an upper bound (worst case) |
| | [Input Pattern] | A Boolean array. Aligned with the beginning of the firing. Each true value denotes the consumption of a token by the actor |
| | [Output Pattern] | A Boolean array. Aligned with the end of the firing. Each true value denotes the production of a token by the actor |

As may be seen, Table 1 presents various parameters which can be specified for a functional block or actor, and included as an annotation in the functional block. The first two—input count and output count—are known and used in traditional SDF actor definition, but the subsequent parameters are new, and may be particularly useful for hardware implementation. It should be noted, however, that the particular parameters and symbols (or acronyms) described are exemplary only, and are not intended to limit the ADL to any particular set of parameters or symbols.

As Table 1 indicates, input count (IC) indicates or specifies the number of tokens consumed at an input terminal by one firing of the actor. In other words, the value of IC denotes the number of input data elements consumed by the functional block each time the functional block executes (fires).

Output count (OC) indicates or specifies the number of tokens produced at an output terminal by one firing of the actor, i.e., the value of OC denotes the number of output data elements produced by the functional block each time the functional block executes (fires).

Execution Time (ET) indicates or specifies the number of (clock) cycles that an actor needs to finish its firing. In other words, the value of ET (e.g., in clock cycles) denotes the total number of clock cycles required to complete execution of the functional block.

Initiation Interval (II) indicates or specifies the minimum number of (clock) cycles from one firing of an actor to its next firing, i.e., the minimum time between successive executions of a functional block.

Is Exact (IE) is a flag indicating whether the execution time is an exact (constant) number or an upper bound (worst case), where, for example, a value of TRUE denotes an exact number.

Input Pattern (IP) is a Boolean array that is aligned with the beginning of the firing. Each true value in the array denotes the consumption of a token by the actor. In other words, the sequence of values in the IP correspond to at least a subset of the minimum number of clock cycles between successive firings of the functional block, where for each true value, an input token is consumed at an input terminal at or in the corresponding clock cycle. Thus, an IP of (1,0,1,0) indicates consumption of an input token (data element) at the input terminal every other cycle.

Output Pattern (OP) is a Boolean array that is aligned with the end of the firing. Each true value denotes the production of a token by the actor. Thus, the sequence of values in the OP correspond to at least a subset of the minimum number of clock cycles between successive firings of the functional block, where for each true value, an output token is consumed at an output terminal at or in the corresponding clock cycle. Thus, an OP of (1,0,1,0) indicates production of an output token (data element) at the output terminal every other cycle.

As noted above, input patterns and output patterns may be referred to collectively as access patterns.

In some embodiments, the input pattern and output pattern terms may be optional. For example, when not specified, the token consumption and production may be governed by runtime signals, and cannot be determined statically.

Thus, the above parameters may be used to annotate functional blocks, where the annotations are useable for a wide variety of purposes.

FIGS. 19-22—Examples of Annotated Functional Blocks

FIGS. 19-22 illustrate exemplary embodiments of annotated functional blocks (e.g., IP blocks). Note that in the following examples, the annotations are presented in the following format:

<IC, OC, II, ET, IE, IP, OP>

However, it should be noted that the format, e.g., order of parameters, and the particular parameters and symbols used are exemplary only, and that other formats and parameters/symbols may be used as desired.

Figure 19:
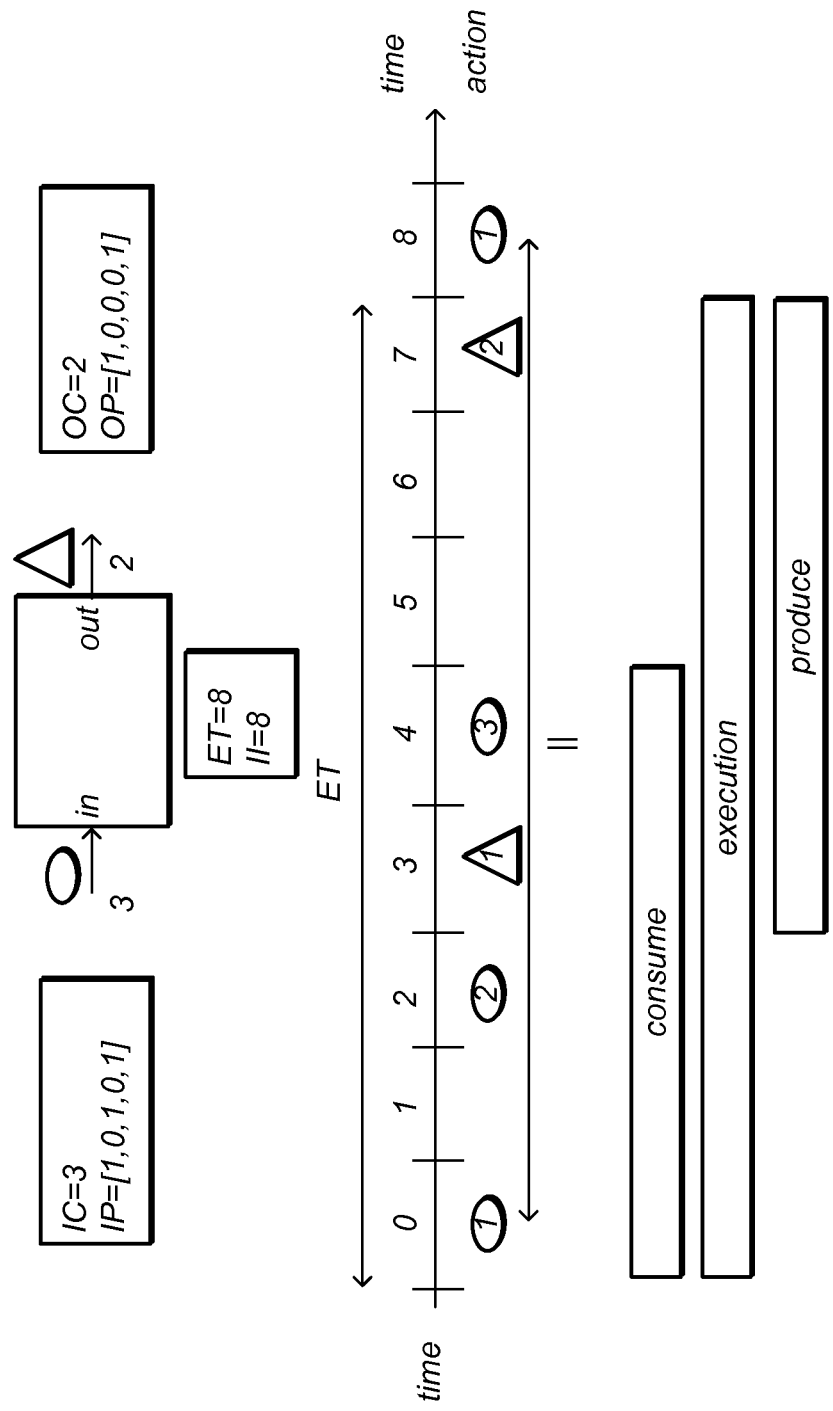

FIG. 19 illustrates a non-pipelined functional block (actor) with a specified exact execution time. As shown, the annotation for this functional block is:

<3,2,8,8,T,[1,0,1,0,1], [1,0,0,0,1]>

As indicated in FIG. 19, the input count (IC) for this functional block is 3, and the input pattern (IP) is [1,0,1,0,1], meaning that each execution of the block consumes three data elements, and these three data elements are consumed at a rate of one every other clock cycle during execution of the block.

A time-line shown below the functional block in FIG. 19 illustrates the activities of the functional block during execution per the annotation information, i.e., over the 8 clock cycles (cycles 0-7) between successive firings of the block (with the first cycle of the next firing shown as cycle number 8). For example, note that input to the functional block, represented by ovals (which are numbered in the time-line), are shown being consumed at cycles 0, 2, and 4 (and beginning again at cycle 8). As indicated by the "consume" bar below the time-line, the functional block consumes data between cycle 0 and cycle 4 (inclusively). As the annotation and time-line also indicate, the II (initiation interval) is 8 (clock cycles), meaning that the beginning of each firing is separated by 8 clock cycles.

Continuing through the annotation information, the execution time (ET) for this functional block is 8 cycles, which means that the block requires the entire II (also set to 8) to complete execution. The Boolean term Is Exact (IE) is set to True (T), thus indicating that the execution time (ET) is exact, not just an upper bound. The output count (OC) is 2, and the output pattern (OP) is [1,0,0,0,1], which means that two output tokens (data elements), indicated by triangles (numbered in the time-line) will be produced by the functional block during a single execution, and that the two tokens/output data will be produced at the fourth (cycle 3) and eighth (cycle 7) clock cycles. Note that the output pattern is aligned with the end of the execution period, whereas the input pattern is aligned with the beginning.

FIG. 20 illustrates a non-pipelined actor with worst case execution time, annotated thusly:

<3,2,8,8,F,[1,0,1,0,1], [1,0,0,0,1]>

As indicated in FIG. 20, the only difference in annotation with respect to the example of FIG. 19 is that "Is Exact" (IE) has a value of False (F). Thus, the execution time (ET) indicated is an upper bound, and thus is not a reliable indicator of when outputs will be produced. This lack of certitude in the execution time results in multiple possible output schedules, as indicated by the exemplary two cases shown below the time-line of FIG. 20. As shown, in case 1, the functional block executes over the entire II, and so the two output tokens are produced at cycle 3 (fourth cycle) and cycle 7 (eighth cycle), as with the functional block of FIG. 19. In contrast, in case 2, the execution only takes 5 cycles (cycles 0-4), and so, aligning the output pattern with the end of the execution gives cycles 0 and 4 as the output cycles, i.e., the clock cycles in which the functional block generates the respective output tokens/data.

Figure 21:
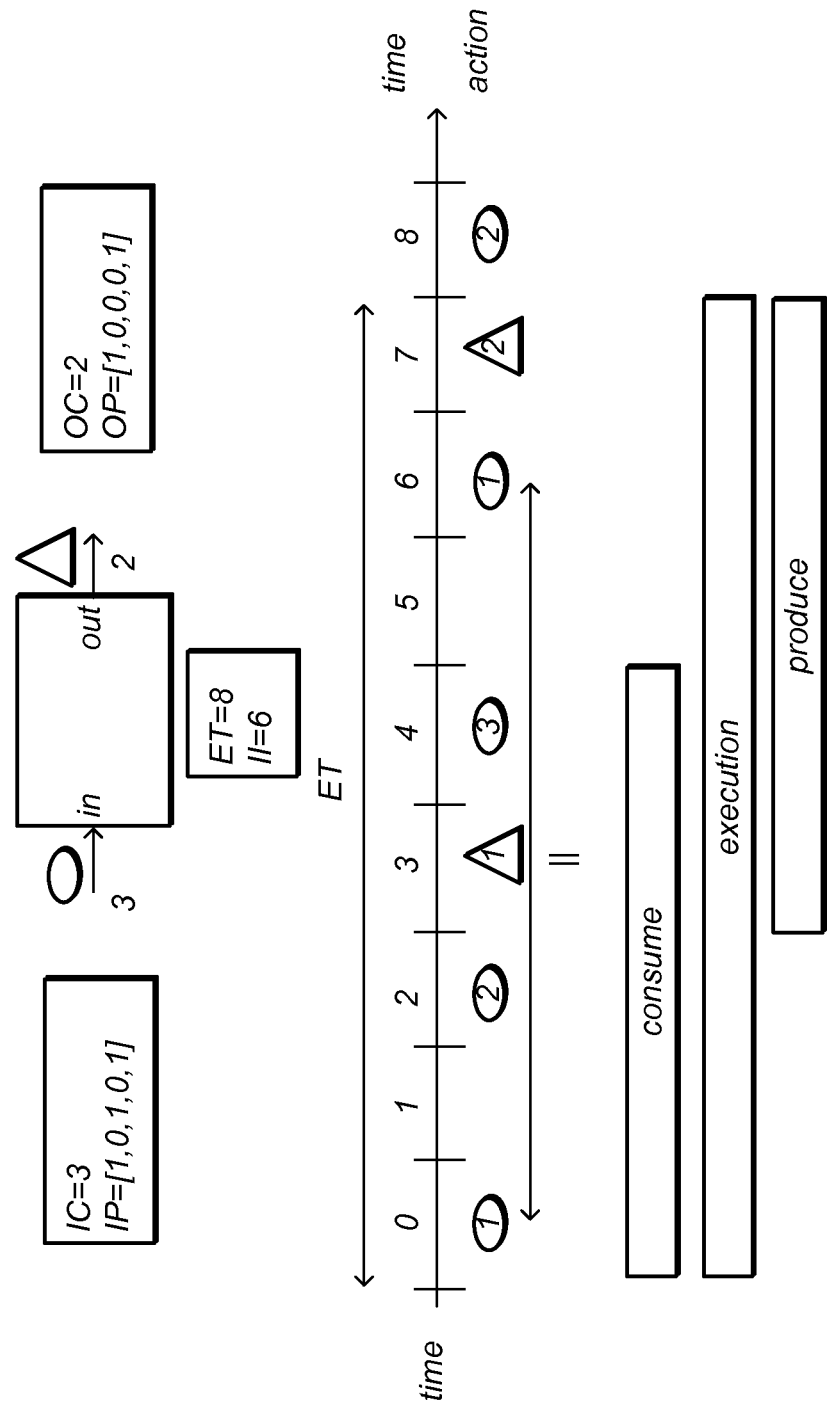

FIG. 21 illustrates a pipelined actor with exact execution time, annotated thusly:

<3,2,6,8,T,[1,0,1,0,1], [1,0,0,0,1]>

As may be seen, the only difference in annotation with respect to the example of FIG. 19 is that the II (initiation interval) is 6 rather than 8, which means that although the execution time is 8 cycles, and is exact, the functional block fires again after 6 cycles, as indicated by the time-line. Thus, the functional block executes over the entire II plus two clock cycles. Now, aligning the input pattern with firing cycle 0 (but in the subsequent firing, cycle 6) again gives cycles 0, 2, and 4 as input consumption cycles (but in the subsequent firing, cycles 6 and 8). However, since the output pattern aligns with the end of the execution time, the two output tokens are again produced at cycles 3 and 7.

Figure 22:
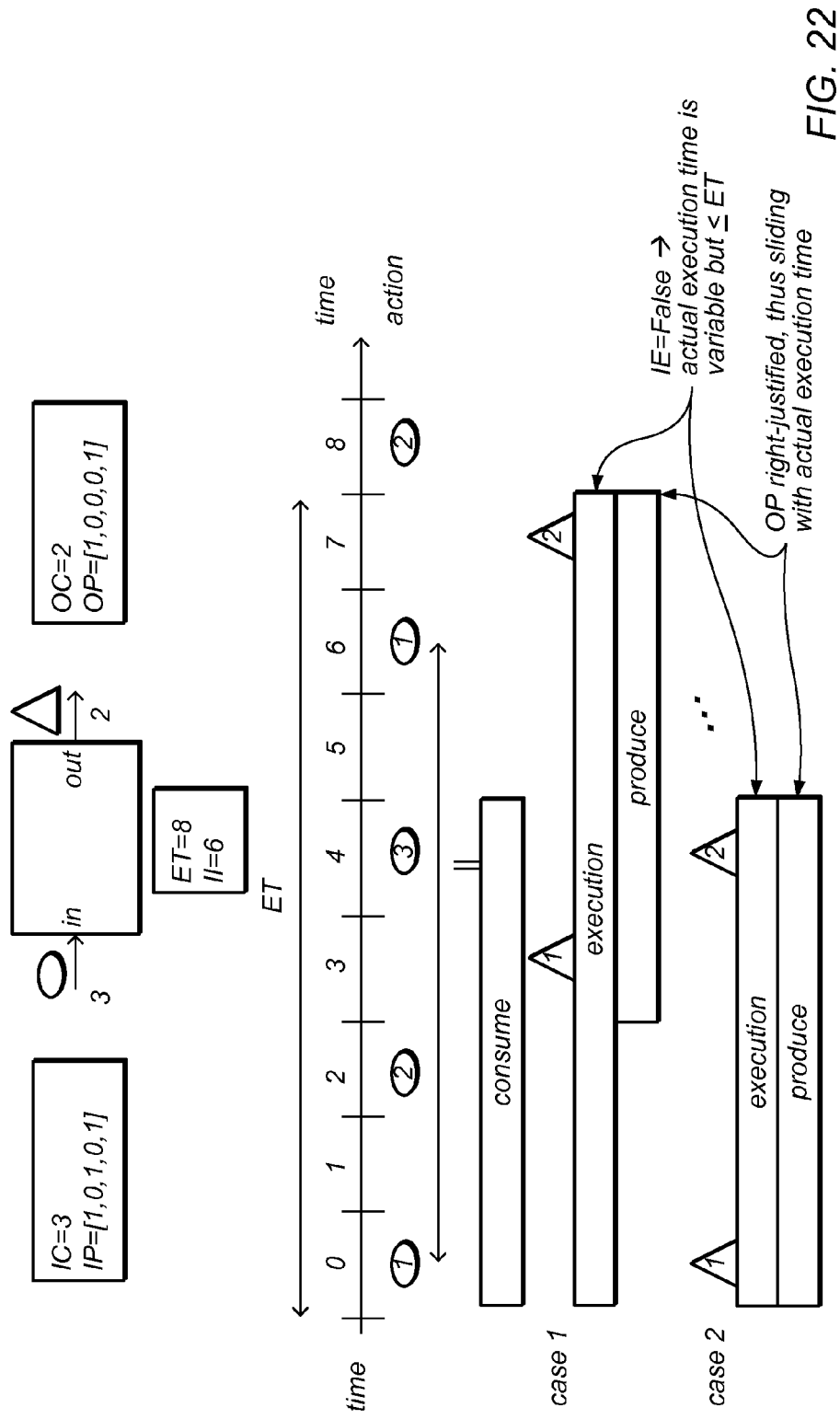

FIG. 22 illustrates a pipelined actor with worst case execution time, annotated thusly:

<3,2,6,8,F,[1,0,1,0,1], [1,0,0,0,1]>

In the example of FIG. 22, all annotation terms are the same as the example of FIG. 18, except for "Is Exact" (IE), which has a value of False (F), and the II, which is 6 (as with the example of FIG. 21. Thus, regarding the two exemplary cases shown below the time-line in FIG. 21, and the input and output patterns, inputs are consumed on cycles 0, 2, and 4 (then subsequently in cycles 6, 8, and 10 (not shown)); in case 1, with execution time of 8, outputs are produced at cycles 3 and 7, whereas in case 2, with execution time of 5, outputs are produced at cycles 0 and 4.

In some embodiments, additional information maybe included in or added to the tuple of information, e.g., information regarding the internal implementation of the actors, such as the use of output buffers that could eventually be used by the designer tool for rate matching optimizations, or the existence of combinational implementation options that can be used for fusion optimization, among others.

Extension of ADL to Actors with Multiple Inputs and Multiple Outputs

As noted above, the techniques disclosed herein are also applicable to functional blocks with multiple inputs and/or outputs.

For example, in the seven tuple<IC, OC, II, ET, IE, IP, OP>, II, ET and IE are explicit parameters for actor timing, and may apply to all actors regardless of the number of inputs and outputs. Each of the other four parameters is for just one input or output. When the ADL is extended to multiple inputs and outputs, the four parameters may be augmented with an additional dimension. For example, the input count for a two-input actor may become a vector, e.g., IC_m=<3,2>; and the input pattern for the same actor may be a matrix, e.g., IP_m=<[1,1,1,0], [1,0,1,0]>. Thus, one embodiment of the augmented seven tuple for multi-input-multi-output actors may be:

<IC_m, OC_m, II, ET, IE, IP_m, OP_m>.

Meta Patterns

In the representation above, matrices are used to capture all the possibilities of <IP> and <OP>, but may be resource and/or computationally intensive. However, a significant percentage of actors (functional blocks) demonstrate certain patterns across all the inputs and/or outputs, referred to herein as "meta-patterns". A meta-pattern can be applied to a single IP or OP, or used as a type of "short hand". For example, when only one meta-pattern is specified for all the IPs or OPs, the meta-pattern may apply to each and everyone pattern in the set.

Exemplary meta-patterns include the following:

1. meta-pattern 1—evenly distributed.

An evenly distributed meta-pattern takes one optional parameter, range. It specifies the number of clock cycles over which all the tokens (n) will spread out evenly. By default, the range is equal to II, but the user can indicate a smaller range, in which case, range may be left-justified for inputs, and right-justified for outputs. In one embodiments, the relationship between n and range is:

when n>1, there exists a non-negative integer k, s.t. n+(n−1)k<=range<n+(n−1)(k+1). In this case, all the tokens will be separated by k cycles, and the first token comes in the first cycle for inputs, or the last token comes in the last cycle for outputs;

when n=1, the only token comes at the center cycle of the range if range is odd; if range is even, the token comes at the cycle before the center for inputs, or the cycle after the center for outputs.

2. meta-pattern 2—"as soon as possible" (ASAP) or left packed.

As its name suggests, all the tokens may be packed one per cycle at the beginning (left-hand side) of the range. Note that ASAO works the same way for inputs and outputs.

3. meta-pattern 3—"as long as possible" (ALAP) or right packed.

In this meta-pattern, all the tokens may be packed one per cycle at the end (right-hand side) of the range. Note that, like ASAP, ALAP works the same way for inputs and outputs.

The following describes various examples of meta-patterns:

Suppose actor A has two inputs and one output. A partial characterization of the actor is <<3,2>, <2>, 5, 10, True, [ ], [ ]>.

<<3,2>, <3>, 5, 10, True, even, even>=<<3,2>, <2>, 5, 10, True, [10101, 10001], [10101]>

<<3,2>, <3>, 5, 10, True, (even,3), even]>=<<3,2>, <2>, 5, 10, True, [11100, 10100], [10101]>

<<3,2>, <3>, 5, 10, True, [(even, 3), (even,4)], [even,3]>=<<3,2>, <2>, 5, 10, True, [11100, 10010], [00111]>

<<3,2>, <3>, 5, 10, True, asap, alap>=<<3,2>, <2>, 5, 10, True, [11100, 11000], [00111]>

<<3,2>, <3>, 5, 10, True, (alap,4), (asap,4)>=<<3,2>, <2>, 5, 10, True, [01110, 00110], [01110]>

... (and so forth).

This mechanism may be implemented or complemented with a GUI that shows the actual patterns. In addition, various symbols or layout icons or buttons may be provided for graphical interaction with users. For example, icons/buttons similar to those used to indicate text justification (formatting) in work processor programs may be used to represent and/or specify meta-patterns.

In addition to the access patterns summary description for a particular block, one embodiment may allow a high-level description of the salient observable or internal states of a functional block via a state machine or set of state machines, that describe the state and time at which input tokens are consumed, the state and time at which output tokens are produced, and the relation between inputs and outputs by yet another state machine or general function. Such a set of state machines may be described on the interface of the block, similar to IP and OP, described above.

Extensions of ADL to CSDF and PCSDF

When representing actors within a CSDF or PCSDF environment, the ADL description for SDF actors described above may be extended in multiple dimensions to reflect the multiple phases in CSDF description, and the multiple configurations that are represented by parameters selectable when the actor is instantiated. Furthermore if the model is 0-1 CSDF, then a restriction is imposed on the valid values in the multi-dimensional matrix that represents it, e.g., for IC and OC, and consequently for ET, II, IC, and OC. It should be noted that actors that can take multiple cycles for a computation can have an IP with pattern (1, 0, 0, 0, . . . ), where a token is consumed in a first phase, then compute for 3 more cycles, and then have a corresponding output pattern OP (0, 0, 0, 1).

Figure 23:
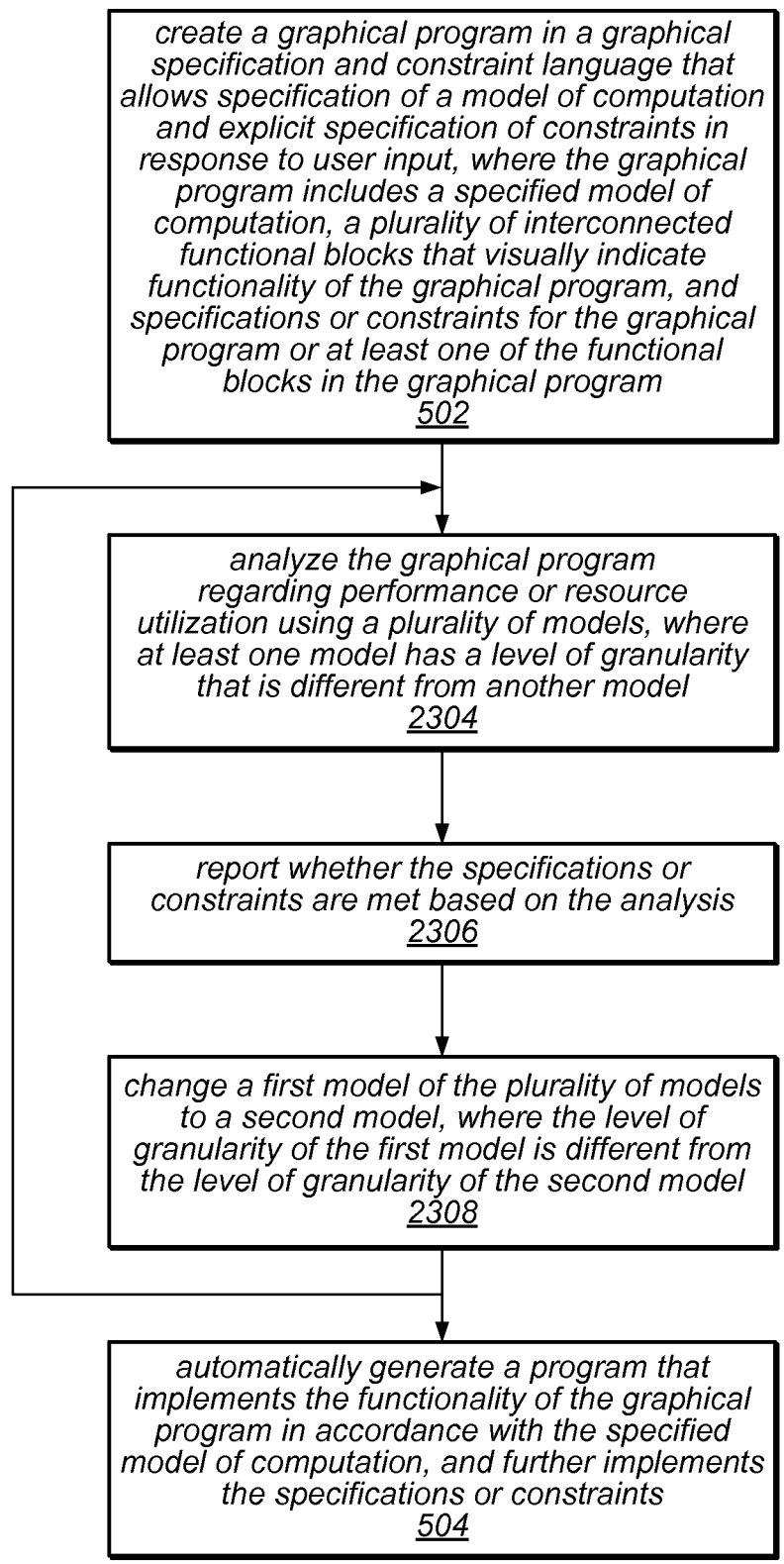
FIG. 23 is a flowchart diagram illustrating one embodiment of yet another method for creating a program, using models of different resolutions.

FIG. 23—Iteratively Varying Model Resolution Based on Estimation

FIG. 23 illustrates a method for creating a program. The method shown in FIG. 23 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, a graphical program may be created in a graphical specification and constraint language that allows specification of a model of computation and explicit declaration of constraints, similar to those described above. The graphical program may include a specified model of computation, a plurality of interconnected functional blocks that visually indicate functionality of the graphical program in accordance with the specified model of computation, and specifications or constraints for the graphical program or at least one of the functional blocks in the graphical program.

In 2304, the graphical program may be analyzed, including the constraints, thereby generating analysis results regarding performance (e.g., timing) or resource utilization. The analysis may be performed prior to conversion of the graphical program to a hardware description (e.g., the analysis may be performed at a specification level).

In one embodiment, the analysis may involve estimating the performance or resource utilization for the plurality of functional blocks using a plurality of models. Each model may have an associated level of granularity (also referred to as resolution or accuracy). Thus, a model having high resolution may be more accurate in terms of performance and/or resource utilization, but may require more computation/time for the estimation. Additionally, different models may be used for different portions of the graphical program. For example, a first model may be associated with a first one or more functional blocks within the graphical program and a second model may be associated with a second one or more functional blocks within the graphical program. The first model may have a different level of resolution than the second model. According to various embodiments, the level of resolution may be specified manually by the user or may be specified automatically, e.g., according to various thresholds or heuristics.

In some embodiments, at least some of the plurality of models may be stored in a database keyed by a combination of functional block identification, the specified model of computation, the specification or constraints, and functional block interconnections. The database may be a global database or a distributed database, or any other type of database as desired.

As one example, a first functional block may relate to a filtering function. There may be two models associated with the filtering function, e.g., a first model that uses prior filtering data to predict the performance and/or resource utilization of the filtering function (e.g., based on prior filtering data) and a second, higher resolution model that is able to provide cycle accurate simulations of the filter. Accordingly, the first model may be at a lower level of resolution than the second model, but may provide an estimation more quickly than the second model. Thus, the analysis of the graphical program may utilize various models of different levels of granularity for estimating the performance or resource utilization for the plurality of functional blocks.

Based on the analysis of 2304, in 2306, the method may report whether or not the specifications or constraints are met based on the analysis results, similar to descriptions above.

In 2308, at least one model of the plurality of models may be changed based on the analysis (2304) and/or reporting (2306) above. For example, at least a first model of the plurality of models may be changed to a second model that is at a different level of granularity or resolution. This change of model may be performed manually (by the user specifying the change of granularity) or automatically (by software specifying the change of granularity, e.g., based on thresholds or heuristics).

For example, where a model of a functional block (or portion of the graphical data flow diagram) has not been changed in the last iteration (or several iterations), it may be assumed that that model does not require further changes, and a more accurate model may be used in order to provide a better estimation for that portion of the graphical program. This may be especially beneficial for later iterations since the estimate for that portion may be reusable without further computation. Similarly, a model or functional block may be changed to increased resolution where that portion of the graphical data flow diagram has met its specified constraints.

In further embodiments, models or functional blocks that are undergoing many changes or are outside of a threshold from the specified constraints may automatically have lower levels of resolution (e.g., since knowing exactly how deficient the present design is largely unnecessary outside a certain threshold).

Similar to above, the plurality of models may have different levels of granularity after 2308. Alternatively, all of the models may be at the same level of granularity, e.g., in 2304 and/or 2308. However, in one embodiment, at least one of the originally used models or the modified models has a different level of granularity for a first portion of the graphical program than another model (within the same set of models).

As shown, the method may repeat the analysis, reporting, and changing in an iterative fashion (e.g., until the constraints are met and/or the models have all reached a desired level of resolution). Note that in the final iteration, where an end condition has been met, the changing in 2308 may not be performed.

In 504, as described above, a program that implements the functionality of the graphical program in accordance with the specified model of computation and implements the specifications or constraints may be automatically generated. The program may be used for programming a programmable hardware element (or for generating a hardware description for programming the programmable hardware element).

Further Embodiments

The following describes various embodiments of iterative refinement of sub-block timing and resource estimation technique for design space exploration of a graphical program. Generally, timing and resource estimation may be used for design space exploration, including FFT timing information, clumping estimations, and iteration of these estimations. More specifically, timing and resource estimation may be used for early feedback to the user. Iterative refinement of timing and resource models may be used based on higher level constructs. These models may be used for feeding back more accurate modeling results to the tool. Additionally, different model approximation resolutions may be used for different subsets of a diagram during design.

Graphical programs according to some embodiments of the invention may be based on a model of computation that is suitable for modeling of timing characteristics of compiled design at a high level of abstraction. Based on a number of measurements of the characteristics of the individual actors on the target device, and a model of the interaction of these actors within a given application, a quick estimate of the timing may be generated. In some embodiments, the high-level estimate may be accurate to about 30% of actual, which may be useful for both user decisions as well as automatic design space exploration.

In general, high-level timing analysis plays a critical role in achieving an efficient FPGA-based hardware design (although embodiments described herein are not limited to hardware designs and may also apply to software). Timing analysis can be performed at cycle level or sub-cycle level: cycle-level timing analysis reports latency in clock cycles while sub-cycle-level timing analysis estimates execution delay in nano/pico seconds. To enable early compile-time timing analysis, a library that contains corresponding timing characterization of each building construct may be used. In the following, characterization of sub-cycle level execution delays and how this could enable a compile-time (high-level) timing analysis at the sub-cycle level are described, which may be used to facilitate automatic design space exploration. Furthermore, the following also describes analysis heuristics that may be used to model parameters including resource utilization, options to synthesis tools, etc. to improve estimation accuracy.

To expedite and ease the design process, and as described above, the system-level design environment may provide functional blocks, e.g., high-level building primitives, such as IP blocks. Generally, prior art systems utilize timing analysis after either mapping or PAR. Post-mapping timing analysis requires that logic synthesis be completed while post-implementation timing analysis occurs after placement and routing are finished. It is well known that both logic synthesis and placement and routing may take a long time.

In the present embodiments, timing analysis and optimization may be performed at a high level, e.g., at the specification level. As indicated above, the timing analysis and optimization may be at cycle level (in clock cycles) or at sub-cycle level (in nano seconds). Accordingly, there are two levels of delay characteristics of building constructs to enable the above mentioned analysis and optimization.

Timing characteristic of primitives is only known after FPGA compilation. As mentioned above, this may take a long time. Even worse, it may report a timing error. Thus, in embodiments described herein, timing and resource estimation may be performed at the specification level through platform modeling. Platform modeling may be based on (or include) user's specification of the platform based on a tool vendor provided platform library. An example of user specification of a platform is a particular FPGA platform used for design implementation and examples of platform library include timing library, resource library, and/or power library, etc.

The following provide examples of analysis and optimization that may be performed.

Find critical path—Compute the worst-case execution time in nanoseconds of the longest path in an identified combinational sub-diagram that will be implemented on an FPGA platform at some clock frequency.

Predict whether logic will likely fit in the specified clock period—Compare the predicted worst-case execution time (WCET) with the specified clock period and report whether combinational delay will likely fit in the specified clock period.

Compute fastest feasible clock rate—Convert the predicted WCET to frequency and report it as the fastest feasible clock rate.

Automatic pipelining/fusion—When WCET prediction suggests logic could not fit in specified clock period, pipeline/fuse computation to achieve the specified clock rate.

Re-timing—When WCET prediction suggests logic could not fit in specified clock period and there are multiple registers in the feedback loop, re-time computation by moving registers around to achieve the specified clock rate.

As indicated above, a platform component characterization library may be provided that allows for automatic (tool) or manual (user) early design space exploration. This exploration may be performed by:

Measuring the performance of primitives on the selected target.

Using those measurements, in combination with a number of (analysis) models, to describe the behavior of a user-provided (high-level) application description. These models may include heuristics to describe some of the effects of a stack of possible compiler optimizations techniques, as well as some platform abstraction mechanisms. Additionally, Different models can be applied to different parts of the user provided application description.

Refining the data in the timing library by analyzing the results of full compilation of an application on the end-user machine especially if the estimate is not close to the result of the full compilation.

Performance is one example of the resources, and similar techniques may be applied to area and power.

Exemplary Enabling Assumptions:

The measurement/characterization may be performed at the same level of granularity as the basic primitives in the application domain and not just as primitives in the platform domain. This may provide more accurate data, by incorporating at least part of the mapping information. Accordingly, the lowest level logic optimization problem can be better abstracted and more traditional compiler level optimization may only be relevant.

Additionally, the programming language/environment (e.g., designer tool) may have some limited control choices, so that the traditional compilation stack transformations can be more easily abstracted, or may only require basic transformations that can execute quickly.

Specific Variants:

Do as above with refinement loops, either by adding pattern information back (see below), or extracting information about individual actors, by including possible observers into the generated code.

Do as above with some light optimization at the higher layers (to better model traditional compiler flow) (see FIG. 23).

Do as above based on µ-Architecture abstraction of some of the platform components (e.g. FPGA LUTs to µ-units).

Do as above with end-user replaceable platform libraries.

Do as above where the application model uses not just individual actors, but looks at "patterns" of actors, and/or the interaction between actors.

Do as above where the application model looks at markers (number of actors, number of inputs or outputs, word length, number operators, etc.).

Do as above where the application model uses part/resource utilization information.

The timing library as above, but storing further parameters besides clocks, data type (including basic type, or particulars of rounding, etc.), implementation strategy (optimization of speed or area), etc. or some basic patterns.

The description of the timing information for each actor whose ET is equivalent to 0 (sub-cycle) based on a vector that describes information of first stage, last stage, and the longest of the stages in between (wcet_l, wcet_r, or wcet_m). In other words, the vector comprises the delay before functional block input registers, the delay after functional block output registers, and the maximum combinational delay between registers of the at last one functional block.

The description of the timing information for each actor whose ET is greater than or equal to 1 and that has multiple possible configurations (e.g. including multiple possible IC, OC, ET, II, IP and OP for different models of computations, specifications or constraints) based on a value for the maximum delay between functional block registers from a configurations determined based on model of computation, specifications and constraints.

Actor specific information, e.g. memory implementation options (Block RAM, LUTs, etc.).

As above, but also relate the implementation of individual actors to information about timing and platform, so that they can interact with the tool to be the run-time repository of this information. As above, where the configuration information is provided by the actor. As above, where the actor relies on a separate database (e.g. a global or distributed database) to implement access to specific information.

Alternatively, HDL may be generated and then estimated at that level.

In order to support compile-time timing analysis for designs targeting FPGA platforms (or other types of platforms), a timing library may be constructed (e.g., prior to use, e.g., in the development environment) that characterizes the execution delays of the FPGA programming primitive constructs. The timing delay characteristic of building constructs may be FPGA platform specific and moreover dependent upon the clock frequency. Therefore, this data may be aggregated across different platforms, e.g., systematically.

To characterize the timing property of the functional blocks, their execution time in the worst-case scenario should be considered, which is usually called Worst-Case Execution Time (WCET). In the following, methods for obtaining timing characteristics to generate a timing library database as well as how to use timing library services are discussed.

To automatically gather WCETs of building constructs, an instrumentation circuit for each primitive/function block may be generated for each FPGA platform. Additionally, regular FPGA compilation (e.g., from graphical programs) may be used to synthesize and implement the generated program. Next the generated timing report may be imported into various software tools, such as PlanAhead™, provided by Xilinx, Inc., which may export a corresponding report with detailed path information. Finally, the report may be processed (e.g., post processed) to extract the WCET of the primitive and automatically generate timing library database.

To support pre-synthesis (or pre-HDL code generation) timing analysis, the data structure representing system specification may be annotated with the pre-characterized primitive delay property. At compile-time, a longest path analysis can be performed to predict the WCET of the corresponding FPGA implementation.

The data types supported for FPGA implementation are mainly Boolean, integer, and fixed point, although other data types are envisioned.

Ideally, the database or library may have explicitly recorded all widths integer and fixed point data types. Practically, to prevent the database from becoming too large, inner interpolation may be used to estimate the WCET for those widths that cannot be directly found in the library. For a good estimation, the inner interpolation may be performed based on the information of its immediate lower/higher width configurations available in the timing library. The following formula may be used to compute the estimated WCET of the currently requested input data type configuration.

$$wcet_w = wcet_{lw} + (wcet_{hw} - wcet_{lw})*(w-lw)/(hw-lw)$$

Depending on the intra-cycle level timing library database, two types of timing models may be used. There are three entry points which may be used to obtain routing information, e.g., no routing, estimated, and real-implementation. Experiments show that using real-implementation routing delay to characterize a primitive is not a good choice since routing delay is more design specific.

In some embodiment, a routing delay allowance model may be used. This model uses the pure logic delay as the worst-case execution time of the primitives. To predict the total delay, the timing model requests from the library a percentage allowance to account for the routing delay from the nets.

For a simple version of the Routing Delay Allowance Model, WCET of the longest path may be scaled by a single routing allowance percentage, which models routing delay contribution:

$$totalDelay = computedTotalLogicDelay*(1 + routingDelayAllowancePercentage)$$

For an advanced version of the Routing Delay Allowance Model, the WCET of the longest paths may be scaled by possibly different routing allowance percentages based on the path component characteristics.

Alternatively, or additionally, an estimated routing delay model may be used. In this timing model, the worst-case execution time of primitives in the timing library may include both logic delay and corresponding estimated routing delays.

Furthermore, multiple actors or functional blocks may be considered together when performing estimation. Together, these functional blocks form patterns whose performance or resource estimation may be better as whole that compared to addition of individual components. In one embodiment, information about such patterns and corresponding models can be used for estimation.

One possible pattern to consider is the fanout, i.e. the number of interconnection from one an output terminal of a block to possibly multiple input ports in one or multiple functional blocks.

Similarly the number of functional blocks in a given graphical program may affect the estimation, so it should be considered as a possible pattern by which to adjust the overall estimation, or estimation of portions of a graphical program.

The following describes an exemplary API that may be used to access the database.

Primitive information: ID, Input data type configuration (rounding mode, overflow mode), Implementation configuration (pipelining vs. non-pipelining; BRAM vs. LUT)

FPGA platform information: Part number, Clock frequency,

Implementation strategy, Area vs. Speed

Routing model, Pure logic delay plus routing allowance vs. total delay with estimated routing.

The return value encodes the primitive's timing characteristics: for a non-pipelined primitive, a single number may be used to record its WCET; for a pipelined primitive, a tuple may be used to record the timing characteristics of individual pipeline stages.

One of the most challenging challenges in timing analysis and optimization is to model/characterize the routing delay. Routing for Boolean operators may contribute significantly to the total delay (close to 100%). However, for arithmetic operators, routing contribution is about 50%. Based on this observation, a refined routing allowance percentage may be applied based on the characteristics of the components along the critical path.

A second technique that can be used to predict execution delay is based on incorporating the detailed FPGA hardware resource characteristics. For example, any logic component that has no more than 6 single bit inputs can be implemented by a single LUT in a Virtex V platform. With this, accurate timing estimation may be achieved for sub-components in a system.

Early "pre-synthesis" WCET estimation may be based on timing characteristics from platform library. An FPGA compilation timing error may imply that the utilized timing model (especially for routing) is not perfect (e.g., timing analysis engine under-estimated the worst-case execution time). For a new round of analysis, the analysis and optimization engine should be able to take advantages of the timing results obtained from last compilation. Note that it makes sense to use delay consisting of post-implementation routing nets as feedback since it is brought back to the same design with the same configuration. Furthermore, the timing library database can be updated/refined based on the same information.

In summary, the above-described timing library may serve as an input analysis and optimization engine. With the pre-characterized execution delay information, pre-synthesis (we-code-generation) timing analysis and optimization can be performed on the data structure representing the design. With the capability of incorporating the detailed timing information from last round of compilation, timing analysis and optimization is achieved.

FIGS. 24-28

Figure 24:
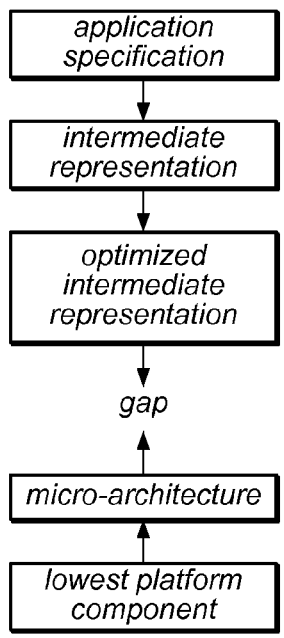
FIG. 24 is an exemplary flow diagram illustrating the gap between top down and bottom up design, according to one embodiment.

FIG. 24 is an exemplary flow diagram illustrating the gap between top down and bottom up design. As shown, in top down design, an application specification may be initially specified, which may be used to create an intermediate representation. The intermediate representation may be optimized. From the bottom up, the lowest platform components may be used to create a micro-architecture. Between the two approaches, a gap exists, which may be fulfilled by the embodiments described herein.

Figure 25:
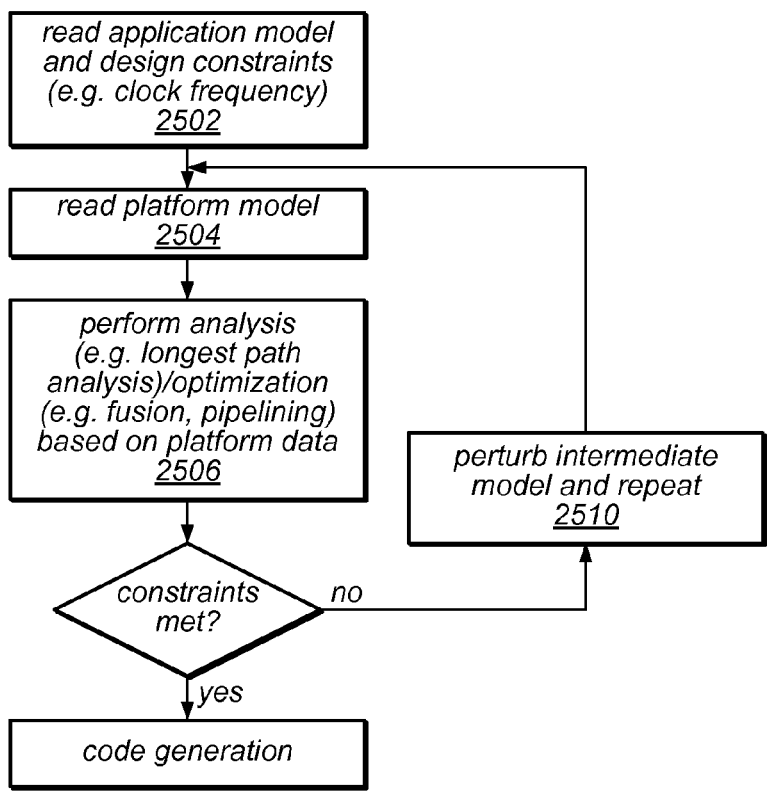
FIG. 25 is a flow chart of an exemplary method for generating code, according to one embodiment.

FIG. 25 is a flow chart of an exemplary method for generating code. As shown, in 2502, the application model and design constraints (e.g., clock frequency) may be read. In 2504, the platform model may be read. In 2506, analysis may be performed (e.g., longest path analysis) and optimizations may be performed (e.g., fusion, pipelining, etc.) based on the platform data. In 2508, if the constraints are met, code is generated in 2512. If they are not, in 2510, the intermediate model may be perturbed and 2504 and 2506 may be repeated.

Figure 26:
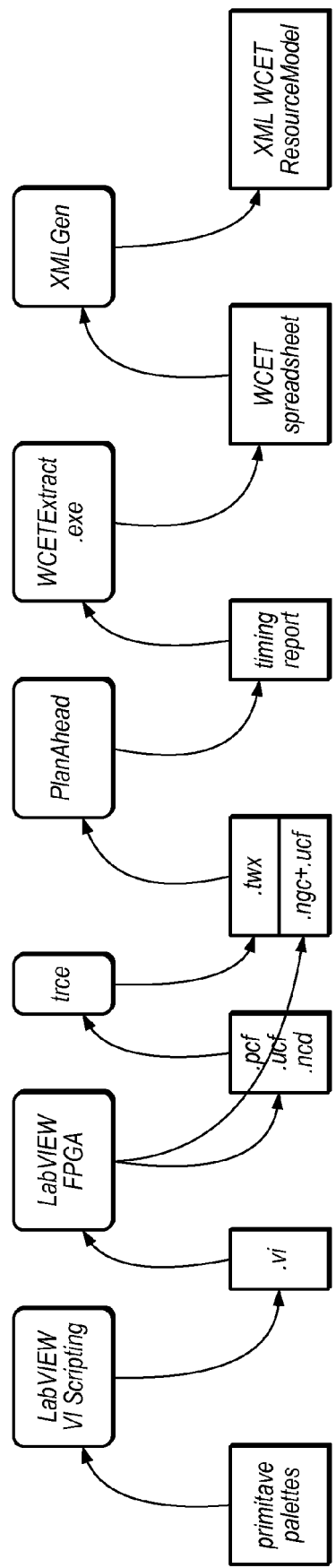
FIG. 26 illustrates an exemplary process flow for populating models or databases, according to one embodiment.

FIG. 26 illustrates an exemplary process flow that may be used to populate models or databases in embodiments described above. As shown, LabVIEW VI scripting may generate .vi (graphical programs) using primitive palettes. Lab-VIEW FPGA may generate various files as part of a hardware generation process (including .pcf, .ucf, .ncd; trce, .ngs+.ucf, .twx, etc.). The .twx may be used to generate a timing report (via PlanAhead) which may be used to extract a WCET spreadsheet via an extraction program. XML may be generated from the WCET spreadsheet, which may implement or be included in the XML WCET ResourceModel.

Figure 27:
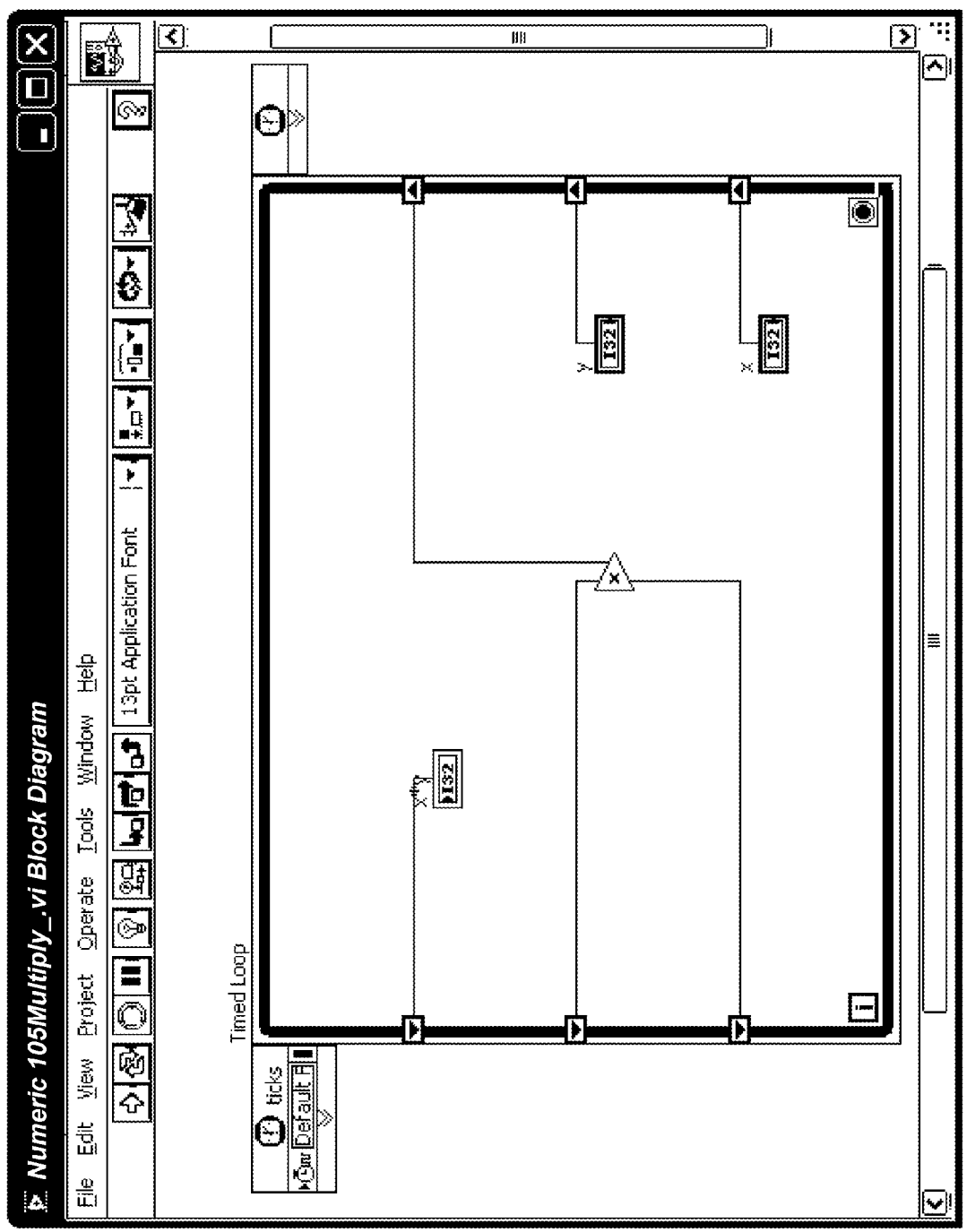
FIG. 27 illustrates an exemplary graphical program that may be used to generate a timing report that may be imported into a third party tool, according to one embodiment.

FIG. 27 illustrates an exemplary graphical program that may be used to generate a timing report that may be imported into a third party tool, such as PlanAhead™, provided by Xilinx, Inc.

Figure 28:
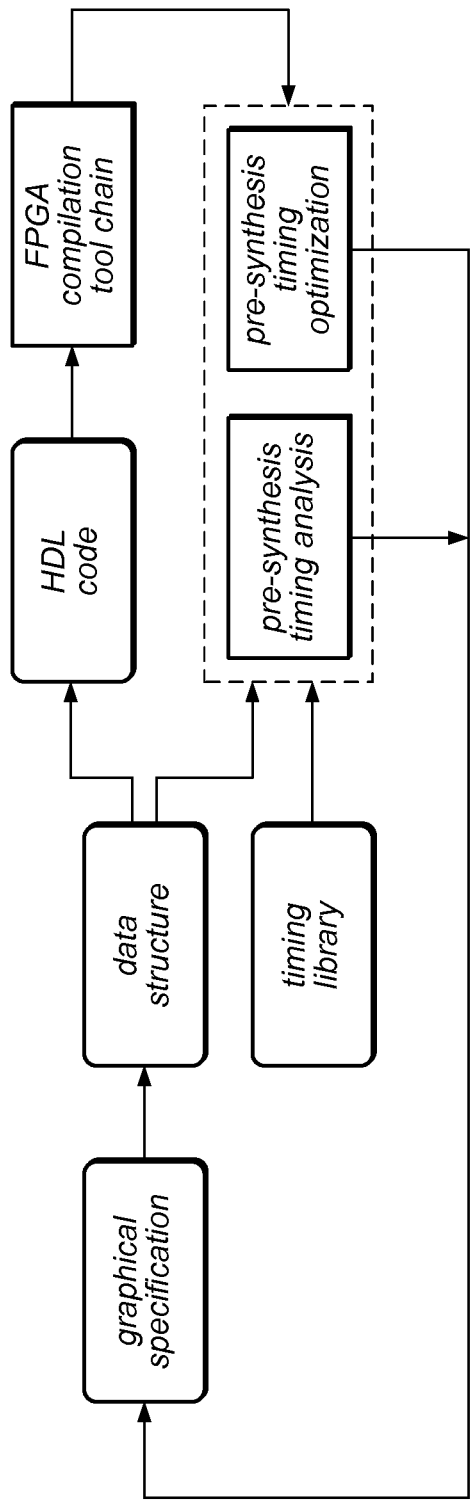
FIG. 28 illustrates an exemplary process flow, according to one embodiment

FIG. 28 illustrates an exemplary process flow according to one embodiment. As shown, the process may begin with graphical specification, which may be described in a data structure (e.g., the graphical program). The data structure may be analyzed and/or optimized using a timing library, which may be used as feedback into modifying the graphical specification. Additionally, or alternatively, the data structure may be used to generate HDL code, which may be analyzed, and/or optimized, and may return back to the graphical specification for further changes. Note that while this process flow involves timing analysis, similar process flow may apply to performance, resource utilization, etc.

Generation of a Timing Accurate Simulation from a Graphical Program

As noted above, in some embodiments, various of the above techniques may be used to generate a simulation, e.g., a timing accurate simulation (which may include emulation), from a graphical program. In other words, in some embodiments, instead of, or in addition to, the above described generation of a program based on a graphical program (subject to a specified model of computation and specifications or constraints), the method may generate a timing accurate simulation of the graphical program. The generated simulation may support or facilitate various debugging capabilities at the level of the model of computation and specifications or constraints.

For example, in one embodiment, break points may be provided (i.e., supported by the designer tool or development environment) at the level of the model of computation and specifications or constraints. Additionally, the designer tool may provide visualization displays and may capture user or environment input at the level of the model of computation and specifications or constraints. As another example, the designer tool may provide or support token flow probes at the level of the model of computation and specifications or constraints.

In some embodiments, at least some of the specified model of computation and specifications or constraints may be projected onto a lower dimensional space to simplify or increase performance of the timing accurate simulation. Additionally, in one embodiment, the projection may be directed to a specified portion of the graphical program. Moreover, multiple projections may be used, or the dimensionality of the projection may change. For example, the analyzing and generating of the timing accurate simulation may be repeated in an iterative manner, where during the repeating, the dimensionality of the projection may be changed, thereby changing the generated timing accurate simulation.

In one embodiment, the timing accurate simulation may include a first portion generated via projection of the at least some of the specified model of computation and specifications or constraints into a lower dimensional space of a first dimensionality, and a second portion generated via projection of the at least some of the specified model of computation and specifications or constraints into a lower dimensional space of a second dimensionality.

Thus, for example, the first portion of the timing accurate simulation may include a timing accurate simulation of a first portion of the graphical program, and the second portion comprises a detailed functional simulation of a second portion of the graphical program. In this manner, different portions of the graphical program may be simulated to explore or address different aspects of the design. Moreover, in some embodiments, during the repeating, the first dimensionality of the projection or the second dimensionality may be changed, thereby changing the first or second portions of the timing accurate simulation, respectively. Thus, as the analysis and generation of the simulation are repeated, the focus of the simulation may change, e.g., from a functional simulation to a timing accurate simulation, or vice versa, as desired during the design/exploration process.

The following describes an exemplary embodiment directed to a DSP diagram (or graphical program).

In one exemplary embodiment, the method (or designer tool) may provide the ability to run the DSP diagram in simulation mode from the development environment, e.g., a DSPD (Digital Signal Processing Development) environment. This may involve one or more of the following processes or constructs:

A DSP VI (Virtual Instrument, i.e., graphical program) may be generated for the DSP diagram, which may include creating conditional code constructs implementing functionality required for proper simulation behavior. This functionality may include one or more of the following:

1. updating data probe values on the DSP diagram at runtime;
2. providing simulation data for all input ports (e.g., data and parameter terminals); or
3. flushing output ports to prevent deadlock.

The designer tool may also be configured to reset all data probes. For example, numeric probes may be set to zero and graph probes may be cleared and their default axis ranges restored.

The designer tool may be further configured to switch an associated programmable hardware element (e.g., FPGA) target into emulation mode with simulated I/O. This may be implemented via an FPGA project provider.

The designer tool may be configured to run the DSP VI in response to user input, e.g., when the user clicks a Start button in a GUI of the development environment or designer tool.

Figure 30:
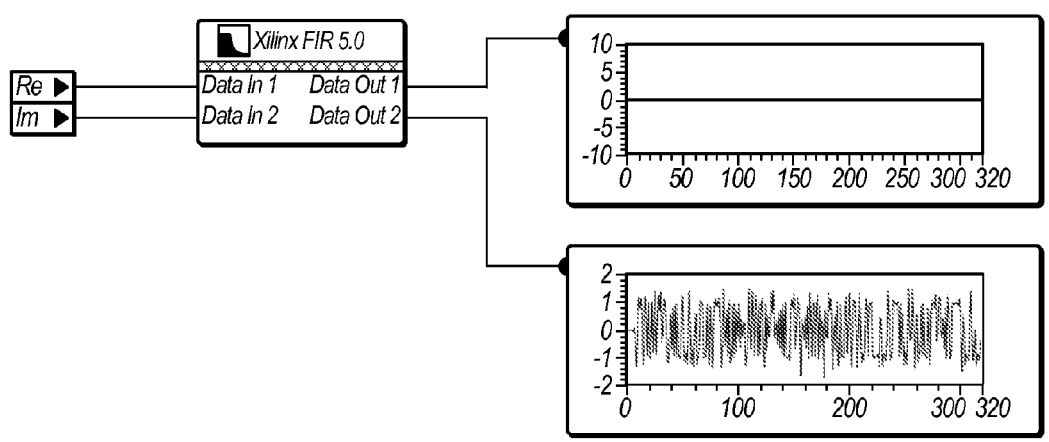
FIG. 30 illustrates a graphical program with input playback/feeding and output capture capabilities, according to one embodiment.

The designer tool may marshal the data probe values back to the DSPD environment for display on the diagram. FIG. 30 illustrates a graphical program with input playback/feeding and output capture capabilities, according to one embodiment. As may be seen, only the central portion of the graphical program is implemented in a targeted device, including the appropriate terminals. During simulation the terminals are fed using either playback from data files or using a specified second graphical program. Similarly the output is capture in simulation mode to a display or a data files The designer tool may abort the simulation in response to user input, e.g., when the user clicks a Stop button in the GUI.

The process of simulating (e.g., emulating) the DSP VI and creating the conditional simulation code may utilize existing features of the development environment. For example, in the context of the LabVIEW graphical development environment, the code to update data probes may use a provided Diagram Disable Structure and the DSP_SIMULATION_ACTIVE conditional symbol to control code emission. A probe ID may uniquely identify the visual data probe to update on the DSP diagram. The value update may be dispatched to the DSPD UI (user interface) thread where it may update asynchronously to the DSP VI being simulated.

In some embodiments, input ports may be simulated using data from a data file, e.g., a CSV file, or a VI, as configured by the user in the DSPD environment. These data may be injected into input port FIFOs using queues.

A major benefit of this approach is that the same code can be used for DSPD simulation, FPGA compilation, and target-level emulation. This eliminates code generation overhead when switching between operational modes. The conditional simulation code may be designed to have zero impact on the resource utilization of compiled code or the emulation behavior of the DSP VI outside of the DSPD environment, such as when running a test bench.

In further embodiments, the designer tool may provide one or more of the following features and capabilities:

The designer tool may be configured to visually reflect channel buffer status, e.g., free space, full/empty, etc., on the DSP diagram during simulation (e.g., as an annotation on the channel wire).

The designer tool may also support breakpoints on the DSP diagram, and may map them to appropriate, e.g., corresponding, places in the generated code.

The designer tool may provide or support dynamic probes on the DSP diagram that would not persist with standard dsp files, e.g., .lvdsp files provided in the LabVIEW development environment.

The designer tool may provide or support comprehensive profiling of generated code to provide detailed cycle-level behavior, e.g., as an internal diagnostic tool.

The designer tool may provide or support an option to extend all simulation-level behavior to compiled code running on the programmable hardware target, e.g., an FPGA. However, note that this may affect resource usage and/or quality of results (QoR).

The designer tool may provide or support integration of simulation/debugging capabilities with a schedule view, which may require the schedule view to accurately reflect execution behavior.

Thus, embodiments of the designer tool (or development environment) may provide a powerful set of debugging capabilities.

It should be noted that any of the above-described features and techniques may be used in any combinations as desired.

For further information regarding formal program design and development, please see the following references:

High-Level Directions: Y-Chart and Platform Based Design
Matthias Gries and Kurt Keutzer, "Building ASIPs: The Mescal Methodology", Springer, 1st edition, June 2005, ISBN-10: 0387260579 ISBN-13: 978-0387260570.
Alberto L. Sangiovanni-Vincentelli, Quo Vadis SLD: Reasoning about Trends and Challenges of System-Level Design, Proceedings of the IEEE, 95(3):467-506, March 2007.
Kurt Keutzer, A. Richard Newton, Jan M. Rabaey, Alberto L. Sangiovanni-Vincentelli: "System-level design: orthogonalization of concerns and platform-based design", IEEE Trans. on CAD of Integrated Circuits and Systems 19(12): pp 1523-1543, December 2000.
Bart Kienhuis, Ed F. Deprettere, Pieter van der Wolf, Kees A. Vissers, A Methodology to Design Programmable Embedded Systems—The Y-Chart Approach, Embedded Processor Design Challenges: Systems, Architectures, Modeling, and Simulation—SAMOS, p. 18-37, January 2002.
Embedded Software and Models of Computation
S. S. Bhattacharyya, P. K. Murthy and E. A. Lee, "Software Synthesis from Dataflow Graphs," Kluwer Academic Publishers, Norwell, Mass., 1996.
Edward A. Lee, "Embedded Software," Advances in Computers (M. Zelkowitz, editor), Vol. 56, Academic Press, London, 2002.
Ingo Sander and Axel Jantsch. System modeling and transformational design refinement in ForSyDe. IEEE Transactions on Computer-Aided Design of Integrated Circuits and Systems, 23(1):17-32, January 2004.
Todor Stefanov, Claudiu Zissulescu, Alexandru Turjan, Bart Kienhuis, "System Design using Kahn Process Networks: The Compaan/Laura approach", In Proceedings of the Design, Automation and Test in Europe Conference, February 2004, pp 340-345.

de Kock, E. A., Smits, W. J., van der Wolf, P., Brunel, J., Kruijtzer, W. M., Lieverse, P., Vissers, K. A., and Essink, G. 2000. YAPI: application modeling for signal processing systems. In Proceedings of the 37th Conference on Design Automation (Los Angeles, Calif., United States, Jun. 5-09, 2000). DAC'00. ACM, New York, N.Y., 402-405.

Ptolemy II Documentation

Design Space Exploration Frameworks

F. Balarin, M. Chiodo, P. Giusto, H. Hsieh, A. Jurecska, L. Lavagno, C. Passerone, A. Sangiovanni-Vincentelli, E. Sentovich, K. Suzuki, B. Tabbara, Hardware-Software Co-Design of Embedded Systems: The Polis Approach, no. 404 in International Series in Engineering and Computer Science, Kluwer Academic Publishers, 1997.

M. Gries: Methods for Evaluating and Covering the Design Space during Early Design Development, Integration, the VLSI Journal, Elsevier, vol. 38(2), pages 131-183, 2004

Andy D. Pimentel, Louis O. Hertzberger, Paul Lieverse, Pieter van der Wolf, Ed F. Deprettere: Exploring Embedded-Systems Architectures with Artemis. IEEE Computer 34(11): 57-63 (2001)

Gajski, D. D., Vahid, F., Narayan, S., and Gong, J. 1998. System-level exploration with SpecSyn. In Proceedings of the 35th Annual Conference on Design Automation (San Francisco, Calif., United States, Jun. 15-19, 1998). DAC '98. ACM, New York, N.Y., 812-817.

Mapping and Scheduling

Shahid Hussain Bokhari. On the Mapping Problem. IEEE Transactions on Computing, C-30(5):207-214, 1981.

Edward A. Lee and David G. Messerschmitt, "Static Scheduling of Synchronous Data Flow Programs for Digital Signal Processing," IEEE Trans. on Computers, January, 1987.

Gilbert. C. Sih and Edward. A. Lee, "A Compile-Time Scheduling Heuristic for Interconnection-Constrained Heterogeneous Processor Architectures," IEEE Transactions on Parallel and Distributed Systems, 4(2):175-187, 1993.

Yu-Kwong Kwok, Ishfaq Ahmad, "Static Scheduling Algorithms for Allocating Directed Task Graphs to Multiprocessors".

Analysis and Optimization for SDF/CSDF Models

Shuvra S. Bhattacharyya, Praveen K. Murthy, and Edward A. Lee, "Synthesis of Embedded Software from Synchronous Dataflow Specifications," Journal of VLSI Signal Processing Systems, Vol. 21, No. 2, June 1999.

Martyn Edwards and Peter Green, "The Implementation of Synchronous Dataflow Graphs Using Reconfigurable Hardware", FPL 2000.

Orlando M. Moreira and Marco J. G. Bekooij, "Self-Timed Scheduling Analysis for Real-Time Applications", EURASIP Journal on Advances in Signal Processing, 2007.

Sander Stuijk, Marc Geilen, and Twan Basten, "Throughput-Buffering Trade-Off Exploration for Cyclo-Static and Synchronous Dataflow Graphs", IEEE Trans. Computers 57(10): 1331-1345, 2008.

A. H. Ghamarian, M. C. W. Geilen, S. Stuijk, T. Basten, A. J. M. Moonen, M. J. G. Bekooij, B. D. Theelen and M. R. Mousavi, "Throughput Analysis of Synchronous Dataflow Graphs", In Application of Concurrency to System Design, 6th International Conference, ACSD 2006, Proceedings, pages 25-34. Turku, Finland, 27-30 Jun. 2006. IEEE Computer Society Press, Los Alamitos, Calif., USA, 2006.

Marco Bekooij, Maarten Wiggers, and Jef van Meerbergen, "Efficient Buffer Capacity and Scheduler Setting Computation for Soft Real-Time Stream Processing Applications", 10th International Workshop on Software & Compilers for Embedded Systems (SCOPES), 2007.

Hua Sun, "Throughput Constrained and Area Optimized Dataflow Synthesis for FPGAs", Ph.D thesis, Brigham Young University, April 2008.

G. Bilsen, M. Engels, R. Lauwereins, and J. A. Peperstraete, "Cyclo-static data flow", In IEEE Int. Conf. ASSP, pages 3255-3258, Detroit, Mich., May 1995.

T. M. Parks, J. L. Pino, E. A. Lee, "A Comparison of Synchronous and Cyclo-Static Dataflow", In Proc. of the Asilomar Conference, November 1995.

Adam Arnesen and Mike Wirthlin, "XML Descriptions and Synthesis Techniques for IP Stitching", CHREC B1-09, January 2009, NI Confidential.

Actor Definition Languages

Alain Girault, Bilung Lee, and Edward A. Lee, "Hierarchical Finite State Machines with Multiple Concurrency Models", IEEE Trans. on CAD of ICs, Vol 18, No 6, June 1999.

B. Bhattacharya and S. S. Bhattacharyya, "Parameterized Dataflow Modeling for DSP Systems", IEEE Transactions on Signal Processing, Vol. 49, No. 10, October 2001.

Yuan Lin, Yoonseo Choi, Scott Mahlke, Trevor Mudge, and Chaitali Chakrabarti, "A Parameterized Dataflow Language Extension for Embedded Streaming Systems" In Proc. Intl. Symposium on Systems, Architectures, Modeling and Simulation (SAMOS), July 2008, pp. 10-17.

Jorn W. Janneck, "Tokens? What Tokens? A Gentle Introduction to Dataflow Programming", Technical Memo, Xilinx, August 2007.

S. S. Bhattacharyya, G. Brebner, J. Janneck, J, Eker, C. von Platen, M. Mattavelli, M. Raulet, "OpenDF—A Dataflow Toolset for Reconfigurable Hardware and Multicore Systems", In Proc. of the Swedish Workshop on Multi-core Computing, November 2008.

Robert Trausmuth, Christian Dusek, Yann Orlarey, "Using Faust for FPGA Programming", In Proc. of the 9th Int. Conference on Digital Audio Effects (DAFx-06), Montreal, Canada, Sep. 18-20, 2006—Grame, 2006.

Program Design and Hardware Implementation

L. Deng, K. Sobti, Y. Zhang, and C. Chakrabarti, "Accurate Area, Time and Power Models for FPGA-Based Implementations", Journal of Signal Processing Systems, DOI 10.1007/s11265-009-0387-7, Jun. 19, 2009.

R. Enzler, T. Jeger, D. Cottet, and G. Troster, "High-Level Area and Performance Estimation of Hardware Building Blocks on FPGAs", in Proceedings of the The Roadmap to Reconfigurable Computing, 10th International Workshop on Field-Programmable Logic and Applications, pp. 525-534, 2000.

A. Sangiovanni-Vincentelli, "Quo Vadis, SLD? Reasoning About the Trends and Challenges of System Level Design", Proceedings of the IEEE, Vol. 95, N. 3, pp. 467-506, March 2007.

B. Kienhuis, E. F. Deprettere, P. Wolf, and K. A. Vissers. "A Methodology to Design Programmable Embedded Systems—The Y-Chart Approach", in Embedded Processor Design Challenges: Systems, Architectures, Modeling, and Simulation—SAMOS, pp. 18-37, January 2002.

Z. Zhang, Y. Fan, W. Jiang, G. Han, C. Yang, and J. Cong, "AutoPilot: A Platform-Based ESL Synthesis System," High-Level Synthesis: From Algorithm to Digital Circuit, ed. P. Coussy and A. Morawiec, Springer Publishers, 2008.

(2010) XST User Guide, [Online] Available: http://www.xilix.com.

A. Ferrari and A. Sangiovanni-Vincentelli, "System Design: Traditional Concepts and New Paradigms", in Proceedings of International Conference on Computer Design, pp. 2-12, 1999.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A non-transitory computer-accessible memory medium that stores program instructions executable by a computer system to perform:
   providing a graphical program development environment comprising a graphical specification and constraint language that allows specification of a model of computation and explicit declaration of constraints;
   creating a graphical program in a graphical specification and constraint language that allows specification of a model of computation and explicit declaration of constraints in response to user input, wherein the graphical program comprises:
   a specified model of computation;
   a plurality of interconnected functional blocks that visually indicate functionality of the graphical program; and
   graphically indicated specifications or constraints for at least one functional block of the functional blocks in the graphical program;
   wherein the specifications or constraints comprise:
   input count (IC), comprising a number of tokens consumed at an input terminal of the at least one functional block by one firing of the at least one functional block;
   output count (OC), comprising a number of tokens produced at an output terminal of the at least one functional block by one firing of the at least one functional block;
   execution time (ET), comprising a number of cycles needed by the functional block to complete firing;
   initiation interval (II), comprising a minimum number of cycles between firings of the functional block;
   input pattern (IP), comprising a sequence of Boolean values of length at most II, wherein the sequence of Boolean values aligns with the beginning of firing of the functional block, wherein each true value in the sequence denotes consumption of a token by the functional block; and
   output pattern (OP), comprising a sequence of Boolean values of length at most II, wherein the sequence of Boolean values aligns with the end of firing of the functional block, wherein each true value in the sequence denotes production of a token by the functional block; and
   analyzing the graphical program, including analyzing the specifications or constraints based on the specified model of computation; and
   automatically generating a timing accurate simulation of the graphical program.

2. The non-transitory computer-accessible memory medium of claim 1, wherein the program instructions are further executable to:
   provide break points at the level of the model of computation and specifications or constraints.

3. The non-transitory computer-accessible memory medium of claim 1, wherein the program instructions are further executable to:
   provide visualization displays and capture user or environment input at the level of the model of computation and specifications or constraints.

4. The non-transitory computer-accessible memory medium of claim 1, wherein the program instructions are further executable to:
   provide token flow probes at the level of the model of computation and specifications or constraints.

5. The non-transitory computer-accessible memory medium of claim 1, where at least some of the specified model of computation and specifications or constraints are projected onto a lower dimensional space to simplify or increase performance of the timing accurate simulation.

6. The non-transitory computer-accessible memory medium of claim 5, wherein the program instructions are further executable to perform:
   repeating said analyzing and said generating in an iterative manner, wherein during said repeating, the dimensionality of the projection is changed, thereby changing the generated timing accurate simulation.

7. The non-transitory computer-accessible memory medium of claim 6, wherein the projection is directed to a specified portion of the graphical program.

8. The non-transitory computer-accessible memory medium of claim 5, wherein the timing accurate simulation comprises:
   a first portion generated via projection of the at least some of the specified model of computation and specifications or constraints into a lower dimensional space of a first dimensionality; and
   a second portion generated via projection of the at least some of the specified model of computation and specifications or constraints into a lower dimensional space of a second dimensionality.

9. The non-transitory computer-accessible memory medium of claim 7,
   wherein the first portion of the timing accurate simulation comprises a timing accurate simulation of a first portion of the graphical program; and
   wherein the second portion comprises a detailed functional simulation of a second portion of the graphical program.

10. The non-transitory computer-accessible memory medium of claim 7, wherein the program instructions are further executable to perform:
    repeating said analyzing and said generating in an iterative manner, wherein during said repeating, the first dimensionality of the projection or the second dimensionality is changed, thereby changing the first or second portions of the timing accurate simulation, respectively.

11. A computer-implemented method, comprising:
    utilizing a computer to perform:
    providing a graphical program development environment comprising a graphical specification and constraint language that allows specification of a model of computation and explicit declaration of constraints;
    creating a graphical program in a graphical specification and constraint language that allows specification of a model of computation and explicit declaration of constraints in response to user input, wherein the graphical program comprises:
    a specified model of computation;
    a plurality of interconnected functional blocks that visually indicate functionality of the graphical program; and
    graphically indicated specifications or constraints for at least one functional block of the functional blocks in the graphical program;
    wherein the specifications or constraints comprise:
    input count (IC), comprising a number of tokens consumed at an input terminal of the at least one functional block by one firing of the at least one functional block;

output count (OC), comprising a number of tokens produced at an output terminal of the at least one functional block by one firing of the at least one functional block;
execution time (ET), comprising a number of cycles needed by the functional block to complete firing;
initiation interval (II), comprising a minimum number of cycles between firings of the functional block;
input pattern (IP), comprising a sequence of Boolean values of length at most II, wherein the sequence of Boolean values aligns with the beginning of firing of the functional block, wherein each true value in the sequence denotes consumption of a token by the functional block; and
output pattern (OP), comprising a sequence of Boolean values of length at most II, wherein the sequence of Boolean values aligns with the end of firing of the functional block, wherein each true value in the sequence denotes production of a token by the functional block; and
analyzing the graphical program, including analyzing the specifications or constraints based on the specified model of computation; and
automatically generating a timing accurate simulation of the graphical program.

12. The computer-implemented method of claim 11, further comprising:
utilizing the computer to perform:
providing break points at the level of the model of computation and specifications or constraints.

13. The computer-implemented method of claim 11, further comprising:
utilizing the computer to perform:
providing visualization displays and capture user or environment input at the level of the model of computation and specifications or constraints.

14. The computer-implemented method of claim 11, further comprising:
utilizing the computer to perform:
providing token flow probes at the level of the model of computation and specifications or constraints.

15. The computer-implemented method of claim 11, where at least some of the specified model of computation and specifications or constraints are projected onto a lower dimensional space to simplify or increase performance of the timing accurate simulation.

16. The computer-implemented method of claim 15, further comprising:
utilizing the computer to perform:
repeating said analyzing and said generating in an iterative manner, wherein during said repeating, the dimensionality of the projection is changed, thereby changing the generated timing accurate simulation.

17. The computer-implemented method of claim 16, wherein the projection is directed to a specified portion of the graphical program.

18. The computer-implemented method of claim 15, wherein the timing accurate simulation comprises:
a first portion generated via projection of the at least some of the specified model of computation and specifications or constraints into a lower dimensional space of a first dimensionality; and
a second portion generated via projection of the at least some of the specified model of computation and specifications or constraints into a lower dimensional space of a second dimensionality.

19. The computer-implemented method of claim 17,
wherein the first portion of the timing accurate simulation comprises a timing accurate simulation of a first portion of the graphical program; and
wherein the second portion comprises a detailed functional simulation of a second portion of the graphical program.

20. The computer-implemented method of claim 17, further comprising:
utilizing the computer to perform:
repeating said analyzing and said generating in an iterative manner, wherein during said repeating, the first dimensionality of the projection or the second dimensionality is changed, thereby changing the first or second portions of the timing accurate simulation, respectively.

21. A system, comprising:
a processor; and
a memory medium, coupled to the processor, wherein the memory medium stores program instructions executable by a computer system to:
providing a graphical program development environment comprising a graphical specification and constraint language that allows specification of a model of computation and explicit declaration of constraints;
creating a graphical program in a graphical specification and constraint language that allows specification of a model of computation and explicit declaration of constraints in response to user input, wherein the graphical program comprises:
a specified model of computation;
a plurality of interconnected functional blocks that visually indicate functionality of the graphical program; and
graphically indicated specifications or constraints for at least one functional block of the functional blocks in the graphical program;
wherein the specifications or constraints comprise:
input count (IC), comprising a number of tokens consumed at an input terminal of the at least one functional block by one firing of the at least one functional block;
output count (OC), comprising a number of tokens produced at an output terminal of the at least one functional block by one firing of the at least one functional block;
execution time (ET), comprising a number of cycles needed by the functional block to complete firing;
initiation interval (II), comprising a minimum number of cycles between firings of the functional block;
input pattern (IP), comprising a sequence of Boolean values of length at most II, wherein the sequence of Boolean values aligns with the beginning of firing of the functional block, wherein each true value in the sequence denotes consumption of a token by the functional block; and
output pattern (OP), comprising a sequence of Boolean values of length at most II, wherein the sequence of Boolean values aligns with the end of firing of the functional block, wherein each true value in the sequence denotes production of a token by the functional block;
analyze the graphical program, including analyzing the specifications or constraints based on the specified model of computation; and automatically generate a timing accurate simulation of the graphical program.

* * * * *